(12) United States Patent
Tokuchi

(10) Patent No.: US 10,863,053 B2
(45) Date of Patent: Dec. 8, 2020

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 324 days.

(21) Appl. No.: 15/362,022

(22) Filed: Nov. 28, 2016

(65) Prior Publication Data

US 2017/0322691 A1 Nov. 9, 2017

(30) Foreign Application Priority Data

May 6, 2016 (JP) .................. 2016-093291

(51) Int. Cl.
*H04N 1/32* (2006.01)
*G06F 3/14* (2006.01)
(Continued)

(52) U.S. Cl.
CPC ......... *H04N 1/3255* (2013.01); *G06F 3/1203* (2013.01); *G06F 3/1275* (2013.01);
(Continued)

(58) Field of Classification Search
CPC ...... G06F 3/0484; G06F 3/14; G06F 3/04883; G06F 3/1285; G06F 3/1275; G06F 3/1203; G06F 3/1423; G06F 3/1292; G06F 3/0488; G06F 3/1238; G06F 3/1253; G06F 3/1287; G06F 3/1293; H04N 1/344; H04N 1/00307; H04N 1/4433; H04N 1/3255; H04N 1/32122; H04N 1/00344; H04N 2201/0094; H04N 2201/0039; H04N 2201/3202; H04N 2201/3205; G09G 2370/042; G09G 2370/16
See application file for complete search history.

(56) References Cited

U.S. PATENT DOCUMENTS 8,493,586 B2 7/2013 Ito
2005/0144161 A1 6/2005 Hirota
(Continued)

FOREIGN PATENT DOCUMENTS

JP 2005-174027 A 6/2005
JP 2010-136276 A 6/2010
(Continued)

OTHER PUBLICATIONS

Communication dated Jul. 24, 2018 from the Japanese Patent Office in counterpart Application No. 2017-002182.
(Continued)

*Primary Examiner* — Tuyetlien T Tran
(74) *Attorney, Agent, or Firm* — Sughrue Mion, PLLC

(57) ABSTRACT

An information processing apparatus includes an obtaining unit and a display controller. The obtaining unit obtains pieces of identification information for identifying plural target devices that cooperate with each other. The display controller controls display of a cooperative function that is executed through cooperation between the target devices identified by the pieces of identification information.

25 Claims, 29 Drawing Sheets

(51) Int. Cl.
  H04N 1/00    (2006.01)
  H04N 1/44    (2006.01)
  H04N 1/34    (2006.01)
  G06F 3/12    (2006.01)

(52) U.S. Cl.
  CPC .............. *G06F 3/1285* (2013.01); *G06F 3/14* (2013.01); *G06F 3/1423* (2013.01); *H04N 1/00307* (2013.01); *H04N 1/00344* (2013.01); *H04N 1/32122* (2013.01); *H04N 1/344* (2013.01); *H04N 1/4433* (2013.01); *G06F 3/1292* (2013.01); *G09G 2370/042* (2013.01); *G09G 2370/16* (2013.01); *H04N 2201/0039* (2013.01); *H04N 2201/0094* (2013.01); *H04N 2201/3202* (2013.01); *H04N 2201/3205* (2013.01)

(56) References Cited

U.S. PATENT DOCUMENTS

| | | | |
|---|---|---|---|
| 2007/0067428 A1* | 3/2007 | Ogawa | H04L 47/821 709/223 |
| 2008/0201594 A1* | 8/2008 | Narushima | G06F 1/266 713/324 |
| 2010/0141980 A1 | 6/2010 | Ito | |
| 2011/0231922 A1* | 9/2011 | Azuma | G06F 21/35 726/9 |
| 2012/0033257 A1 | 2/2012 | Okazawa | |
| 2012/0140284 A1 | 6/2012 | Tashiro et al. | |
| 2012/0274971 A1* | 11/2012 | Tanabe | G06F 3/1222 358/1.14 |
| 2012/0291118 A1* | 11/2012 | Hiramatsu | G06F 21/00 726/16 |
| 2013/0234957 A1 | 9/2013 | Shirato | |
| 2013/0311728 A1 | 11/2013 | Ohara | |
| 2014/0040259 A1* | 2/2014 | Takematsu | G06F 16/284 707/736 |
| 2014/0063542 A1 | 3/2014 | Aoki | |
| 2015/0002890 A1* | 1/2015 | Okuno | G06F 3/1294 358/1.15 |
| 2015/0378651 A1* | 12/2015 | Asai | G06F 3/1204 358/1.15 |
| 2016/0080588 A1* | 3/2016 | Sasaki | H04N 1/00244 358/1.15 |
| 2017/0003750 A1* | 1/2017 | Li | G06F 3/017 |

FOREIGN PATENT DOCUMENTS

| | | |
|---|---|---|
| JP | 2011-44790 A | 3/2011 |
| JP | 2012-37928 A | 2/2012 |
| JP | 2013-51165 A | 3/2013 |
| JP | 2013-65197 A | 4/2013 |
| JP | 2013-186540 A | 9/2013 |
| JP | 2013-186840 A | 9/2013 |
| JP | 2013-239926 A | 11/2013 |
| JP | 2014-32501 A | 2/2014 |
| JP | 2014-48672 A | 3/2014 |
| JP | 2015-12518 A | 1/2015 |
| JP | 2015-14912 A | 1/2015 |
| JP | 5737906 B2 | 6/2015 |
| JP | 2015-177504 A | 10/2015 |

OTHER PUBLICATIONS

Communication dated Jul. 16, 2019 from the Japanese Patent Office in counterpart Application No. 2018-200568.

Decision of Refusal dated Mar. 3, 2020, from the Japanese Patent Office in Application No. 2018-200568.

Communication dated Oct. 29, 2019, from the Japanese Patent Office in counterpart Application No. 2017-002181.

* cited by examiner

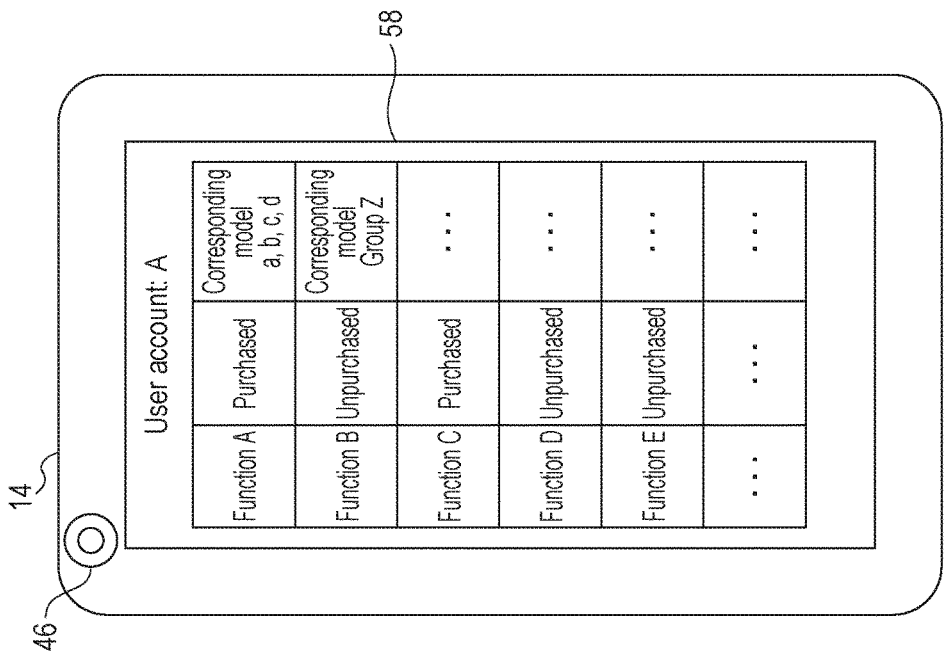
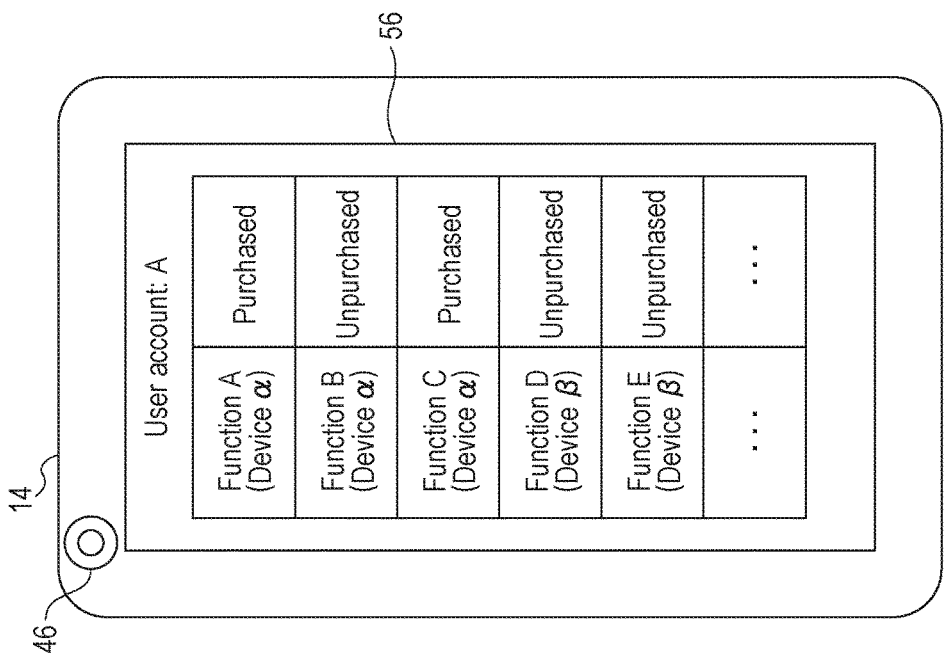

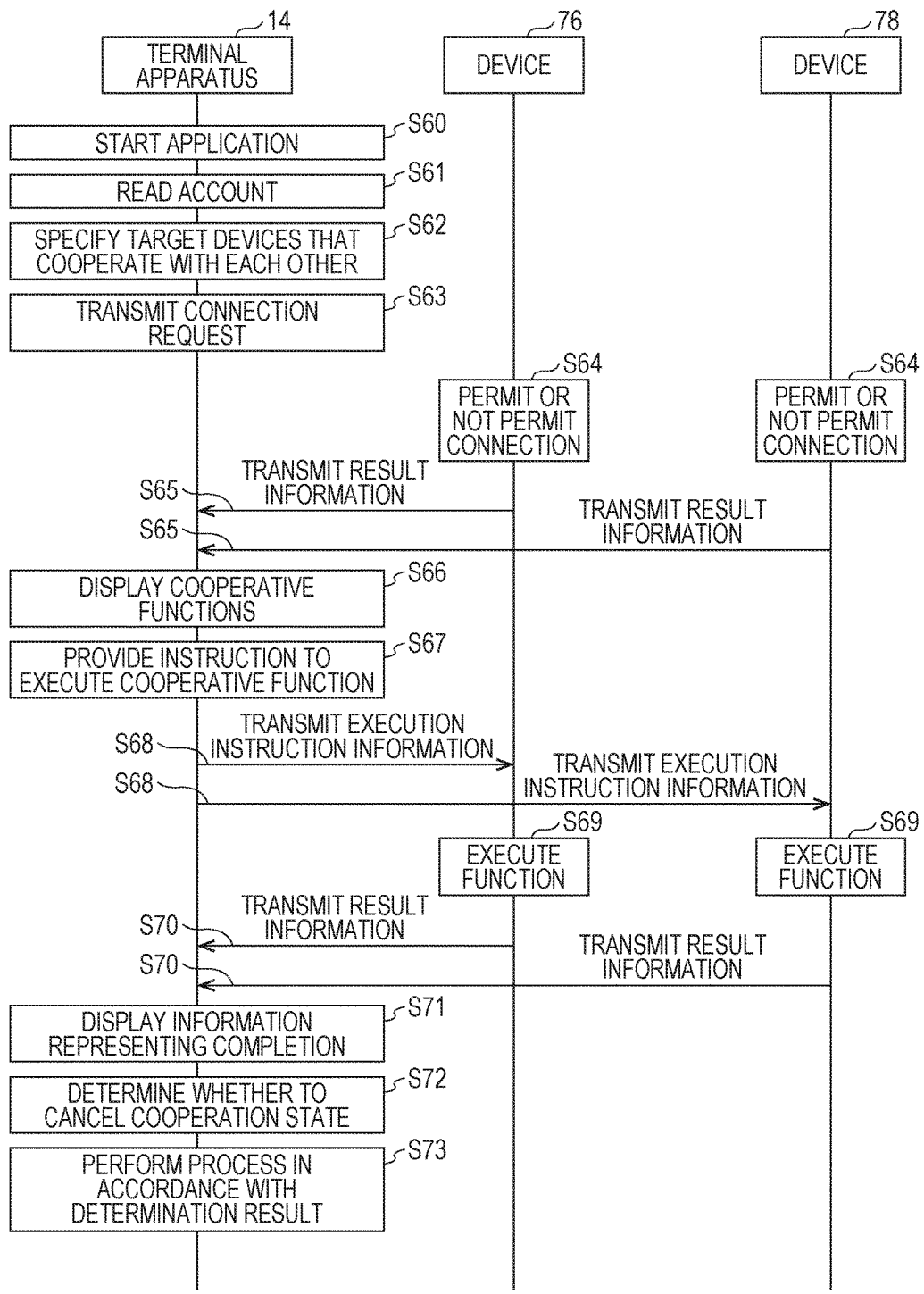

|  | EMERGENCY (URGENT) | OWNER OF DEVICE | RANK IN ORGANIZATION | ESTIMATED COMPLETION TIME OF JOB |
|---|---|---|---|---|
| INFLUENCE ON ORDER OF PRIORITY | VERY LARGE | LARGE | MIDDLE | SMALL |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-093291 filed May 6, 2016.

BACKGROUND

Technical Field

The present invention relates to an information processing apparatus, an information processing method, and a non-transitory computer readable medium.

SUMMARY

According to an aspect of the invention, there is provided an information processing apparatus including an obtaining unit and a display controller. The obtaining unit obtains pieces of identification information for identifying plural target devices that cooperate with each other. The display controller controls display of a cooperative function that is executed through cooperation between the target devices identified by the pieces of identification information.

BRIEF DESCRIPTION OF THE DRAWINGS

Exemplary embodiments of the present invention will be described in detail based on the following figures, wherein:

FIGS. 6A and 6B are diagrams illustrating a function purchase screen displayed on the terminal apparatus;

FIG. 21 is a sequence diagram illustrating a process performed by the image forming system according to the second exemplary embodiment;

DETAILED DESCRIPTION

First Exemplary Embodiment

Figure 1:
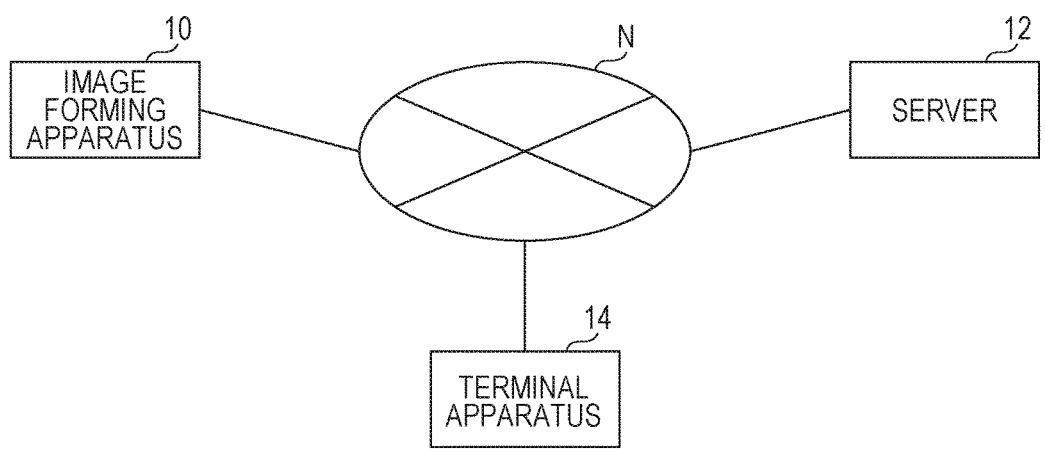
FIG. 1 is a block diagram illustrating an image forming system according to a first exemplary embodiment of the present invention.

An image forming system serving as an information processing system according to a first exemplary embodiment of the present invention will be described with reference to FIG. 1. FIG. 1 illustrates an example of the image forming system according to the first exemplary embodiment. The image forming system according to the first exemplary embodiment includes an image forming apparatus 10, which is an example of a device; a server 12; and a terminal apparatus 14, which is an example of an information processing apparatus. The image forming apparatus 10, the server 12, and the terminal apparatus 14 are connected to each other through a communication path N such as a network. In the example illustrated in FIG. 1, the image forming system includes one image forming apparatus 10, one server 12, and one terminal apparatus 14. Alternatively, the image forming system may include plural image forming apparatuses 10, plural servers 12, and plural terminal apparatuses 14.

The image forming apparatus 10 is an apparatus that has an image forming function. Specifically, the image forming apparatus 10 is an apparatus that has at least one of a scan function, a print function, a copy function, and a facsimile function. The image forming apparatus 10 also has a function of transmitting data to and receiving data from another apparatus.

The server 12 is an apparatus that manages, for each user, functions available to the user. For example, a function purchased by a user is a function available to the user, and the server 12 manages a function purchase history for each user. Of course, the server 12 manages not only functions that are purchased or not purchased but also functions that are available free of charge, additional updater functions, and special functions managed by a manager. A function purchase process is performed by, for example, the server 12. The server 12 is an apparatus that executes a specific function. The specific function executed by the server 12 is, for example, a function regarding image processing. The functions managed by the server 12 are, for example, functions executed by using the image forming apparatus 10 and functions executed by the server 12. The management of the function purchase history and the execution of the specific function may be performed by different servers 12 or may be performed by the same server 12. Furthermore, the server 12 has a function of transmitting data to and receiving data from another apparatus.

The terminal apparatus 14 is an apparatus such as a personal computer (PC), a tablet PC, a smartphone, or a mobile phone, and has a function of transmitting data to and receiving data from another apparatus. The terminal apparatus 14 functions as a user interface unit (UI unit) of the image forming apparatus 10 when the image forming apparatus 10 is used.

In the image forming system according to the first exemplary embodiment, a user purchases a function by using the terminal apparatus 14, and the history of the purchase is managed as a function purchase history by the server 12. The function purchased by the user is executed by, for example, the image forming apparatus 10 or the server 12.

Figure 2:
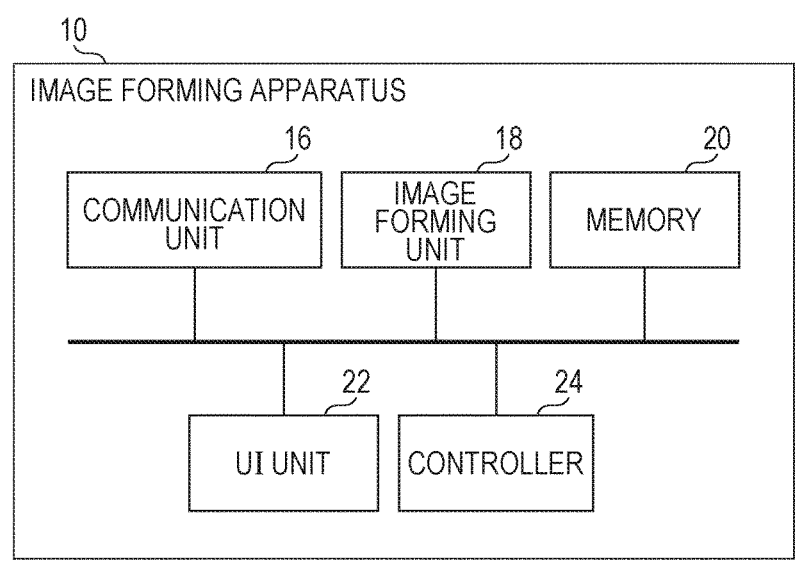
FIG. 2 is a block diagram illustrating an image forming apparatus according to the first exemplary embodiment.

Hereinafter, the configuration of the image forming apparatus 10 will be described in detail with reference to FIG. 2. FIG. 2 illustrates the configuration of the image forming apparatus 10.

A communication unit 16 is a communication interface and has a function of transmitting data to another apparatus through the communication path N and a function of receiving data from another apparatus through the communication path N. The communication unit 16 may be a communication interface having a wireless communication function or may be a communication interface having a wired communication function.

An image forming unit 18 executes a function regarding image formation. Specifically, the image forming unit 18 executes at least one of a scan function, a print function, a copy function, and a facsimile function. When the scan function is executed, a document is read and scan data (image data) is generated. When the print function is executed, an image is printed on a recording medium such as paper. When the copy function is executed, a document is read and printed on a recording medium. When the facsimile function is executed, image data is transmitted or received by facsimile. Furthermore, a function including plural functions may be executed. For example, a scan and transfer function, which is a combination of a scan function and a transmission (transfer) function, may be executed. When the scan and transfer function is executed, a document is read, scan data (image data) is generated, and the scan data is transmitted to a destination (for example, an external apparatus such as the terminal apparatus 14). Of course, this composite function is merely an example and another composite function may be executed.

A memory 20 is a storage apparatus such as a hard disk. The memory 20 stores information representing an image formation instruction (for example, job information), image data to be printed, scan data generated by executing a scan function, various pieces of control data, various programs, and so forth. Of course, these pieces of information and data may be stored in different storage apparatuses or in one storage apparatus.

A UI unit 22 is a user interface unit and includes a display and an operation unit. The display is a display apparatus such as a liquid crystal display. The operation unit is an input apparatus such as a touch screen or a keyboard. The image forming apparatus 10 does not necessarily include the UI unit 22, and may include a hardware user interface unit (hardware UI unit) serving as hardware instead of the display. The hardware UI unit is, for example, a hardware keypad dedicated to input numbers (for example, a numeric keypad) or a hardware keypad dedicated to indicate directions (for example, a direction indication keypad).

A controller 24 controls the operations of the individual units of the image forming apparatus 10.

Figure 3:
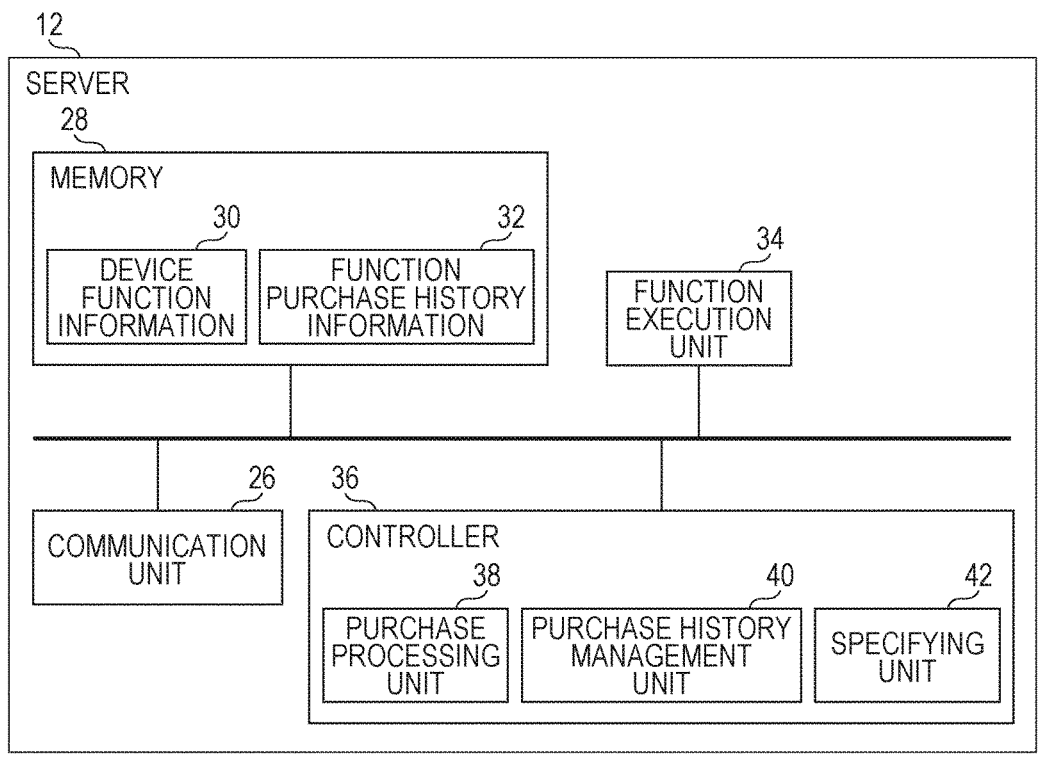
FIG. 3 is a block diagram illustrating a server according to the first exemplary embodiment.

Next, the configuration of the server 12 will be described in detail with reference to FIG. 3. FIG. 3 illustrates the configuration of the server 12.

A communication unit 26 is a communication interface and has a function of transmitting data to another apparatus through the communication path N and a function of receiving data from another apparatus through the communication path N. The communication unit 26 may be a communication interface having a wireless communication function or may be a communication interface having a wired communication function.

A memory 28 is a storage apparatus such as a hard disk. The memory 28 stores device function information 30, function purchase history information 32, programs for executing specific functions, and so forth. Of course, these pieces of information may be stored in different storage apparatuses or in one storage apparatus. Hereinafter, the device function information 30 and the function purchase history information 32 will be described.

The device function information 30 is information representing a group of functions of each image forming apparatus 10 included in the image forming system. For example, the device function information 30 is information representing, for each image forming apparatus 10, the correspondence between device identification information for identifying the image forming apparatus 10 and pieces of function identification information for identifying individual functions of the image forming apparatus 10. The device identification information includes, for example, a device ID, a device name, a model number, and position information. The function identification information includes, for example, a function ID and a function name. For example, if a certain image forming apparatus 10 has a scan function, a print function, a copy function, and a scan and transfer function, the device identification information of the image forming apparatus 10 is associated with function identification information representing the scan function, function identification information representing the print function, function identification information representing the copy function, and function identification information representing the scan and transfer function. The group of functions of each image forming apparatus 10 is specified by referring to the device function information 30.

The function purchase history information 32 is information representing a function purchase history of each user, that is, information representing one or plural functions that have been purchased by each user. For example, the function purchase history information 32 is information representing, for each user, the correspondence between user identification information for identifying the user and one or plural pieces of function identification information representing one or plural functions that have been purchased by the user. The user identification information is, for example, user account information such as a user ID and a user name. A function purchased by a user is a function available to the user. One or plural functions purchased by each user, that is, one or plural functions available to each user, are specified by referring to the function purchase history information 32. The function purchase history information 32 is updated every time a user purchases a function, for example.

A function execution unit 34 executes a specific function. For example, if a user designates a specific function by using the terminal apparatus 14 and provides an instruction to execute the function, the function execution unit 34 executes the function designated by the user. The function execution unit 34 executes, for example, functions regarding image processing, such as a character recognition function, a translation function, an image processing function, and an image forming function. Of course, the function execution unit 34 may execute a function regarding processing other than image processing. When the character recognition function is executed, characters in an image are recognized and character data representing the characters is generated. When the translation function is executed, characters in an image are translated into characters expressed by a specific language and character data representing the translated characters is generated. When the image processing function is executed, an image is processed. For example, the function execution unit 34 receives scan data generated by executing a scan function from the image forming apparatus 10, and executes a function regarding image processing, such as the character recognition function, the translation function, or the image processing function, on the scan data. The function execution unit 34 may receive image data from the terminal apparatus 14 and may execute individual functions on the image data. The character data or image data generated by the function execution unit 34 is transmitted from the server 12 to the terminal apparatus 14, for example.

A controller 36 controls the operations of the individual units of the server 12. The controller 36 includes a purchase processing unit 38, a purchase history management unit 40, and a specifying unit 42.

The purchase processing unit 38 executes a function purchase process. For example, if a pay function is purchased by a user, the purchase processing unit 38 applies a charging process to the user. The function purchased by the user becomes available to the user. A function not purchased by the user is not available to the user.

The purchase history management unit 40 manages, for each user, a function purchase history of the user and generates the function purchase history information 32 representing the purchaser history. The purchase history management unit 40 updates the function purchase history information 32 every time a function is purchased by the user. The information included in the function purchase history information 32 is displayed, for example, as a function purchase screen on the terminal apparatus 14 when the user purchases a function or checks the function that has been purchased. The function purchase screen will be described in detail below with reference to FIGS. 6A and 6B.

The specifying unit 42 receives device identification information for identifying the target image forming apparatus 10 to be used, and specifies the pieces of function identification information of the individual functions associated with the device identification information in the device function information 30 stored in the memory 28. Accordingly, a group of functions of the target image forming apparatus 10 to be used is specified (recognized). For example, device identification information is transmitted from the terminal apparatus 14 to the server 12, and the pieces of function identification information of the individual functions associated with the device identification information are specified by the specifying unit 42. The pieces of function identification information of the individual functions (for example, pieces of information representing the names of the functions) are transmitted from the server 12 to the terminal apparatus 14 and are displayed on the terminal apparatus 14, for example. Accordingly, the pieces of function identification information of the individual functions of the image forming apparatus 10 specified by the device identification information are displayed on the terminal apparatus 14.

Also, the specifying unit 42 receives user identification information for identifying a user, and specifies the pieces of function identification information of the individual functions associated with the user identification information in the function purchase history information 32 stored in the memory 28. Accordingly, a group of functions purchased by the user, that is, a group of functions available to the user, is specified (recognized). For example, user identification information is transmitted from the terminal apparatus 14 to the server 12, and the pieces of function identification information of the individual functions associated with the user identification information are specified by the specifying unit 42. The pieces of function identification information of the individual functions (for example, pieces of information representing the names of the functions) are transmitted from the server 12 to the terminal apparatus 14 and are displayed on the terminal apparatus 14, for example. Accordingly, the pieces of function identification information of the individual functions available to the user specified by the user identification information are displayed on the terminal apparatus 14.

For example, the specifying unit 42 receives device identification information and user identification information, specifies the pieces of function identification information of the individual functions associated with the device identification information in the device function information 30, and specifies the pieces of function identification information of the individual functions associated with the user identification information in the function purchase history information 32. Accordingly, a group of functions that the image forming apparatus 10 specified by the device identification information has and that are available to the user specified by the user identification information is specified (recognized). The pieces of function identification information of the functions that the image forming apparatus 10 has and that are available to the user are transmitted from the server 12 to the terminal apparatus 14 and are displayed on the terminal apparatus 14, for example. Accordingly, the pieces of function identification information of the individual functions that the image forming apparatus 10 has and that are available to the user are displayed on the terminal apparatus 14.

The pieces of function identification information of the individual functions of the target image forming apparatus 10 to be used and the pieces of function identification information of the individual functions available to the user are displayed, for example, as a function display screen on the terminal apparatus 14. The function display screen will be described in detail below with reference to FIG. 7.

In this exemplary embodiment, for example, augmented reality (AR) technologies are applied to obtain device identification information and to specify (recognize) the target image forming apparatus 10 to be used. The AR technologies according to the related art are used. For example, a marker-based AR technology in which a marker such as a two-dimensional barcode is used, a markerless AR technology in which an image recognition technique is used, a position information AR technology in which position information is used, and the like are used. Of course, device identification information may be obtained and the target image forming apparatus 10 to be used may be specified without applying the AR technologies.

Figure 4:
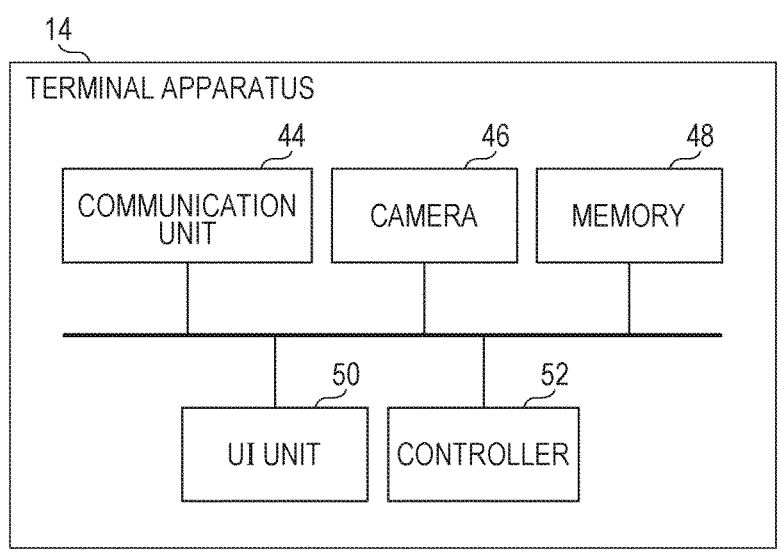
FIG. 4 is a block diagram illustrating a terminal apparatus according to the first exemplary embodiment.

Hereinafter, the configuration of the terminal apparatus 14 will be described in detail with reference to FIG. 4. FIG. 4 illustrates the configuration of the terminal apparatus 14.

A communication unit 44 is a communication interface and has a function of transmitting data to another apparatus through the communication path N and a function of receiving data from another apparatus through the communication path N. The communication unit 44 may be a communication interface having a wireless communication function or may be a communication interface having a wired communication function. A camera 46, which serves as an image capturing unit, captures an image of a subject and thereby generates image data (for example, still image data or moving image data). A memory 48 is a storage apparatus such as a hard disk or a solid state drive (SSD). The memory 48 stores various programs, various pieces of data, the address information of the server 12, the pieces of address information of individual devices (for example, the pieces of address information of the individual image forming apparatuses 10), information about identified target devices that cooperate with each other, and information about cooperative functions. A UI unit 50 is a user interface unit and includes a display and an operation unit. The display is a display apparatus such as a liquid crystal display. The operation unit is an input apparatus such as a touch screen, a keyboard, or a mouse. A controller 52 controls the operations of the individual units of the terminal apparatus 14. The controller 52 serves as, for example, a display controller, and causes the display of the UI unit 50 to display a function purchase screen or a function display screen.

The above-described device function information 30 may be stored in the memory 48 of the terminal apparatus 14. In this case, the device function information 30 is not necessarily stored in the memory 28 of the server 12. Also, the above-described function purchase history information 32 may be stored in the memory 48 of the terminal apparatus 14. In this case, the function purchase history information 32 is not necessarily stored in the memory 28 of the server 12. The controller 52 of the terminal apparatus 14 may include the above-described purchase history management unit 40 and may manage the function purchase history of the user who uses the terminal apparatus 14. In this case, the server 12 does not necessarily include the purchase history management unit 40. The controller 52 of the terminal apparatus 14 may include the above-described specifying unit 42, may specify an image forming apparatus 10 on the basis of device identification information, and may specify functions available to a user on the basis of user identification information. In this case, the server 12 does not necessarily include the specifying unit 42.

Figure 5:
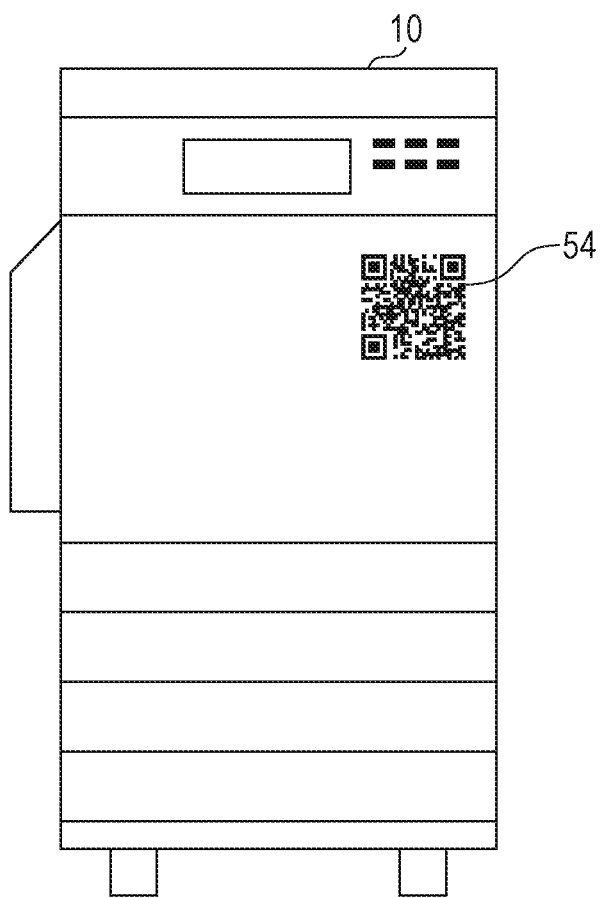
FIG. 5 is a schematic diagram illustrating an appearance of the image forming apparatus.

Hereinafter, a process of obtaining the device identification information of the image forming apparatus 10 will be described in detail with reference to FIG. 5. FIG. 5 schematically illustrates an appearance of the image forming apparatus 10. Here, a description will be given of a process of obtaining the device identification information by applying the marker-based AR technology. The housing of the image forming apparatus 10 is provided with a marker 54, such as a two-dimensional barcode. The marker 54 is information obtained by coding the device identification information of the image forming apparatus 10. The user activates the camera 46 of the terminal apparatus 14 and captures, with the camera 46, an image of the marker 54 provided on the image forming apparatus 10, which is a target to be used. Accordingly, image data representing the marker 54 is generated. The image data is transmitted from the terminal apparatus 14 to the server 12, for example. In the server 12, the controller 36 performs a decoding process on the marker image represented by the image data and thereby extracts device identification information. Accordingly, the target image forming apparatus 10 to be used (the image forming apparatus 10 having the marker 54 whose image has been captured) is specified (recognized). The specifying unit 42 of the server 12 specifies the pieces of function identification information of the individual functions associated with the extracted device identification information in the device function information 30. Accordingly, the functions of the target image forming apparatus 10 to be used are specified.

Alternatively, the controller 52 of the terminal apparatus 14 may perform a decoding process on the image data representing the marker 54 to extract the device identification information. In this case, the extracted device identification information is transmitted from the terminal apparatus 14 to the server 12. The specifying unit 42 of the server 12 specifies the pieces of function identification information of the individual functions associated with the device identification information received from the terminal apparatus 14 in the device function information 30. In a case where the device function information 30 is stored in the memory 48 of the terminal apparatus 14, the controller 52 of the terminal apparatus 14 may specify the pieces of function identification information of the individual functions associated with the device identification information extracted by the controller 52 in the device function information 30.

The marker 54 may include coded pieces of function identification information of the individual functions of the image forming apparatus 10. In this case, the device identification information of the image forming apparatus 10 is extracted and also the pieces of function identification information of the individual functions of the image forming apparatus 10 are extracted by performing a decoding process on the image data representing the marker 54. Accordingly, the image forming apparatus 10 is specified and also the individual functions of the image forming apparatus 10 are specified. The decoding process may be performed by the server 12 or the terminal apparatus 14.

In the case of obtaining device identification information by applying the markerless AR technology, for example, the user captures an image of the whole appearance or part of the appearance of the target image forming apparatus 10 to be used by using the camera 46 of the terminal apparatus 14. Of course, it is useful to obtain information for specifying the device to be used, such as the name (for example, the trade name) or model number of the device, by capturing an image of the appearance of the device. As a result of the capturing, appearance image data representing the whole appearance or part of the appearance of the target image forming apparatus 10 to be used is generated. The appearance image data is transmitted from the terminal apparatus 14 to the server 12, for example. In the server 12, the controller 36 specifies the target image forming apparatus 10 to be used on the basis of the appearance image data. For example, the memory 28 of the server 12 stores, for each image forming apparatus 10, appearance image correspondence information representing the correspondence between appearance image data representing the whole appearance or part of the appearance of the image forming apparatus 10 and device identification information of the image forming apparatus 10. The controller 36 compares, for example, the appearance image data received from the terminal apparatus 14 with each piece of appearance image data included in the appearance image correspondence information, and specifies the device identification information of the target image forming apparatus 10 to be used on the basis of the comparison result. For example, the controller 36 extracts, from the appearance image data received from the terminal apparatus 14, a feature of the appearance of the target image forming apparatus 10 to be used, specifies the appearance image data representing a feature that is the same as or similar to the feature of the appearance in the appearance image data group included in the appearance image correspondence information, and specifies the device identification information associated with the appearance image data. Accordingly, the target image forming apparatus 10 to be used (the image forming apparatus 10 whose image has been captured by the camera 46) is specified (recognized). Alternatively, in a case where an image showing the name (for example, the trade name) or model number of the image forming apparatus 10 is captured and appearance image data representing the name or model number is generated, the target image forming apparatus 10 to be used may be specified on the basis of the name or model number represented by the appearance image data. The specifying unit 42 of the server 12 specifies the pieces of function identification information of the individual functions associated with the specified device identification information in the device function information 30. Accordingly, the functions of the target image forming apparatus 10 to be used are specified (recognized).

Alternatively, the controller 52 of the terminal apparatus 14 may compare the appearance image data representing the whole appearance or part of the appearance of the target image forming apparatus 10 to be used with each piece of appearance image data included in the appearance image correspondence information and may specify the device identification information of the target image forming apparatus 10 to be used on the basis of the comparison result. The appearance image correspondence information may be stored in the memory 48 of the terminal apparatus 14. In this case, the controller 52 of the terminal apparatus 14 refers to the appearance image correspondence information stored in the memory 48 of the terminal apparatus 14 and thereby specifies the device identification information of the target image forming apparatus 10 to be used. Alternatively, the controller 52 of the terminal apparatus 14 may obtain the appearance image correspondence information from the server 12 and may refer to the appearance image correspondence information, so as to specify the device identification information of the target image forming apparatus 10 to be used.

In the case of obtaining device identification information by applying the position information AR technology, for example, position information representing the position of the image forming apparatus 10 is obtained by using a global positioning system (GPS) function. For example, each image forming apparatus 10 has a GPS function and obtains device position information representing the position of the image forming apparatus 10. The terminal apparatus 14 outputs, to the target image forming apparatus 10 to be used, information representing a request for obtaining device position information, and receives, as a response to the request, the device position information of the image forming apparatus 10 from the image forming apparatus 10. The device position information is transmitted from the terminal apparatus 14 to the server 12, for example. In the server 12, the controller 36 specifies the target image forming apparatus 10 to be used on the basis of the device position information. For example, the memory 28 of the server 12 stores, for each image forming apparatus 10, position correspondence information representing the correspondence between the device position information representing the position of the image forming apparatus 10 and the device identification information of the image forming apparatus 10. The controller 36 specifies, in the position correspondence information, the device identification information associated with the device position information received from the terminal apparatus 14. Accordingly, the target image forming apparatus 10 to be used is specified (recognized). The specifying unit 42 of the server 12 specifies, in the device function information 30, the pieces of function identification information of the individual functions associated with the specified device identification information. Accordingly, the functions of the target image forming apparatus 10 to be used are specified (recognized).

The controller 52 of the terminal apparatus 14 may specify, in the position correspondence information, the device identification information associated with the position information of the target image forming apparatus 10 to be used. The position correspondence information may be stored in the memory 48 of the terminal apparatus 14. In this case, the controller 52 of the terminal apparatus 14 refers to the position correspondence information stored in the memory 48 of the terminal apparatus 14 and thereby specifies the device identification information of the target image forming apparatus 10 to be used. Alternatively, the controller 52 of the terminal apparatus 14 may obtain the position correspondence information from the server 12 and refer to the position correspondence information, so as to specify the device identification information of the target image forming apparatus 10 to be used.

Hereinafter, a screen displayed on the terminal apparatus 14 will be described in detail. First, with reference to FIGS. 6A and 6B, a description will be given of a function purchase screen that is displayed when a user purchases a function or checks purchased functions. FIGS. 6A and 6B illustrate an example of the function purchase screen.

For example, when a user accesses the server 12 by using the terminal apparatus 14, the user identification information (user account information) of the user is transmitted from the terminal apparatus 14 to the server 12. In the server 12, the specifying unit 42 specifies the pieces of function identification information of the individual functions associated with the user identification information in the function purchase history information 32. Accordingly, a group of functions purchased by the user, that is, a group of functions available to the user, is specified (recognized). For example, function purchase screen information, which includes the pieces of function identification information representing the individual functions that are on sale and the pieces of function identification information representing the individual functions available to the user, is transmitted from the server 12 to the terminal apparatus 14. The controller 52 of the terminal apparatus 14 causes the display of the UI unit 50 of the terminal apparatus 14 to display a function purchase screen based on the function purchase screen information. For example, the controller 52 of the terminal apparatus 14 causes the display of the UI unit 50 to display the individual pieces of function identification information and information representing the purchase statuses of the individual functions.

On function purchase screens 56 and 58 illustrated in FIGS. 6A and 6B, respectively, a list of pieces of information representing the functions that are on sale is displayed. Purchase status information representing "purchased" or "unpurchased" is associated with each function. The function associated with function status information representing "purchased" is a function that has been purchased by the user, that is, a function available to the user. The function associated with function status information representing "unpurchased" is a function that has not been purchased by the user, that is, a function unavailable to the user (a function the use of which is prohibited).

In the example illustrated in FIG. 6A, the function purchase screen 56 is a screen showing the function purchase history of user A. For example, the function purchase history is displayed in the form of a list on the function purchase screen 56. Functions A and C have been purchased by user A and are available to user A. Functions B, D, and E have not been purchased by user A and are unavailable to user A. A function is purchased through the function purchase screen 56. For example, if user A designates function B, which is unpurchased, and provides an instruction to purchase it by using the terminal apparatus 14, function identification information representing function B and information representing the purchase instruction are transmitted from the terminal apparatus 14 to the server 12. In the server 12, the purchase processing unit 38 executes a purchase process for function B. If function B is a pay function, the purchase processing unit 38 executes a charging process. The purchase history management unit 40 updates the function purchase history information on user A. That is, the purchase history management unit 40 associates the function identification information representing function B with the user identification information of user A in the function purchase history information. Accordingly, function B becomes available to user A. Furthermore, on the function purchase screen 56, the purchase status of function B is changed from "unpurchased" to "purchased". A corresponding device for each function may be displayed. Accordingly, the user is able to easily recognize the device corresponding to the function to be used. For example, device α capable of executing functions A, B, and C is associated with functions A, B, and C, and the information representing device α is displayed in association with functions A, B, and C. Also, device β capable of executing functions D and E is associated with functions D and E, and the information representing device β is displayed in association with functions D and E. The information about the devices capable of executing respective functions may be presented by displaying the name of a group of devices or by listing the individual devices. Alternatively, as in the function purchase screen 58 illustrated in FIG. 6B, a function and a device capable of executing the function may be displayed in different columns in association with each other. For example, the models of the device capable of executing function A are models a, b, c, and d, and the models of the device capable of executing function B are a model group Z. The model group Z includes models a, b, e, and f.

For example, the terminal apparatus 14 stores a program of a web browser. With use of the web browser, the user is able to access the server 12 from the terminal apparatus 14. When the user accesses the server 12 by using the web browser, a web page showing the function purchase screen 56 or 58 is displayed on the display of the UI unit 50 of the terminal apparatus 14, and a function is purchased through the web page.

Figure 7:
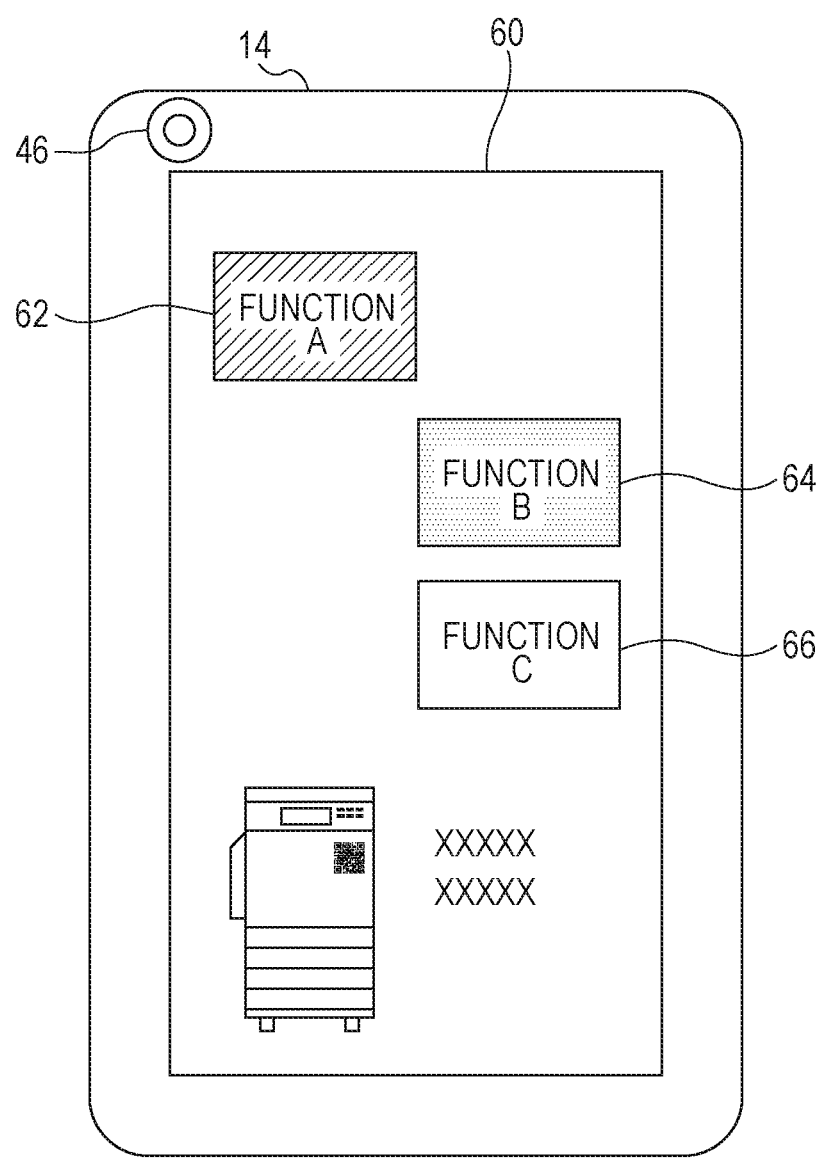
FIG. 7 is a diagram illustrating a function display screen displayed on the terminal apparatus.

Next, a function display screen will be described in detail with reference to FIG. 7. The function display screen is displayed on the display of the UI unit 50 of the terminal apparatus 14 when the image forming apparatus 10 is to be used. FIG. 7 illustrates an example of the function display screen.

For example, with use of any of the above-described marker-based AR technology, markerless AR technology, and position information AR technology, the device identification information of the target image forming apparatus 10 to be used is obtained, and the pieces of function identification information representing the individual functions associated with the device identification information, that is, the pieces of function identification information representing the individual functions of the target image forming apparatus 10 to be used, are specified (recognized). Also, the pieces of function identification information representing the individual functions associated with the user identification information of the user who uses the target image forming apparatus 10, that is, the pieces of function identification information representing the individual functions available to the user, are specified (recognized). These pieces of information are displayed, as a function display screen, on the display of the UI unit 50 of the terminal apparatus 14. Also, since a group of functions of the target image forming apparatus 10 to be used is specified, a group of functions that the target image forming apparatus 10 to be used does not have among a group of functions that are on sale is specified. The pieces of function identification information representing the individual functions that the target image forming apparatus 10 to be used does not have may be displayed on the function display screen.

On a function display screen 60 illustrated in FIG. 7, a button image 62 representing function A, a button image 64 representing function B, and a button image 66 representing function C are displayed as an example of pieces of function identification information. Function A is a function that the target image forming apparatus 10 to be used has and is a function available to the target user, that is, a function purchased by the target user. Function B is a function that the target image forming apparatus 10 to be used has and is a function unavailable to the target user, that is, a function not purchased by the target user. The target user becomes able to use function B by purchasing it. Function C is a function that the target image forming apparatus 10 to be used does not have, that is, a function incompatible with the target image forming apparatus 10 to be used. In accordance with whether or not the function represented by a button image is a function that the target image forming apparatus 10 to be used has, the controller 52 of the terminal apparatus 14 changes the display form of the button image. Also, in accordance with whether or not the function represented by a button image is a function available to the target user, the controller 52 changes the display form of the button image. For example, the controller 52 changes the color or shape of the button image. In the example illustrated in FIG. 7, the controller 52 causes the button images 62, 64, and 66 to be displayed on the display such that the individual button images are distinguished from each other. For example, the controller 52 causes the button images 62, 64, and 66 to be displayed in different colors. For example, a button image representing a function that the target image forming apparatus 10 to be used has and that is available to the target user (for example, the button image 62 representing function A) is displayed in blue. A button image representing a function that the target image forming apparatus 10 to be used has and that is unavailable to the target user (for example, the button image 64 representing function B) is displayed in yellow. A button image representing a function that the target image forming apparatus 10 to be used does not have (for example, the button image 66 representing function C) is displayed in gray. Alternatively, the controller 52 may change the shapes of the button images 62, 64, and 66, or may change the fonts of the function display names. Of course, the display form may be changed in another method. Accordingly, the user may be able to recognize the availability of each function with enhanced visibility.

For example, if a target user designates the button image 62 representing function A by using the terminal apparatus 14 and provides an instruction to execute function A, execution instruction information representing the instruction to execute function A is transmitted from the terminal apparatus 14 to the image forming apparatus 10. The execution instruction information includes control data for executing function A, image data to be subjected to the process by function A, and so forth. In response to receipt of the execution instruction information, the image forming apparatus 10 executes function A in accordance with the execution instruction information. For example, if function A is a scan and transfer function, the image forming unit 18 of the image forming apparatus 10 executes a scan function to generate scan data (image data). The scan data is then transmitted from the image forming apparatus 10 to a destination that is set (for example, the terminal apparatus 14). If function A is a function that is implemented through cooperation between the image forming apparatus 10 and the server 12, a part of function A is executed by the image forming apparatus 10 and the other part of function A is executed by the server 12. For example, the image forming unit 18 of the image forming apparatus 10 executes a scan function to generate scan data, the scan data is transmitted from the image forming apparatus 10 to the server 12, the function execution unit 34 of the server 12 executes a character recognition function, and thereby character data is extracted from the scan data. The character data is transmitted from the server 12 to a destination that is set (for example, the terminal apparatus 14).

If the target user designates the button image 64 representing function B by using the terminal apparatus 14 and provides an instruction to purchase function B, the terminal apparatus 14 accesses the server 12. Accordingly, a screen for purchasing function B (for example, a website), which is information enabling the target user to use function B, is displayed on the UI unit 50 of the terminal apparatus 14. By taking a purchase procedure on the screen, the target user is permitted to use function B. If the target user provides an instruction to execute function B, function B is executed. Alternatively, as the information enabling the target user to use function B, a request-for-permission-to-use screen (for example, a website) for requesting use of function B to a manager or the like may be displayed on the UI unit 50. If the user requests permission to use function B to the manager or the like through the request-for-permission-to-use screen and if permission is obtained, the target user is able to use function B.

The function display screen may be displayed in another display form. For example, the housing of the image forming apparatus 10 may have an installation place where the terminal apparatus 14 is to be installed, and the display form (display design) of the function display screen may be changed in accordance with the installation manner of the terminal apparatus 14 installed in the installation place. For example, the housing of the image forming apparatus 10 has a recessed portion that has a shape corresponding to the shape of the terminal apparatus 14 and that is used as the installation place for the terminal apparatus 14. The recessed portion is vertically long or horizontally long. If the terminal apparatus 14 is installed in a vertically-long recessed portion, the terminal apparatus 14 is arranged vertically relative to the housing of the image forming apparatus 10. If the terminal apparatus 14 is installed in a horizontally-long recessed portion, the terminal apparatus 14 is arranged horizontally relative to the housing of the image forming apparatus 10. The display form of the function display screen is changed in accordance with the arrangement state.

Figure 8:
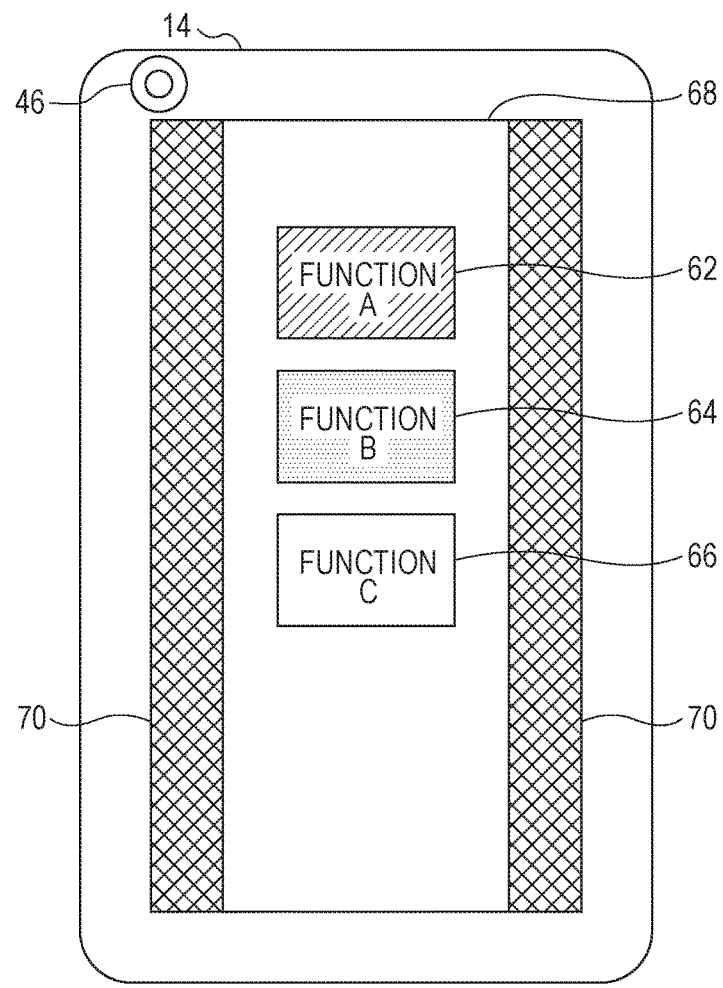
FIG. 8 is a diagram illustrating a function display screen displayed on the terminal apparatus.
Figure 9:
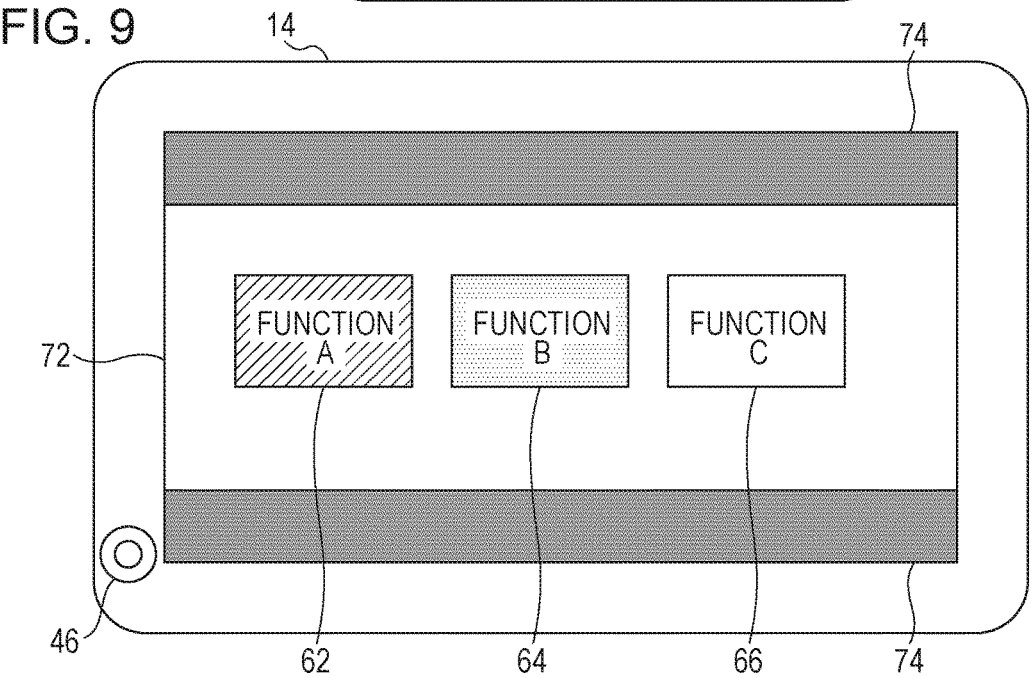
FIG. 9 is a diagram illustrating a function display screen displayed on the terminal apparatus.

FIG. 8 illustrates a function display screen 68 in a case where the terminal apparatus 14 is arranged vertically relative to the housing of the image forming apparatus 10, whereas FIG. 9 illustrates a function display screen 72 in a case where the terminal apparatus 14 is arranged horizontally relative to the housing of the image forming apparatus 10.

In the case of vertical arrangement, the controller 52 of the terminal apparatus 14 causes the display of the UI unit 50 to display the button images 62, 64, and 66 by vertically arranging them, as illustrated in FIG. 8. That is, the controller 52 causes the display of the UI unit 50 to display the button images 62, 64, and 66 by arranging them along the longitudinal direction of the terminal apparatus 14 that is vertically arranged. Also, the controller 52 may cause band-shaped images 70 along the longitudinal direction of the terminal apparatus 14 to be displayed in both side portions in the longitudinal direction of the function display screen 68.

In the case of horizontal arrangement, the controller 52 of the terminal apparatus 14 causes the display of the UI unit 50 to display the button images 62, 64, and 66 by horizontally arranging them, as illustrated in FIG. 9. That is, the controller 52 causes the display of the UI unit 50 to display the button images 62, 64, and 66 by arranging them along the longitudinal direction of the terminal apparatus 14 that is horizontally arranged. Also, the controller 52 may cause band-shaped images 74 along the longitudinal direction of the terminal apparatus 14 to be displayed in both side portions in the longitudinal direction of the function display screen 72. The images 74 have a color or design different from that of the images 70.

As described above, as a result of changing the display form (display design) of the function display screen in accordance with the installation manner of the terminal apparatus 14, the information displayed on the function display screen may be easily viewed compared to a case where the display form is fixed.

Figure 10:
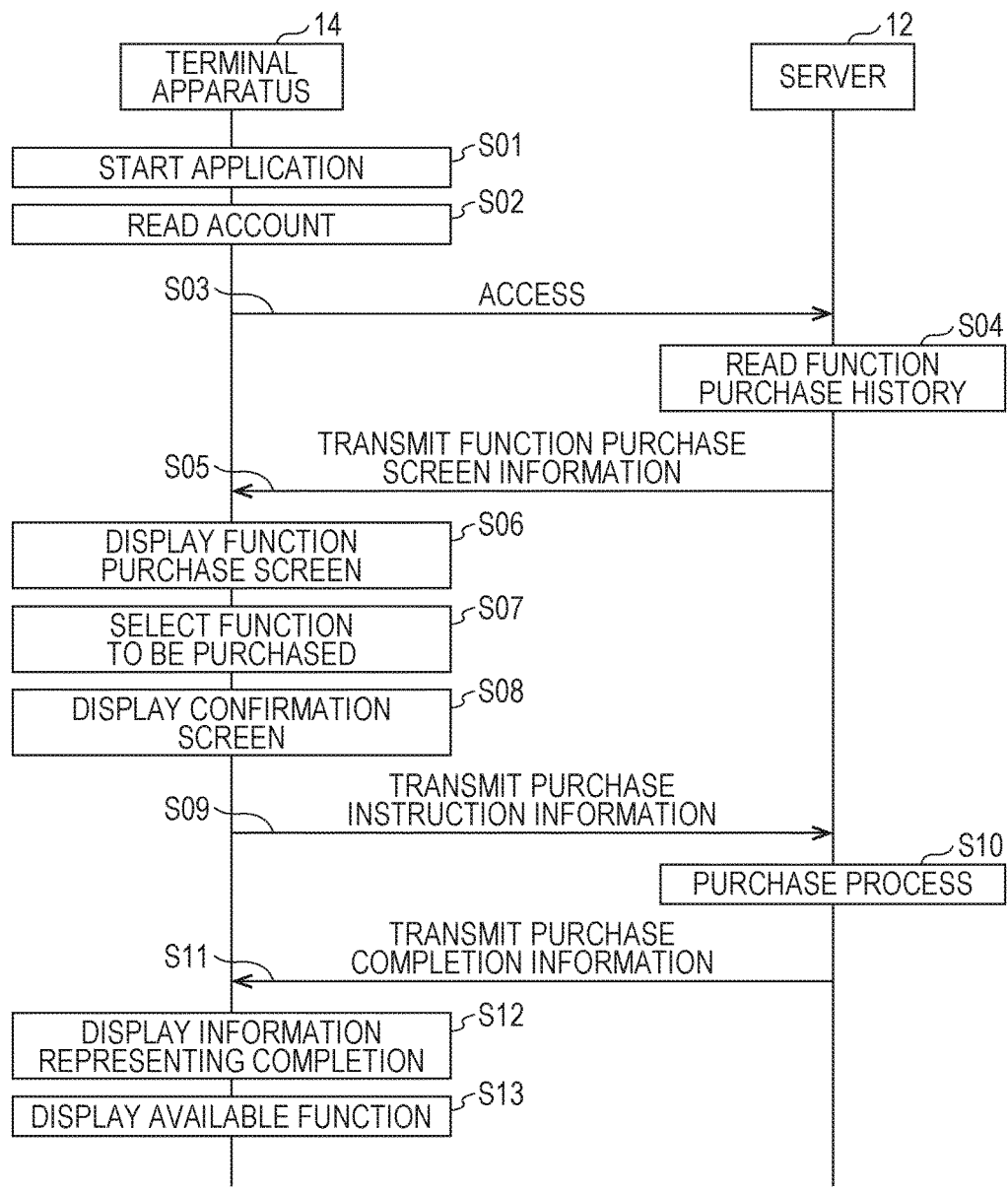
FIG. 10 is a sequence diagram illustrating a function purchase process.

Hereinafter, a process performed by the image forming system according to the first exemplary embodiment will be described in detail. First, a function purchase process will be described with reference to FIG. 10. FIG. 10 is a sequence diagram illustrating the function purchase process.

First, a target user who wants to purchase a function provides an instruction to start an application (program) for the function purchase process by using the terminal apparatus 14. The controller 52 of the terminal apparatus 14 starts the application in response to the instruction (S01). The application may be stored in the memory 48 of the terminal apparatus 14 in advance or may be downloaded from the server 12 or the like.

Subsequently, the controller 52 of the terminal apparatus 14 reads the user account information (user identification information) of the target user (S02). The user account information is stored, for example, in the memory 48 of the terminal apparatus 14 in advance. The controller 52 of the terminal apparatus 14 functions as an example of a user identifying unit, reads the user account information of the target user from the memory 48, and identifies the target user. In a case where pieces of user account information of plural users are stored in the memory 48, the target user designates his/her user account information by using the terminal apparatus 14. Accordingly, the user account information of the target user is read and the target user is identified. Alternatively, the controller 52 may identify the target user by reading the user account information of the user who has logged in to the terminal apparatus 14. In a case where only one piece of user account information is stored in the same terminal apparatus 14, the controller 52 may identify the target user by reading the user account information. If a user account is not set and if user account information is not created, initial setting is performed and thereby user account information is created.

Subsequently, the terminal apparatus 14 accesses the server 12 through the communication path N (S03). At this time, the terminal apparatus 14 transmits the user account information (user identification information) of the target user to the server 12.

In the server 12, the specifying unit 42 reads the function purchase history of the target user corresponding to the user account information (S04). Specifically, the specifying unit 42 specifies the pieces of function identification information of the individual functions associated with the user account information (user identification information) in the function purchase history information 32 stored in the memory 28 of the server 12. Accordingly, a group of functions purchased by the target user, that is, a group of functions available to the user, is specified.

Subsequently, the server 12 transmits, to the terminal apparatus 14 through the communication path N, function purchase screen information including the pieces of function identification information representing the individual functions that are on sale and the pieces of function identification information representing the individual functions that are available to the target user (the pieces of function identification information representing the individual functions purchased by the target user) (S05).

In the terminal apparatus 14, the controller 52 causes the display of the UI unit 50 of the terminal apparatus 14 to display a function purchase screen based on the function purchase screen information received from the server 12 (S06). For example, the function purchase screen 56 illustrated in FIG. 6A or the function purchase screen 58 illustrated in FIG. 6B is displayed. On the function purchase screen 56 or 58, information representing the detail of settings of a purchased function may be displayed.

The target user selects a function to be purchased on the function purchase screen 56 by using the terminal apparatus 14 (S07). The target user may change the detail of settings of a purchased function on the function purchase screen 56. For example, the target user selects a function and changes the detail of settings of the function by using the terminal apparatus 14.

When the function to be purchased is selected by the target user, the controller 52 of the terminal apparatus 14 causes the display of the UI unit 50 to display a confirmation screen (S08). If a purchase instruction is provided by the target user on the confirmation screen, the terminal apparatus 14 transmits purchase instruction information representing the purchase instruction to the server 12 through the communication path N (S09). The purchase instruction information includes the function identification information representing the function to be purchased. The display of the confirmation screen may be omitted. In this case, when a function to be purchased is selected in step S07 and then a purchase instruction is provided, purchase instruction information is transmitted from the terminal apparatus 14 to the server 12. If the detail of settings of a function is changed by the target user, the terminal apparatus 14 transmits information representing the detail of settings after the change to the server 12 through the communication path N.

In the server 12, a purchase process is executed (S10). In a case where the function to be purchased is a pay function, the purchase processing unit 38 executes a charging process. The purchase history management unit 40 updates the function purchase history information 32 about the target user. That is, the purchase history management unit 40 associates the function identification information representing the purchased function with the user identification information (user account information) of the target user in the function purchase history information 32. Accordingly, use of the purchased function is permitted. If the detail of settings of a function is changed by the target user, the purchase history management unit 40 changes the detail of settings of the function.

After the purchase process is completed, the server 12 transmits purchase completion information, indicating that the purchase process is completed, to the terminal apparatus 14 through the communication path N (S11). Accordingly, the information indicating that the purchase procedure is completed is displayed on the display of the UI unit 50 of the terminal apparatus 14 (S12). Subsequently, the function identification information representing the function that has become available through the purchase is displayed on the display of the UI unit 50 of the terminal apparatus 14 (S13). Alternatively, a function purchase screen is displayed on the display of the UI unit 50, and on the function purchase screen, the display form of the function that has become available through the purchase is changed from the display form indicating that the function is unavailable to the display form indicating that the function is available. For example, the color or shape of the button image representing the function is changed. If the detail of settings of the function is changed, the server 12 transmits, to the terminal apparatus 14 through the communication path N, procedure completion information indicating that the change process is completed. Accordingly, the information indicating that the change process is completed is displayed on the display of the UI unit 50 of the terminal apparatus 14.

Figure 11:
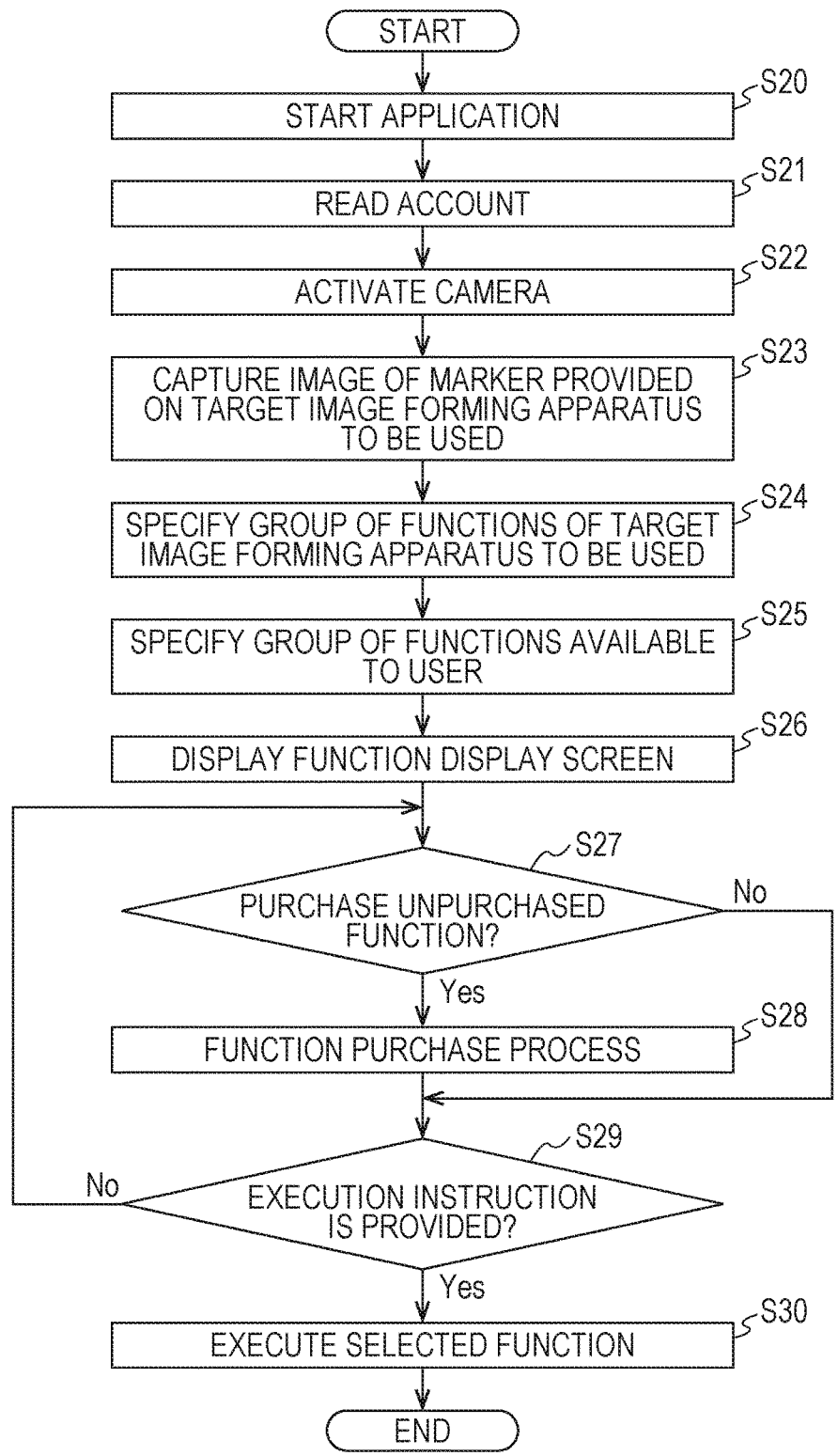
FIG. 11 is a flowchart illustrating a process of displaying a function display screen.

Next, a process of displaying a function display screen will be described with reference to FIG. 11. FIG. 11 illustrates a flowchart of the process. As an example, a description will be given of the case of recognizing the image forming apparatus 10 by using the marker-based AR technology.

A target user who wants to display the function display screen provides an instruction to start an application (program) for displaying the function display screen by using the terminal apparatus 14. The controller 52 of the terminal apparatus 14 starts the application in response to the instruction (S20). The application may be stored in the memory 48 of the terminal apparatus 14 in advance or may be downloaded from the server 12 or the like.

Subsequently, the controller 52 of the terminal apparatus 14 reads the user account information (user identification information) of the target user (S21). This reading process is the same as the above-described step S02.

Subsequently, the target user provides an instruction to activate the camera 46 by using the terminal apparatus 14. The controller 52 of the terminal apparatus 14 activates the camera 46 in response to the instruction (S22). The target user captures, by using the camera 46, an image of the marker 54 provided on the target image forming apparatus 10 to be used (S23). Accordingly, image data representing the marker 54 is generated.

Subsequently, a group of functions of the target image forming apparatus 10 to be used is specified (S24). For example, the image data representing the marker 54 is transmitted from the terminal apparatus 14 to the server 12, and a decoding process is performed on the image data in the server 12. Accordingly, the device identification information representing the target image forming apparatus 10 to be used is extracted. After the device identification information is extracted by the terminal apparatus 14, a group of available functions may be displayed on the UI unit 50 without additionally receiving input of an operation of specifying the target device (image forming apparatus 10) to be used from the user. Accordingly, an operation step of registering the target device to be used through operation input by the user is simplified, and the setting time is shortened. Alternatively, a decoding process may be performed on the image data by the terminal apparatus 14, and thereby the device identification information may be extracted. In this case, the device identification information extracted by the terminal apparatus 14 is transmitted from the terminal apparatus 14 to the server 12. In the server 12, the specifying unit 42 specifies the pieces of function identification information of the individual functions associated with the device identification information in the device function information 30. Accordingly, the group of functions of the target image forming apparatus 10 to be used is specified (recognized).

Also, a group of functions available to the target user is specified (S25). For example, the user account information (user identification information) of the target user is transmitted from the terminal apparatus 14 to the server 12. In the server 12, the specifying unit 42 specifies the pieces of function identification information of the individual functions associated with the user account information in the function purchase history information 32. Accordingly, a group of functions purchased by the target user, that is, a group of functions available to the target user, is specified (recognized).

Steps S24 and S25 may be simultaneously performed, or step S25 may be performed before step S24.

In the server 12, the controller 36 generates function display screen information representing a function display screen for displaying the group of functions of the target image forming apparatus 10 to be used and the group of functions available to the target user. The function display screen information is transmitted from the server 12 to the terminal apparatus 14. Accordingly, the function display screen is displayed on the display of the UI unit 50 of the terminal apparatus 14 (S26). On the function display screen, the pieces of function identification information of the individual functions of the target image forming apparatus 10 to be used and the pieces of function identification information of the individual functions available to the target user are displayed. Also, the pieces of function identification information representing the individual functions that are on sale and that the target image forming apparatus 10 to be used does not have may be displayed on the function display screen. For example, the function display screen 60 illustrated in FIG. 7 is displayed on the display of the UI unit 50.

If an unpurchased function is selected by the target user and a purchase instruction is provided on the function display screen 60 (YES in S27), a purchase process for the selected function is executed (S28). Accordingly, the purchased function becomes available. If a purchase instruction is not provided (NO in S27), the process proceeds to step S29.

If a function that the target image forming apparatus 10 to be used has and that is available to the target user (purchased function) is selected by the target user and an execution instruction is provided (YES in S29), the selected function is executed (S30). In a case where the selected function is executed by the image forming apparatus 10, execution instruction information representing the instruction to execute the function is transmitted from the terminal apparatus 14 to the image forming apparatus 10, and the function is executed by the image forming apparatus 10. In a case where the selected function is executed through cooperation between the image forming apparatus 10 and the server 12, a part of the selected function is executed by the image forming apparatus 10, and the other part of the selected function is executed by the server 12. At this time, control data and data to be processed are transmitted and received among the image forming apparatus 10, the server 12, and the terminal apparatus 14 in order to execute the selected function.

If a function execution instruction is not provided by the target user (NO in S29), the process returns to step S27.

Figure 12:
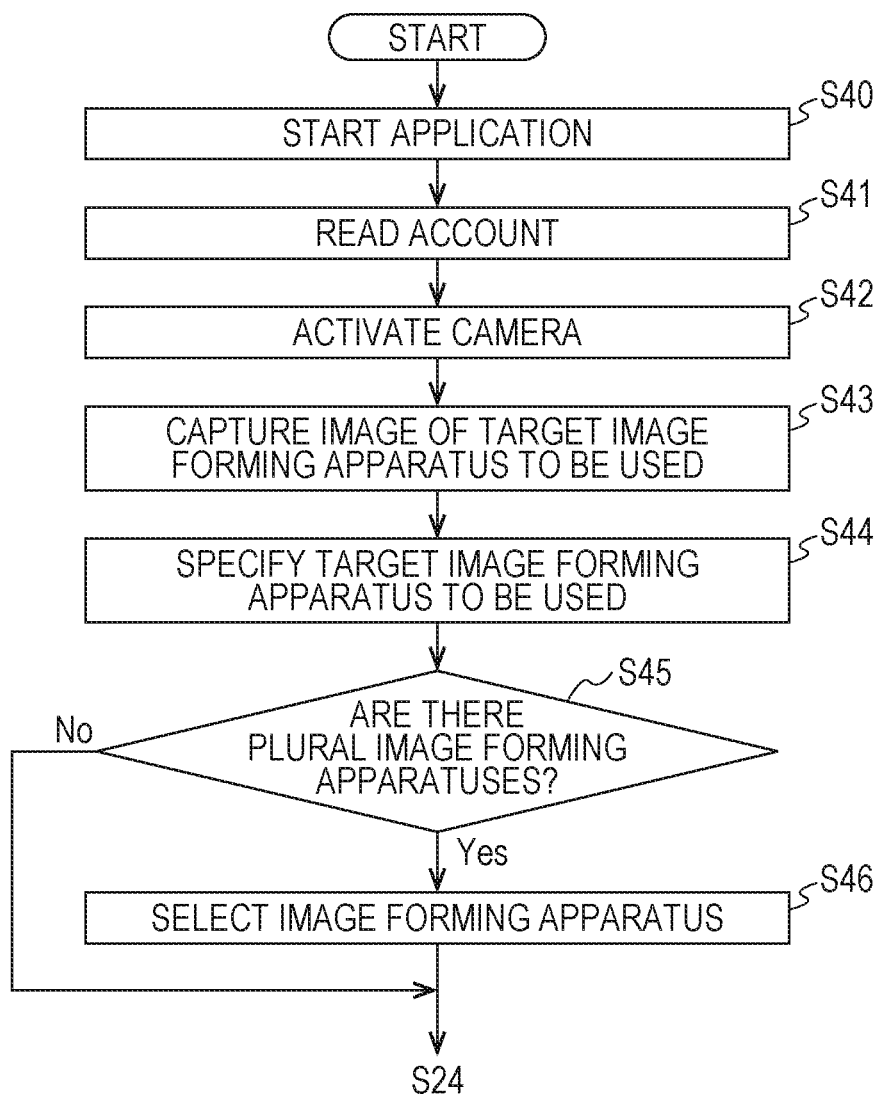
FIG. 12 is a flowchart illustrating a process of displaying a function display screen.

Hereinafter, another process of displaying a function display screen will be described with reference to FIG. 12. FIG. 12 illustrates a flowchart of the process. As an example, a description will be given of the case of recognizing the image forming apparatus 10 by using the markerless AR technology.

First, in the terminal apparatus 14, an application for the process of displaying a function display screen is started (S40), the user account information (user identification information) of a target user who wants to display the function display screen is read (S41), and the camera 46 is activated (S42).

Subsequently, the target user captures an image of the whole appearance or part of the appearance of the target image forming apparatus 10 to be used by using the camera 46 (S43). Accordingly, appearance image data representing the whole appearance or part of the appearance of the target image forming apparatus 10 to be used is generated.

Subsequently, the target image forming apparatus 10 to be used is specified (S44). For example, the appearance image data is transmitted from the terminal apparatus 14 to the server 12. In the server 12, the appearance image data of individual image forming apparatuses 10 included in the appearance image correspondence information is compared with the appearance image data received from the terminal apparatus 14, and thereby the device identification information of the target image forming apparatus 10 to be used is specified.

As a result of the comparison, if plural image forming apparatuses 10 are not specified and if one image forming apparatus 10 is specified (NO in S45), the process proceeds to step S24 illustrated in FIG. 11.

On the other hand, if plural image forming apparatuses 10 are specified (YES in S45), the target user selects the target image forming apparatus 10 to be used from among the plural image forming apparatuses 10 (S46). For example, the pieces of device identification information of the individual specified image forming apparatuses 10 are transmitted from the server 12 to the terminal apparatus 14 and are displayed on the UI unit 50 of the terminal apparatus 14. The target user selects the piece of device identification information of the target image forming apparatus 10 to be used from among the plural pieces of device identification information by using the terminal apparatus 14. The piece of device identification information selected by the target user is transmitted from the terminal apparatus 14 to the server 12. Subsequently, the process proceeds to step S24 illustrated in FIG. 11.

The process from step S24 is the same as that described above with reference to FIG. 11, and thus the description thereof is omitted.

Figure 13:
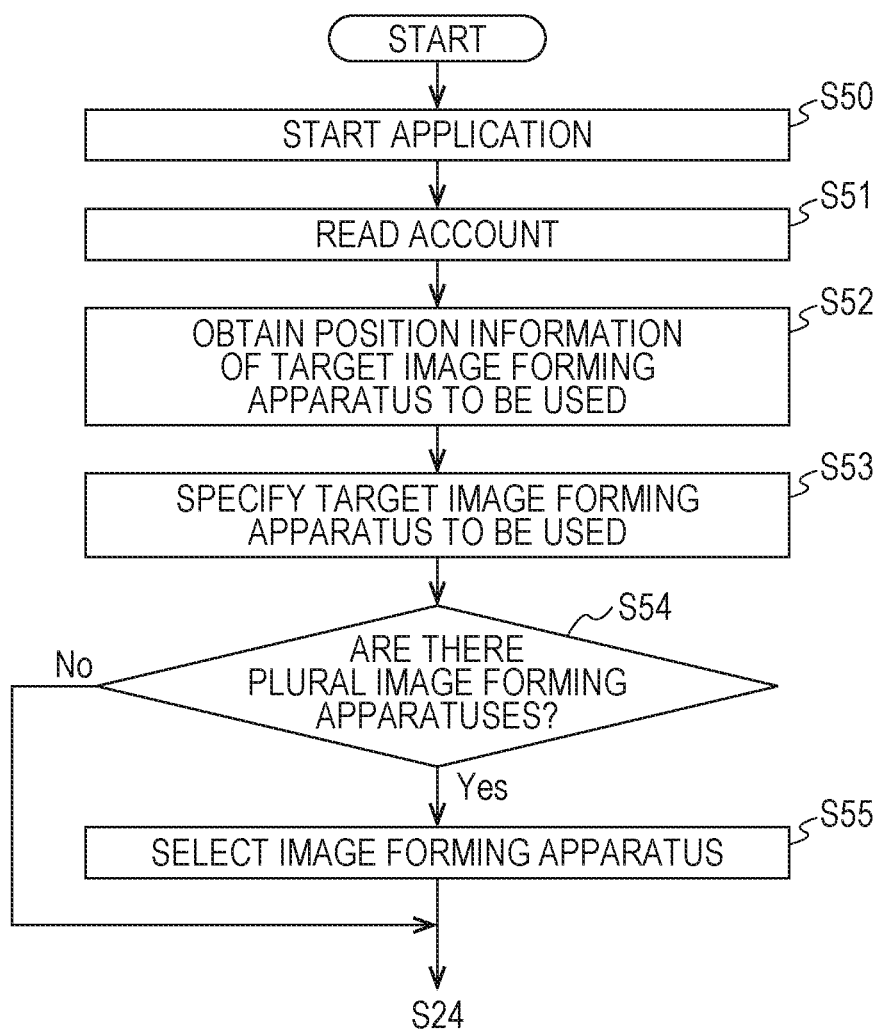
FIG. 13 is a flowchart illustrating a process of displaying a function display screen.

Hereinafter, another process of displaying a function display screen will be described with reference to FIG. 13. FIG. 13 illustrates a flowchart of the process. As an example, a description will be given of the case of recognizing the image forming apparatus 10 by using the position information AR technology.

First, in the terminal apparatus 14, an application for the process of displaying a function display screen is started (S50), and the user account information (user identification information) of a target user who wants to display the function display screen is read (S51).

Subsequently, the terminal apparatus 14 obtains the position information of the target image forming apparatus 10 to be used (S52). For example, each image forming apparatus 10 has a GPS function and obtains the position information of the image forming apparatus 10. The terminal apparatus 14 transmits information representing a request for obtaining position information to the target image forming apparatus 10 to be used, and receives, as a response to the request, the position information of the image forming apparatus 10 from the image forming apparatus 10.

Subsequently, the target image forming apparatus 10 to be used is specified (S53). For example, the position information of the target image forming apparatus 10 to be used is transmitted from the terminal apparatus 14 to the server 12. In the server 12, the position information of individual image forming apparatuses 10 included in the position correspondence information is compared with the position information received from the terminal apparatus 14, and thereby the device identification information of the target image forming apparatus 10 is specified.

As a result of the comparison, if plural image forming apparatuses 10 are not specified and if one image forming apparatus 10 is specified (NO in S54), the process proceeds to step S24 illustrated in FIG. 11.

On the other hand, if plural image forming apparatuses 10 are specified (YES in S54), the target user selects the target image forming apparatus 10 to be used from among the plural image forming apparatuses 10 (S55). The device identification information of the image forming apparatus 10 selected by the target user is transmitted from the terminal apparatus 14 to the server 12. Subsequently, the process proceeds to step S24 illustrated in FIG. 11.

The process from step S24 is the same as that described above with reference to FIG. 11, and thus the description thereof is omitted.

As described above, according to the first exemplary embodiment, the target image forming apparatus 10 to be used is specified by applying the AR technologies, and the pieces of function identification information representing the group of functions of the image forming apparatus 10 and the pieces of function identification information representing the group of functions available to the target user are displayed on the terminal apparatus 14. Accordingly, even if the functions of the target image forming apparatus 10 to be used are not recognizable from its appearance, the user may be able to easily recognize the functions of the target image forming apparatus 10 and also may be able to easily recognize whether or not the target image forming apparatus 10 has a function available to the user.

According to the first exemplary embodiment, in an environment where plural devices (for example, plural image forming apparatuses 10) are used by plural users, information about functions is appropriately displayed on the terminal apparatus 14 of each user. For example, even if a user interface such as a touch screen is removed from a device such as the image forming apparatus 10, the terminal apparatus 14 is used as the user interface thereof, and information about functions corresponding to each user is appropriately displayed on the terminal apparatus 14 of the user. In another case, for example, if the user temporarily uses a device on the go, a user interface suitable for the user, that is, a user interface that displays information about functions available to the user, is implemented by the terminal apparatus 14.

In the examples illustrated in FIGS. 11, 12, and 13, the target device (image forming apparatus 10) to be used is identified after user account information is read and a user is identified. Alternatively, user account information may be read and a user may be identified after the target device (image forming apparatus 10) to be used is identified. In the case of applying the marker-based AR technology or the markerless AR technology, a device (image forming apparatus 10) is identified after the user goes to the device and captures an image of the device by using a camera. In such a case, a process may be efficiently executed by identifying the user first and then identifying the device to be used.

Hereinafter, modifications of the first exemplary embodiment will be described.

If a target function to be executed is selected in advance by a target user, the controller 52 of the terminal apparatus 14 may cause the display of the UI unit 50 to display the device identification information of the image forming apparatus 10 that has the target function. For example, the controller 52 of the terminal apparatus 14 obtains, in response to an instruction from a target user, the function purchase history information 32 about the target user from the server 12, and causes the display of the UI unit 50 to display the pieces of function identification information representing the individual functions purchased by the target user, that is, the pieces of function identification information representing the individual functions available to the target user. For example, button images representing the individual functions available to the target user are displayed as the pieces of function identification information on the display. Subsequently, the target user selects a target function to be executed from among the group of functions available to the target user. For example, the target user selects the function identification information (button image) representing the target function to be executed from a group of pieces of function identification information (for example, a group of button images) displayed on the display. Accordingly, the function identification information selected by the target user is transmitted from the terminal apparatus 14 to the server 12. In the server 12, the specifying unit 42 specifies the device identification information associated with the function identification information selected by the target user in the device function information 30. Accordingly, the image forming apparatus 10 that has the function selected by the target user is specified. At this time, one or plural image forming apparatuses 10 may be selected. The device identification information specified by the specifying unit 42 is transmitted from the server 12 to the terminal apparatus 14 and is displayed on the display of the UI unit 50 of the terminal apparatus 14. Accordingly, the target user may be able to easily recognize which image forming apparatus 10 has the target function to be executed.

Alternatively, the position information of the image forming apparatus 10 that has the target function to be executed may be transmitted from the server 12 to the terminal apparatus 14 and may be displayed on the display of the UI unit 50 of the terminal apparatus 14. For example, the controller 52 of the terminal apparatus 14 may cause the display of the UI unit 50 to display a map and may superimpose, on the map, information (for example, an image of a mark) representing the image forming apparatus 10 that has the target function to be executed. Accordingly, the target user may be able to easily recognize where the image forming apparatus 10 that has the target function to be executed is installed.

As another modification example, if a target function to be executed is selected in advance by a target user and if the target image forming apparatus 10 to be used has the target function, the controller 52 of the terminal apparatus 14 may cause the target image forming apparatus 10 to execute the target function. In this case, the controller 52 functions as an example of an execution controller. For example, as described in the above example, the controller 52 of the terminal apparatus 14 causes the display of the UI unit 50 to display the pieces of function identification information (for example, button images) representing the individual functions available to the target user. Subsequently, the target user selects the piece of function identification information (button image) representing the target function to be executed from among the group of pieces of function identification information (a group of button images) displayed on the display. On the other hand, the target image forming apparatus 10 to be used is specified by applying the AR technologies, and the pieces of function identification information representing the individual functions of the target image forming apparatus 10 to be used are transmitted from the server 12 to the terminal apparatus 14. If the piece of function identification information representing the target function to be executed is included in the pieces of function identification information representing the individual functions of the target image forming apparatus 10 to be used, that is, if the target image forming apparatus 10 has the target function, the controller 52 of the terminal apparatus 14 transmits information representing an instruction to execute the target function to the target image forming apparatus 10. At this time, control data for executing the target function and so forth is transmitted from the terminal apparatus 14 to the image forming apparatus 10. In response to the information representing the execution instruction, the image forming apparatus 10 executes the target function. Accordingly, an operation of selecting a function by the target user may be simplified compared to the case of selecting a function that is available to the target user and that is a target to be executed from among the group of functions of the target image forming apparatus 10 to be used.

As still another modification example, the display of the UI unit 50 of the terminal apparatus 14 may display information about the UI unit 22 of the image forming apparatus 10 by expanding the information. For example, the controller 52 of the terminal apparatus 14 changes the information displayed on the UI unit 50 in accordance with an operation performed on the UI unit 22 of the image forming apparatus 10. For example, with the cooperation between the hardware user interface unit (hardware UI unit) of the target image forming apparatus 10 to be used and the software user interface unit (software UI unit) implemented by the UI unit 50 of the terminal apparatus 14, a user interface unit for the target image forming apparatus 10 to be used is implemented. As described above, the hardware UI unit of the image forming apparatus 10 is a numeric keypad, a direction indication keypad, or the like. Also, the software UI unit is implemented by displaying the pieces of function identification information representing the individual functions of the target image forming apparatus 10 to be used and the pieces of function identification information representing the individual functions that are permitted to be used by the target user on the UI unit 50 of the terminal apparatus 14. For example, the terminal apparatus 14 transmits information representing a connection request to the image forming apparatus 10 and thereby communication between the terminal apparatus 14 and the image forming apparatus 10 is established. In this state, information representing an instruction provided by using the software UI unit of the terminal apparatus 14 is transmitted from the terminal apparatus 14 to the target image forming apparatus 10 to be used, and information representing an instruction provided by using the hardware UI unit of the target image forming apparatus 10 to be used is transmitted from the target image forming apparatus 10 to the terminal apparatus 14. For example, if a target user operates a numeric keypad or direction indication keypad that forms the hardware UI unit, the information representing the operation is transmitted from the target image forming apparatus 10 to the terminal apparatus 14. The controller 52 of the terminal apparatus 14 functions as an example of an operation controller and thereby implements the operation on the software UI unit. Accordingly, the software UI unit is operated by using the hardware UI unit. For example, if a target user operates the hardware UI unit to select function identification information (for example, a button image) displayed on the software UI unit and to provide an execution instruction, information representing the execution instruction is transmitted from the terminal apparatus 14 to the target image forming apparatus 10 to be used and the function is executed. In this way, as a result of implementing the UI unit of the image forming apparatus 10 through cooperation between the hardware UI unit provided in the image forming apparatus 10 and the software UI unit displayed on the terminal apparatus 14, the operability of the UI unit may increase compared to the case of using only the user interface of one device, for example, the user interface of the image forming apparatus 10 or the terminal apparatus 14. Alternatively, a fax number or the like may be input by using the hardware UI unit, or a preview screen of image data may be displayed on the software UI unit.

As still another modification example, pieces of setting information on individual users may be stored in an external apparatus (for example, the terminal apparatus 14 or the server 12) other than the image forming apparatus 10, instead of the image forming apparatus 10. The individual setting information may include, for example, the name, address, telephone number, fax number, and email address of the user, the address of the terminal apparatus 14, fax destinations managed by the user, and an email address list. For example, it is assumed that the setting information is stored in the terminal apparatus 14. In a case where a function is executed in the target image forming apparatus 10 by using the setting information, the setting information is transmitted from the terminal apparatus 14 that has provided an instruction to execute the function to the target image forming apparatus 10. For example, in a case where facsimile transmission is performed in the target image forming apparatus 10, information representing the fax number to be used for the facsimile transmission is transmitted from the terminal apparatus 14 that has provided an instruction to perform facsimile transmission to the target image forming apparatus 10. The target image forming apparatus 10 performs facsimile transmission by using the fax number received from the terminal apparatus 14. As another example, in the case of executing a scan and transfer function, the terminal apparatus 14 transmits the address information representing the destination of image data to the target image forming apparatus 10. The image forming apparatus 10 executes the scan function to generate image data and transmits the image data to the destination represented by the address information. In this way, when the setting information is not stored in the image forming apparatus 10, leakage of the setting information from the image forming apparatus 10 may be prevented or suppressed. Accordingly, the security for the setting information in the image forming apparatus 10 may be increased compared to the case of storing the setting information in the image forming apparatus 10. In the above-described example, the setting information is stored in the terminal apparatus 14, but the setting information may be stored in the server 12. In this case, the terminal apparatus 14 may obtain the setting information by accessing the server 12, or the image forming apparatus 10 may obtain the setting information by accessing the server 12.

Second Exemplary Embodiment

Figure 14:
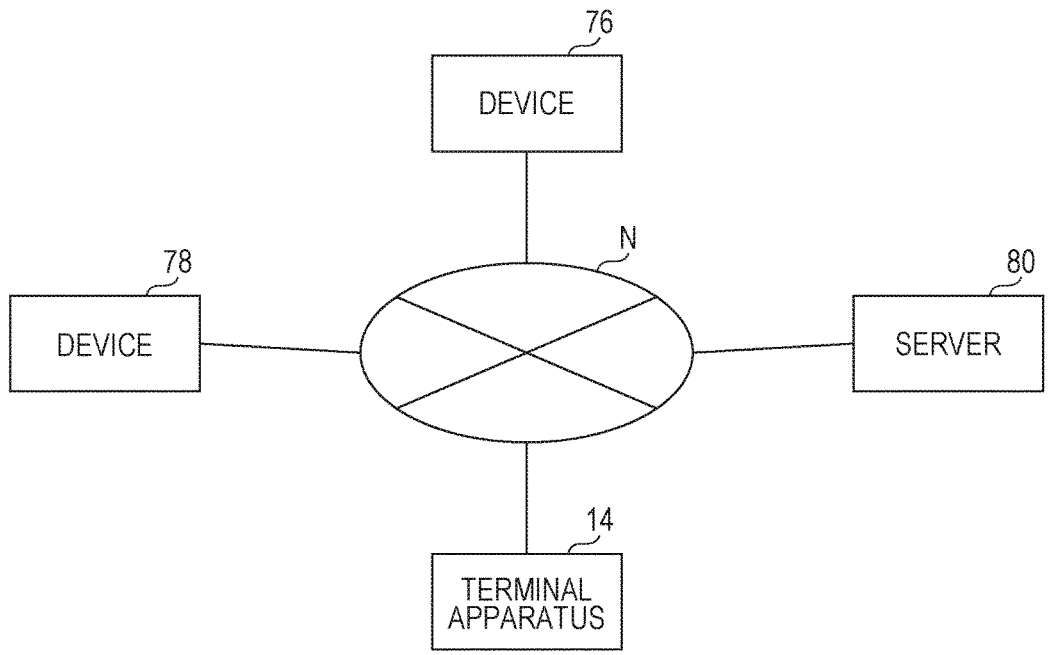
FIG. 14 is a block diagram illustrating an image forming system according to a second exemplary embodiment of the present invention.

Hereinafter, an image forming system serving as an information processing system according to a second exemplary embodiment of the present invention will be described with reference to FIG. 14. FIG. 14 illustrates an example of the image forming system according to the second exemplary embodiment. The image forming system according to the second exemplary embodiment includes plural devices (for example, devices 76 and 78), a server 80, and a terminal apparatus 14. The devices 76 and 78, the server 80, and the terminal apparatus 14 are connected to each other through a communication network N such as a network. In the example illustrated in FIG. 14, two devices (devices 76 and 78) are included in the image forming system, but three or more devices may be included in the image forming system. Also, plural servers 80 and plural terminal apparatuses 14 may be included in the image forming system.

Each of the devices 76 and 78 is an apparatus that has a specific function, for example, the image forming apparatus 10 according to the first exemplary embodiment, a personal computer (PC), a display apparatus such as a projector, a telephone, a clock, or a monitoring camera. Each of the devices 76 and 78 has a function of transmitting data to and receiving data from another apparatus.

The server 80 is an apparatus that manages cooperative functions that are executed through cooperation between plural devices. The server 80 has a function of transmitting data to and receiving data from another apparatus.

The terminal apparatus 14 has the same configuration as that of the terminal apparatus 14 according to the first exemplary embodiment and functions as, for example, a user interface unit (UI unit) of a device when the device is used.

In the image forming system according to the second exemplary embodiment, plural devices are specified as target devices that cooperate with each other, and one or plural functions that are executed through cooperation between the plural devices are specified.

Figure 15:
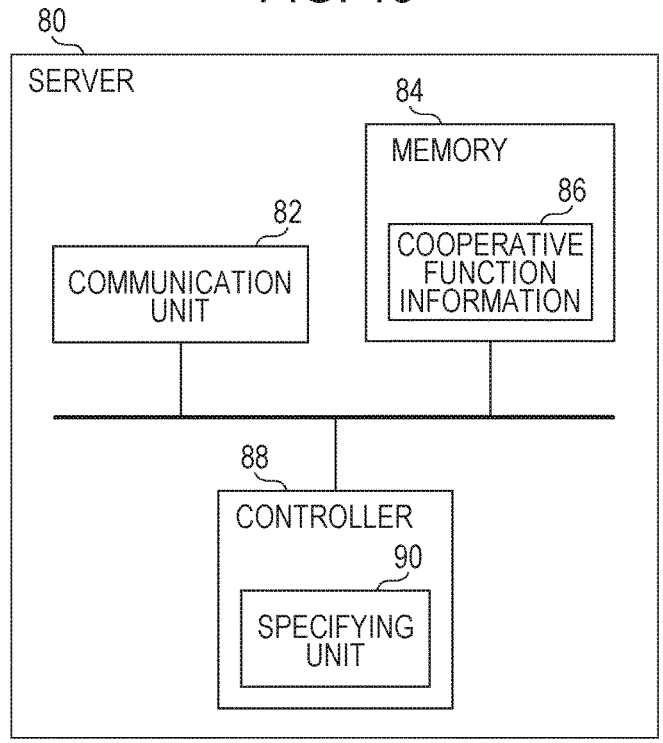
FIG. 15 is a block diagram illustrating a server according to the second exemplary embodiment.

Hereinafter, the configuration of the server 80 will be described in detail with reference to FIG. 15. FIG. 15 illustrates the configuration of the server 80.

A communication unit 82 is a communication interface and has a function of transmitting data to another apparatus through the communication path N and a function of receiving data from another apparatus through the communication path N. The communication unit 82 may be a communication interface having a wireless communication function or may be a communication interface having a wired communication function.

A memory 84 is a storage apparatus such as a hard disk or an SSD. The memory 84 stores cooperative function information 86, various pieces of data, various programs, and so forth. Of course, these pieces of information and data may be stored in different storage apparatuses or in one storage apparatus. The cooperative function information 86 stored in the memory 84 may be periodically provided to the terminal apparatus 14, so that the information stored in the memory 48 of the terminal apparatus 14 may be updated. Hereinafter, the cooperative function information 86 will be described.

The cooperative function information 86 is information representing cooperative functions that are executed through cooperation between plural devices. For example, the cooperative function information 86 is information representing, for each cooperative function, the correspondence between a combination of pieces of device identification information for identifying individual devices that cooperate with each other to execute the cooperative function and cooperative function identification information for identifying the cooperative function. The device identification information includes, for example, like the device identification information according to the first exemplary embodiment, a device ID, a device name, information representing the type of a device, model number, position information, and so forth. The cooperative function identification information includes, for example, a cooperative function ID and a cooperative function name. A cooperative function may be a function executed through cooperation between plural devices that have different functions or may be a function executed through cooperation between plural devices that have the same functions. For example, a cooperative function is a function that is not available without cooperation. The function that is not available without cooperation may be a function that becomes available by combining the same functions or different functions among the functions of target devices that cooperate with each other. For example, the cooperation between a device having a print function (printer) and a device having a scan function (scanner) implements a copy function. That is, the cooperation between the print function and the scan function implements the copy function. In this case, the copy function is associated with the combination of the print function and the scan function. In the cooperative function information 86, the cooperative function identification information for identifying the copy function as a cooperative function is associated with the combination of the device identification information for identifying the device having the print function and the device identification information for identifying the device having the scan function. Plural devices that execute a cooperative function are specified by referring to the cooperative function information 86.

A controller 88 controls the operations of the individual units of the server 80. The controller 88 includes a specifying unit 90.

The specifying unit 90 receives the pieces of device identification information for identifying individual target devices that cooperate with each other, and specifies the cooperative function identification information of a cooperative function associated with the combination of the pieces of device identification information in the cooperative function information 86 stored in the memory 84. Accordingly, the cooperative function that is executed through cooperation between the target devices is specified (recognized). For example, plural pieces of device identification information are transmitted from the terminal apparatus 14 to the server 80, and the specifying unit 90 specifies the cooperative function identification information of a cooperative function associated with the plural pieces of device identification information. The cooperative function identification information of the cooperative function (for example, information representing the name of the cooperative function) is transmitted from the server 80 to the terminal apparatus 14 and is displayed on the terminal apparatus 14. Accordingly, the cooperative function identification information of the cooperative function that is executed by the plural devices specified by the plural pieces of device identification information is displayed on the terminal apparatus 14.

The above-described cooperative function information 86 may be stored in the memory 48 of the terminal apparatus 14. In this case, the cooperative function information 86 is not necessarily stored in the memory 84 of the server 80. The controller 52 of the terminal apparatus 14 may include the above-described specifying unit 90 and may specify a cooperative function on the basis of plural pieces of device identification information. In this case, the server 80 does not necessarily include the specifying unit 90.

In the second exemplary embodiment, for example, the pieces of device identification information of target devices that cooperate with each other are obtained and the target devices are specified (recognized) by applying the AR technologies. As in the first exemplary embodiment, the marker-based AR technology, the markerless AR technology, the position information AR technology, and the like are used as the AR technologies.

In a case where the marker-based AR technology is used, an image of a marker, such as a two-dimensional barcode, provided on a target device that cooperates (for example, the marker 54 provided on the image forming apparatus 10) is captured by using the camera 46 of the terminal apparatus 14 and thereby image data representing the marker (for example, image data representing the marker 54) is generated. The image data is transmitted from the terminal apparatus 14 to the server 80, for example. In the server 80, the controller 88 performs a decoding process on the marker image represented by the image data and thereby extracts device identification information. Accordingly, the device identification information of the target device is obtained. By capturing images of markers of individual devices that cooperate with each other, the pieces of device identification information of the individual devices are obtained and accordingly a cooperative function is specified. Alternatively, the controller 52 of the terminal apparatus 14 may perform a decoding process and thereby extract device identification information.

In a case where the markerless AR technology is used, an image of the whole appearance or part of the appearance of a target device that cooperates is captured by using the camera 46 of the terminal apparatus 14. Of course, it is useful to obtain information for specifying the target device, such as the name (for example, the trade name) or model number of the device, by capturing an image of the appearance of the device. As a result of the capturing, appearance image data representing the whole appearance or part of the appearance of the target device is generated. The appearance image data is transmitted from the terminal apparatus 14 to the server 80, for example. In the server 80, the controller 88 compares the appearance image data received from the terminal apparatus 14 with each piece of appearance image data included in the appearance image correspondence information, and specifies the device identification information of the target device on the basis of the comparison result, as in the first exemplary embodiment. Accordingly, the target device that cooperates is specified. As another example, in a case where an image showing the name (for example, the trade name) or model number of the device is captured and appearance image data representing the name or model number is generated, the target device that cooperates may be specified on the basis of the name or model number represented by the appearance image data. As a result of capturing an image of the appearance of individual target devices that cooperate with each other, the pieces of device identification information of the individual devices are obtained and thereby a cooperative function is specified. Alternatively, the controller 52 of the terminal apparatus 14 may specify the pieces of device identification information of the target devices that cooperate with each other by applying the markerless AR technology.

In a case where the position information AR technology is used, for example, device position information representing the position of a target device that cooperates is obtained by using a GPS function. The terminal apparatus 14 obtains the device position information of the target device as in the first exemplary embodiment. The device position information is transmitted from the terminal apparatus 14 to the server 80, for example. In the server 80, the controller 88 specifies the device identification information of the target device by referring to the position correspondence information, as in the first exemplary embodiment. Accordingly, the target device that cooperates is specified. As a result of obtaining pieces of device position information of the individual target devices that cooperate with each other, the pieces of device identification information of the individual devices are obtained and thereby a cooperative function is specified. Alternatively, the controller 52 of the terminal apparatus 14 may specify the pieces of device identification information of the target devices that cooperate with each other by applying the position information AR technology.

Hereinafter, a description will be given of a method for causing plural devices to cooperate with each other by applying the AR technologies.

Figure 16:
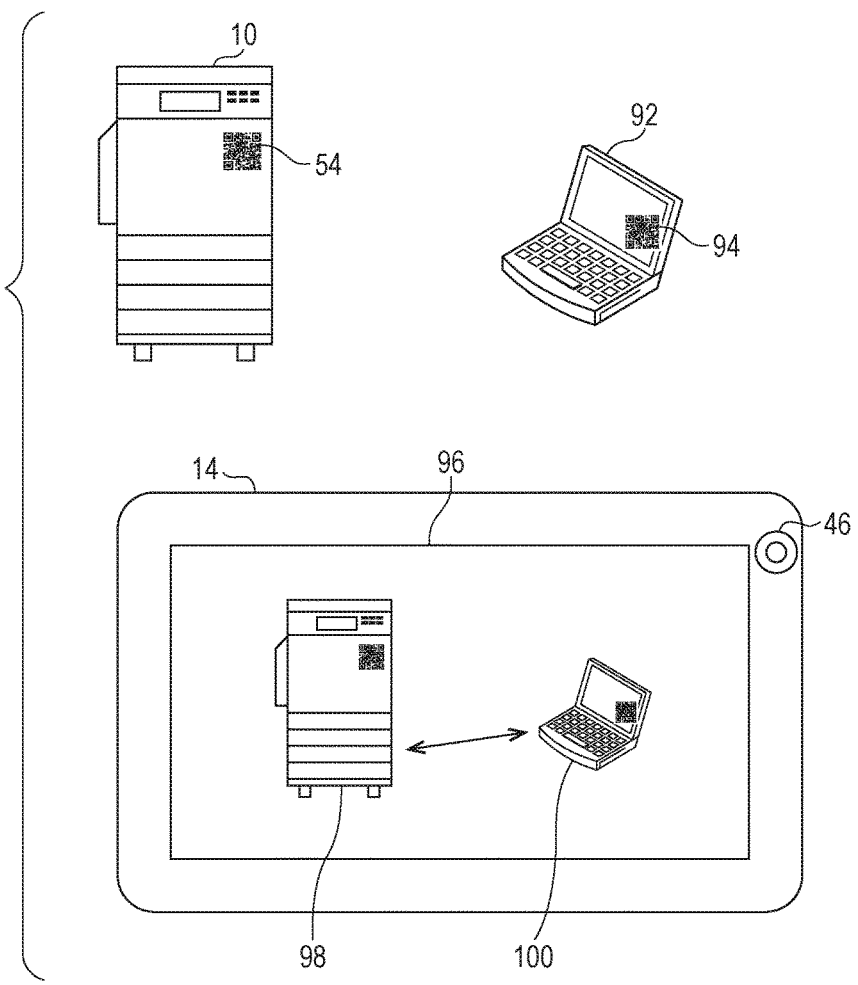
FIG. 16 is a schematic diagram illustrating target devices that cooperate with each other.

With reference to FIG. 16, a description will be given of a method for causing plural devices to cooperate with each other by applying the marker-based AR technology or the markerless AR technology. FIG. 16 illustrates an example of target devices that cooperate with each other. As an example, the image forming apparatus 10 according to the first exemplary embodiment is used as the target device 76, and a PC 92 is used as the target device 78. For example, the marker 54 such as a two-dimensional barcode is provided on the housing of the image forming apparatus 10, and a marker 94 such as a two-dimensional barcode is provided on the housing of the PC 92. The marker 94 is information obtained by coding the device identification information of the PC 92. In the case of obtaining the pieces of device identification information of the image forming apparatus 10 and the PC 92 by using the marker-based AR technology or the markerless AR technology, the user captures an image of the image forming apparatus 10 and the PC 92, which are the target devices that cooperate with each other, by using the camera 46 of the terminal apparatus 14. In the example illustrated in FIG. 16, an image of both the image forming apparatus 10 and the PC 92 is captured in a state where both the image forming apparatus 10 and the PC 92 are within the field of view of the camera 46. Accordingly, image data representing the markers 54 and 94 is generated and the image data is transmitted from the terminal apparatus 14 to the server 80. In the server 80, the controller 88 performs a decoding process on the image data to extract the device identification information of the image forming apparatus 10 and the device identification information of the PC 92. Alternatively, appearance image data representing the appearances of both the image forming apparatus 10 and the PC 92 may be generated and the appearance image data may be transmitted from the terminal apparatus 14 to the server 80. In this case, in the server 80, the controller 88 specifies the device identification information of the image forming apparatus 10 and the device identification information of the PC 92 by referring to the appearance image correspondence information. After the pieces of device identification information are specified, the specifying unit 90 specifies the cooperative function identification information associated with the combination of the device identification information of the image forming apparatus 10 and the device identification information of the PC 92 in the cooperative function information 86. Accordingly, a cooperative function that is executed through cooperation between the image forming apparatus 10 and the PC 92 is specified. The cooperative function identification information representing the cooperative function is transmitted from the server 80 to the terminal apparatus 14 and is displayed on the UI unit 50 of the terminal apparatus 14. If the user provides an instruction to execute the cooperative function by using the terminal apparatus 14, the cooperative function is executed. Alternatively, the process of specifying the device identification information and the process of specifying the cooperative function may be performed by the terminal apparatus 14.

The target devices that cooperate with each other may be designated by a user operation. For example, by capturing images of the image forming apparatus 10 and the PC 92 by using the camera 46, a device image 98 representing the image forming apparatus 10 and a device image 100 representing the PC 92 are displayed on a screen 96 of the display of the terminal apparatus 14, as illustrated in FIG. 16. The image data related to identified devices displayed on the terminal apparatus 14 when the user designates the target devices that cooperate with each other may be images (having an original size at the capturing or an increased or decreased size) of the devices captured by the camera 46, or may be appearance image data that is related to the identified devices and that is prepared in advance (not images obtained through capturing but schematic images). For example, in the case of using image data obtained by capturing an image of a device, the appearance of the device in a current state (for example, an appearance including a scratch, note, sticker attached to the device, and so forth) is reflected in the image, and thus the user may be able to visually recognize the difference from another device of the same type more clearly. The user designates the device images 98 and 100 on the screen 96 and thereby designates the image forming apparatus 10 and the PC 92 as the target devices that cooperate with each other. For example, if the user designates the device image 98, the marker-based AR technology or the markerless AR technology is applied to the device image 98 and thereby the device identification information of the image forming apparatus 10 is specified. Likewise, if the user designates the device image 100, the marker-based AR technology or the markerless AR technology is applied to the device image 100 and thereby the device identification information of the PC 92 is specified. Accordingly, a cooperative function that is executed by the image forming apparatus 10 and the PC 92 is specified, and the cooperative function identification information representing the cooperative function is displayed on the UI unit 50 of the terminal apparatus 14.

The user may touch the device image 98 on the screen 96 by using, for example, his/her finger, and may move the finger to the device image 100 as indicated by an arrow illustrated in FIG. 16, so as to designate the device images 98 and 100 and thereby designate the image forming apparatus 10 and the PC 92 as the target devices that cooperate with each other. The order in which the user touches the device images 98 and 100 or the movement direction of the finger may be opposite to the above-described example. Of course, an indication unit that is moved on the screen 96 other than the finger, such as a pen, may be used. Furthermore, the target devices that cooperate with each other may be specified by drawing circles thereon, instead of simply moving the indication unit, or the target devices may be specified by touching the device images related to the devices within a preset time period. In the case of cancelling cooperation, the user may designate the target device to be cancelled on the screen 96 or may press a cooperation cancellation button. If an image of a device that is not the target device is on the screen 96, the user may designate the device on the screen 96 to eliminate the device from the target devices that cooperate with each other. The device to be cancelled may be designated by performing a predetermined motion, such as drawing of a cross mark thereon.

For example, in a case where the image forming apparatus 10 has a scan function, a scan and transfer function is executed as a cooperative function by causing the image forming apparatus 10 and the PC 92 to cooperate with each other. When the scan and transfer function is to be executed, scan data (image data) is generated by the scan function of the image forming apparatus 10, and the scan data is transmitted from the image forming apparatus 10 to the PC 92. In another example, in a case where the image forming apparatus 10 has a print function, document data to be printed may be transmitted from the PC 92 to the image forming apparatus 10, and a document based on the document data may be printed on paper by the print function of the image forming apparatus 10.

Figure 17:
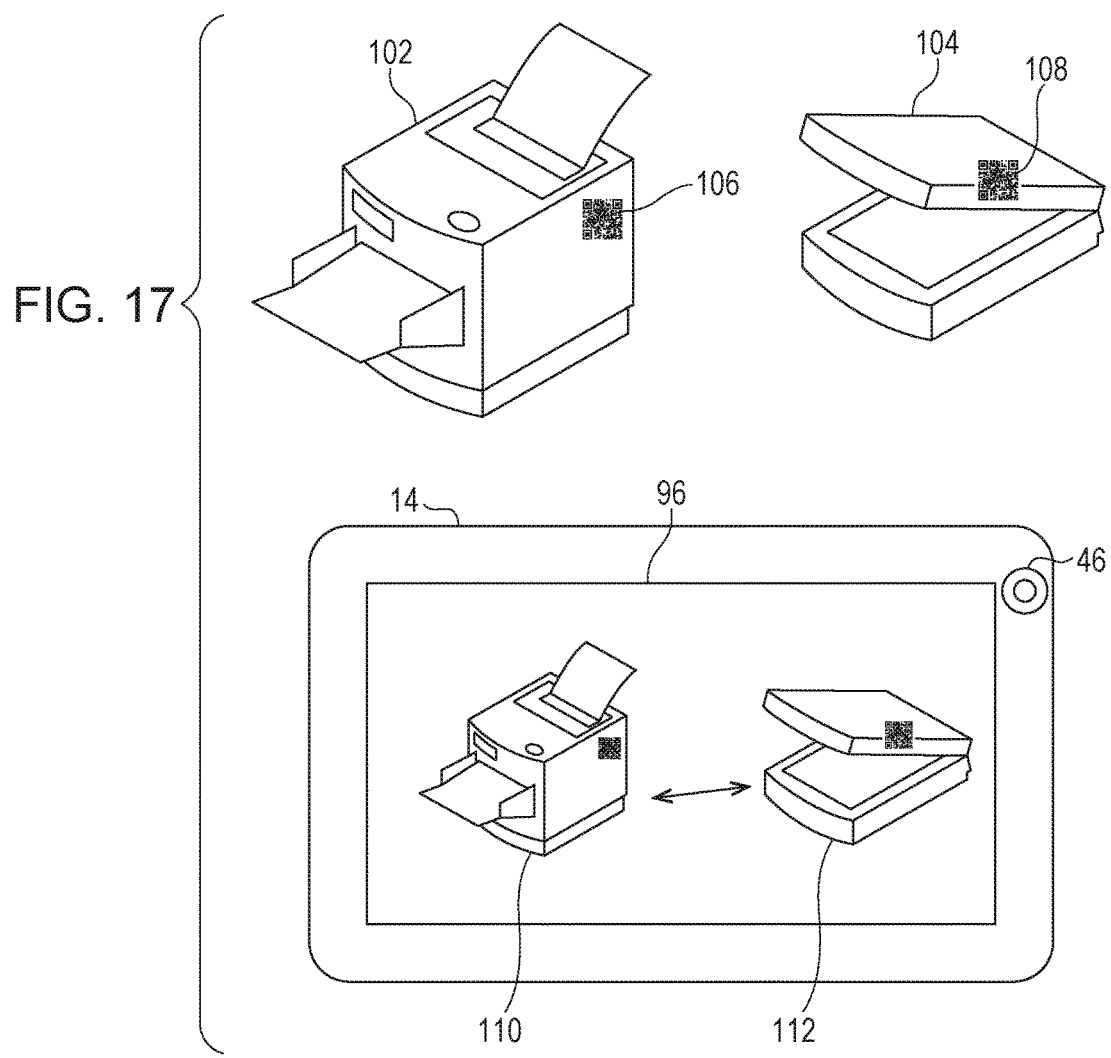
FIG. 17 is a schematic diagram illustrating target devices that cooperate with each other.

FIG. 17 illustrates another example of target devices that cooperate with each other. For example, it is assumed that a printer 102 is used as the target device 76 and that a scanner 104 is used as the target device 78. The printer 102 is an apparatus that has only a print function as an image forming function. The scanner 104 is an apparatus that has only a scan function as an image forming function. For example, a marker 106 such as a two-dimensional barcode is provided on the housing of the printer 102, and a marker 108 such as a two-dimensional barcode is provided on the housing of the scanner 104. The marker 106 is information obtained by coding the device identification information of the printer 102. The marker 108 is information obtained by coding the device identification information of the scanner 104. As in the example illustrated in FIG. 16, the user captures an image of both the printer 102 and the scanner 104 in a state where both the printer 102 and the scanner 104 are within the field of view of the camera 46. As a result of applying the marker-based AR technology or the markerless AR technology on the image data generated through the capturing, the device identification information of the printer 102 and the device identification information of the scanner 104 are specified, and a cooperative function that is executed through cooperation between the printer 102 and the scanner 104 is specified. The process of specifying the device identification information and the process of specifying the cooperative function may be performed by the server 80 or the terminal apparatus 14.

As in the example illustrated in FIG. 16, a device image 110 representing the printer 102 and a device image 112 representing the scanner 104 are displayed on the screen 96 of the display of the terminal apparatus 14. The user may designate the device images 110 and 112 on the screen 96 so as to designate the printer 102 and the scanner 104 as the target devices that cooperate with each other. Accordingly, the cooperative function identification information representing a copy function as a cooperative function is displayed on the UI unit 50 of the terminal apparatus 14.

The copy function is executed by causing the printer 102 and the scanner 104 to cooperate with each other. In this case, a document is read by the scan function of the scanner 104, and scan data (image data) representing the document is generated. The scan data is transmitted from the scanner 104 to the printer 102, and an image based on the scan data is printed on paper by the print function of the printer 102. In this way, even if a target device to be used does not have a copy function, a copy function as a cooperative function is executed by causing the printer 102 and the scanner 104 to cooperate with each other.

Figure 18:
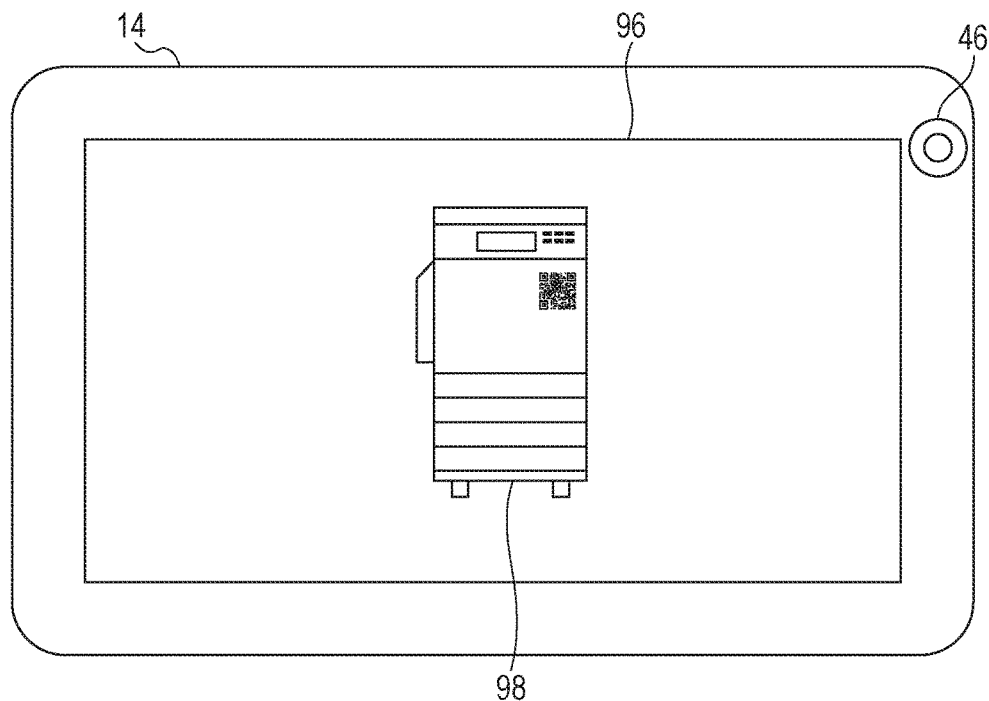
FIG. 18 is a diagram illustrating a screen of a display of the terminal apparatus.
Figure 19:
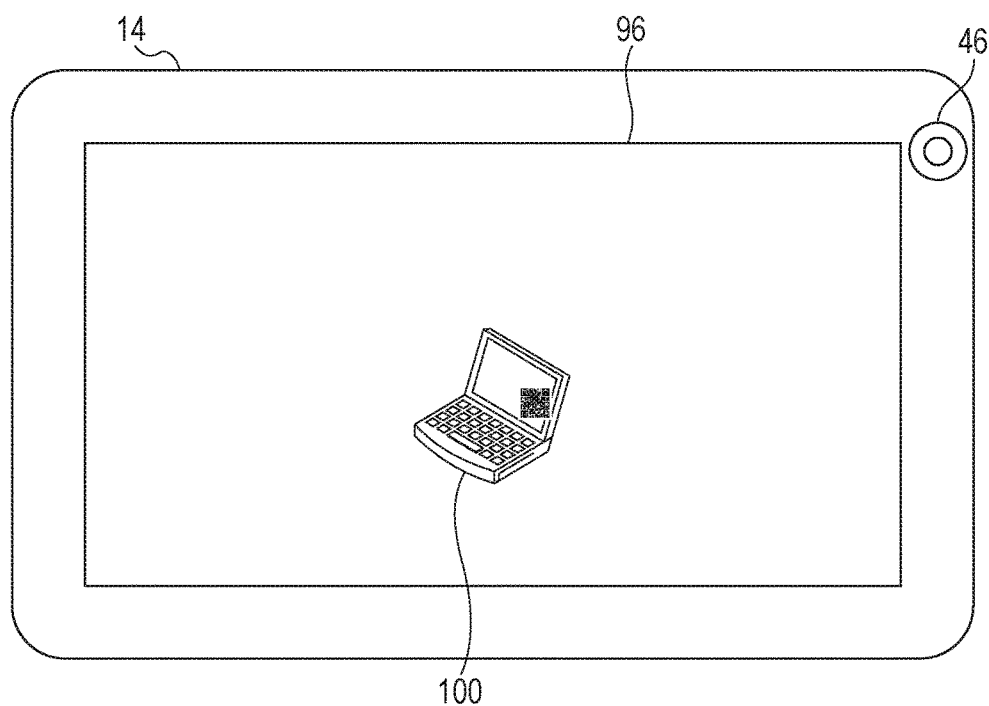
FIG. 19 is a diagram illustrating a screen of a display of the terminal apparatus.

Hereinafter, with reference to FIGS. 18 and 19, a description will be given of another method for causing plural devices to cooperate with each other by applying the marker-based AR technology or the markerless AR technology. FIGS. 18 and 19 illustrate the screen of the display of the terminal apparatus 14. For example, it is assumed that the image forming apparatus 10 is used as the target device 76 and the PC 92 is used as the target device 78. In this example, images of the image forming apparatus 10 and the PC 92 are separately captured because the target devices that cooperate with each other are not always placed close to each other. Of course, the angle of view of an image capturing unit may be changed or the field of view may be increased or decreased. If these operations are insufficient, image capturing by the image capturing unit may be performed plural times to identify the individual target devices. In a case where image capturing by the image capturing unit is performed plural times, the identification information of a device identified each time is stored in the memory of the terminal apparatus 14 or the server 80. For example, as illustrated in FIG. 18, an image of the image forming apparatus 10 is captured in a state where the image forming apparatus 10 is within the field of view of the camera 46, and as illustrated in FIG. 19, an image of PC 92 is captured in a state where the PC 92 is within the field of view of the camera 46. Accordingly, image data representing the image forming apparatus 10 and image data representing the PC 92 are generated. By applying the marker-based AR technology or the markerless AR technology to each piece of image data, the device identification information of the image forming apparatus 10 and the device identification information of the PC 92 are specified, and a cooperative function is specified.

As another method, a target device that cooperates may be preset as a basic cooperative device. For example, it is assumed that the image forming apparatus 10 is set in advance as a basic cooperative device. The device identification information representing the basic cooperative device may be stored in the memory 48 of the terminal apparatus 14 in advance or may be stored in the memory 84 of the server 80 in advance. Alternatively, the user may designate a basic cooperative device by using the terminal apparatus 14. In a case where a basic cooperative device is set, the user captures an image of a target device other than the basic cooperative device by using the camera 46 of the terminal apparatus 14. For example, in the case of using the PC 92 as a target device, the user captures an image of the PC 92 by using the camera 46, as illustrated in FIG. 19. Accordingly, the device identification information of the PC 92 is specified, and a cooperative function that is executed through cooperation between the image forming apparatus 10 and the PC 92 is specified.

Figure 20:
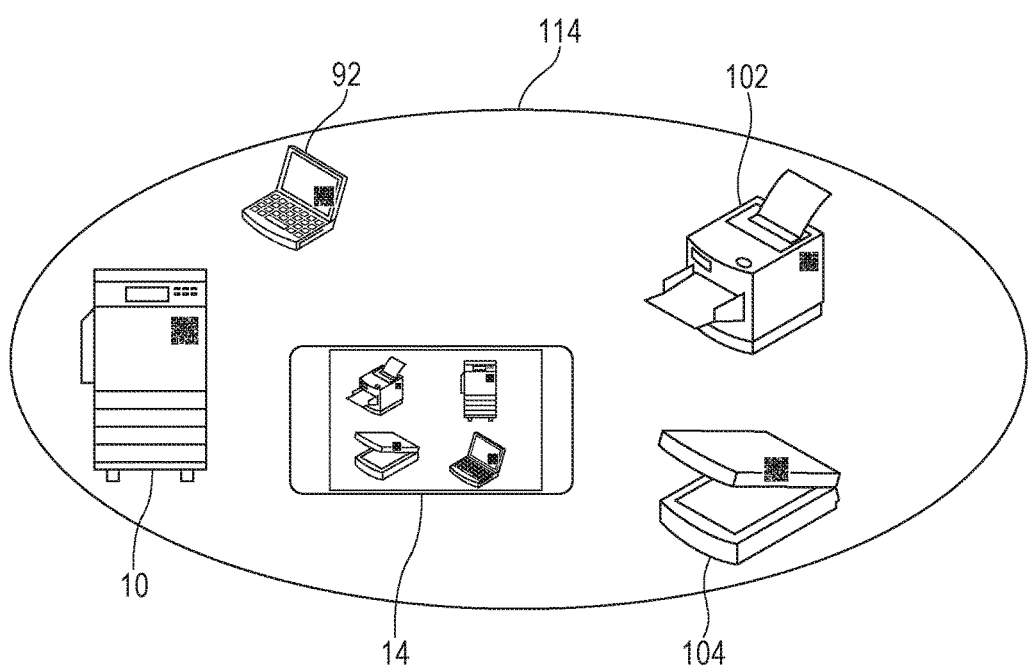
FIG. 20 is a schematic diagram illustrating individual devices located in a search area.

Next, with reference to FIG. 20, a description will be given of a method for causing plural devices to cooperate with each other by applying the position information AR technology. FIG. 20 illustrates individual devices located in a search area. For example, the terminal apparatus 14 has a GPS function, obtains terminal position information representing the position of the terminal apparatus 14, and transmits the terminal position information to the server 80. The controller 88 of the sever 80 refers to the position correspondence information representing the correspondence between device position information representing the positions of devices and device identification information, and specifies the devices located within a preset range relative to the position of the terminal apparatus 14 as candidate cooperative devices. For example, as illustrated in FIG. 20, it is assumed that the image forming apparatus 10, the PC 92, the printer 102, and the scanner 104 are located within a range 114 that is set in advance relative to the terminal apparatus 14. In this case, the image forming apparatus 10, the PC 92, the printer 102, and the scanner 104 are specified as candidate cooperative devices. The pieces of device identification information of the candidate cooperative devices are transmitted from the server 80 to the terminal apparatus 14 and are displayed on the UI unit 50 of the terminal apparatus 14. As the pieces of device identification information, the images of the candidate cooperative devices may be displayed, or character strings such as device IDs may be displayed. The user designates the target devices that cooperate with each other from among the candidate cooperative devices displayed on the UI unit 50. The pieces of device identification information of the target devices designated by the user are transmitted from the terminal apparatus 14 to the server 80, and a cooperative function is specified by the server 80 on the basis of the pieces of device identification information of the target devices. The cooperative function identification information representing the cooperative function is displayed on the UI unit 50 of the terminal apparatus 14. The process of specifying the candidate cooperative devices and the process of specifying the cooperative function may be performed by the terminal apparatus 14.

Hereinafter, a process performed by the image forming system according to the second exemplary embodiment will be described with reference to FIG. 21. FIG. 21 is a sequence diagram illustrating the process.

First, the user provides an instruction to start an application (program) for executing a cooperative function by using the terminal apparatus 14. In response to the instruction, the controller 52 of the terminal apparatus 14 starts the application (S60). The application may be stored in the memory 48 of the terminal apparatus 14 in advance or may be downloaded from the server 80 or the like.

Subsequently, the controller 52 of the terminal apparatus 14 reads the user account information (user identification information) of the user (S61). This reading process is the same as step S02 according to the first exemplary embodiment.

Usage histories of cooperative functions may be managed for individual users, and the information representing the cooperative functions previously used by the user represented by the read user account information may be displayed on the UI unit 50 of the terminal apparatus 14. The information representing the usage history may be stored in the memory 48 of the terminal apparatus 14 or the memory 84 of the server 80. Also, the information representing a cooperative function that is used at a preset frequency or more may be displayed. With such a shortcut function being provided, a user operation regarding a cooperative function may be reduced.

Subsequently, the target devices that cooperate with each other are specified by applying the marker-based AR technology, the markerless AR technology, or the position information AR technology (S62). In the case of applying the marker-based AR technology or the markerless AR technology, the user captures an image of the target devices by using the camera 46 of the terminal apparatus 14. For example, in the case of using the devices 76 and 78 as the target devices, the user captures an image of the devices 76 and 78 by using the camera 46. Accordingly, image data representing the devices 76 and 78 is generated, and the pieces of device identification information of the devices 76 and 78 are specified by applying the marker-based AR technology or the markerless AR technology. In the case of using the position information AR technology, the pieces of device position information of the devices 76 and 78 are obtained, and the pieces of device identification information of the devices 76 and 78 are specified on the basis of the pieces of device position information.

Subsequently, the terminal apparatus 14 transmits information representing a connection request to the devices 76 and 78 that cooperate with each other (S63). For example, if the pieces of address information representing the addresses of the devices 76 and 78 are stored in the server 80, the terminal apparatus 14 obtains the pieces of address information of the devices 76 and 78 from the server 80. If the pieces of address information are included in the pieces of device identification information, the terminal apparatus 14 may obtain the pieces of address information of the devices 76 and 78 from the pieces of device identification information of the devices 76 and 78. Alternatively, the pieces of address information of the devices 76 and 78 may be stored in the terminal apparatus 14. Of course, the terminal apparatus 14 may obtain the pieces of address information of the devices 76 and 78 by using another method. By using the pieces of address information of the devices 76 and 78, the terminal apparatus 14 transmits information representing a connection request to the devices 76 and 78.

The devices 76 and 78 permit or do not permit the connection to the terminal apparatus 14 (S64). For example, if the devices 76 and 78 are devices that are not permitted to make a connection or if the number of terminal apparatuses requesting connection exceeds an upper limit, the connection is not permitted. If the connection from the terminal apparatus 14 is permitted, an operation of changing setting information unique to the devices 76 and 78 may be prohibited so that the setting information is not changed. For example, change of color parameters or setting time to shift to a power saving mode of an image forming apparatus may be prohibited. Accordingly, the security for the devices 76 and 78 may increase. Alternatively, in the case of causing the devices 76 and 78 to cooperate with each other, change of setting information may be limited compared to the case of using each device alone without cooperation with another device. For example, change of fewer setting items may be permitted than in the case of using the device 76 or 78 alone. Alternatively, viewing of personal information of other users, such as an operation history, may be prohibited. Accordingly, the security for personal information of users may increase.

Result information representing permission or non-permission of connection is transmitted from the devices 76 and 78 to the terminal apparatus 14 (S65). If the connection to the devices 76 and 78 is permitted, communication is established between the terminal apparatus 14 and each of the devices 76 and 78.

If the connection to the devices 76 and 78 is permitted, cooperative function identification information representing one or plural cooperative functions that are executed through cooperation between the devices 76 and 78 is displayed on the UI unit 50 of the terminal apparatus 14 (S66). As described above, one or plural cooperative functions that are executed through cooperation between the devices 76 and 78 are specified by using the pieces of device identification information of the devices 76 and 78, and the cooperative function identification information of the one or plural cooperative functions is displayed on the terminal apparatus 14. The specification process may be performed by the server 80 or the terminal apparatus 14.

Subsequently, the user provides an instruction to execute a cooperative function by using the terminal apparatus 14 (S67). In response to the instruction, execution instruction information representing the instruction to execute the cooperative function is transmitted from the terminal apparatus 14 to the devices 76 and 78 (S68). The execution instruction information transmitted to the device 76 includes information representing the process to be executed in the device 76 (for example, job information), and the execution instruction information transmitted to the device 78 includes information representing the process to be executed in the device 78 (for example, job information).

In response to the execution instruction information, the devices 76 and 78 execute the individual functions in accordance with the execution instruction information (S69). For example, if the cooperative function includes a process of transmitting/receiving data between the devices 76 and 78, as in the scan and transfer function of transferring scan data from the image forming apparatus 10 to the PC 92, communication is established between the devices 76 and 78. In this case, for example, the execution instruction information transmitted to the device 76 includes the address information of the device 78, and the execution instruction information transmitted to the device 78 includes the address information of the device 76. The communication is established between the devices 76 and 78 by using these pieces of address information.

After the execution of the cooperative function is finished, result information indicating that the execution of the cooperative function is completed is transmitted from the devices 76 and 78 to the terminal apparatus 14 (S70). The information indicating that the execution of the cooperative function is completed is displayed on the display of the UI unit 50 of the terminal apparatus 14 (S71). If the information indicating that the execution of the cooperative function is completed is not displayed even when a preset time period elapses from the time point at which the execution instruction is provided, the controller 52 of the terminal apparatus 14 may cause the display of the UI unit 50 to display information representing an error, and may transmit execution instruction information or information representing a connection request to the devices 76 and 78 again.

Subsequently, the user determines whether or not to cancel the cooperation state of the devices 76 and 78 (S72), and a process is performed in accordance with the determination result (S73). In the case of cancelling the cooperation state, the user provides a cancellation instruction by using the terminal apparatus 14. Accordingly, the communication between the terminal apparatus 14 and each of the devices 76 and 78 is stopped. Also, the communication between the devices 76 and 78 is stopped. In the case of not cancelling the cooperation state, an execution instruction may be continuously provided.

Furthermore, the number of target devices that cooperate with each other may be increased. For example, the device identification information of the third device may be obtained, and one or plural cooperative functions that are executed through cooperation among the three devices including the devices 76 and 78 may be specified. The information indicating that the devices 76 and 78 have already been specified is stored in the terminal apparatus 14 or the server 80.

The pieces of device identification information of the devices 76 and 78 as the target devices that cooperate with each other and the cooperative function identification information representing the executed cooperative function may be stored in the terminal apparatus 14 or the server 80. For example, history information, in which user account information (user identification information), pieces of device identification information of the target devices that cooperate with each other, and cooperative function identification information representing an executed cooperative function are associated with each other, is created for each user and is stored in the terminal apparatus 14 or the server 80. The history information may be created by the terminal apparatus 14 or the server 80. With reference to the history information, the cooperative function that has been executed and the devices used for the cooperative function are specified.

The devices 76 and 78 may store, as history information, the user account information of the user who has requested connection and the terminal identification information representing the terminal apparatus 14 that has requested connection. With reference to the history information, the user who has used the devices 76 and 78 is specified. The user may be specified by using the history information in the case of, for example, specifying the user who was using the devices 76 and 78 when the devices were broken, or performing a charging process for consumables or the like. The history information may be stored in the server 80 or the terminal apparatus 14 or may be stored in another apparatus.

Next, with reference to FIGS. 22A to 22E, a description will be given of transitions of a screen that is displayed on the UI unit 50 of the terminal apparatus 14 from when the target devices that cooperate with each other are recognized to when a cooperative function is executed.

As an example, a description will be given of the case of using the image forming apparatus 10 and the PC 92 as the target devices that cooperate with each other as illustrated in FIG. 16. In the example illustrated in FIGS. 22A to 22E, it is assumed that the image forming apparatus 10 has at least a scan function, a print function, and a copy function as image forming functions, and functions as a so-called multifunction peripheral (MFP).

Figure 22A:
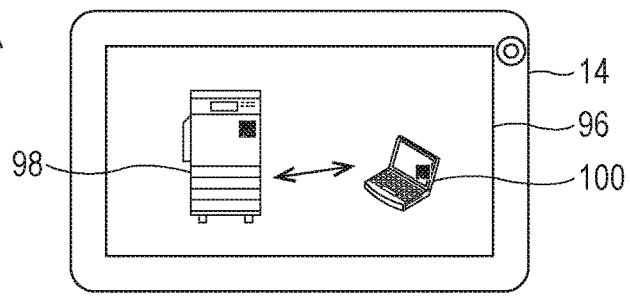
FIGS. 22A to 22E are diagrams illustrating transitions of a screen on the terminal apparatus.

First, the user captures, with the camera 46 of the terminal apparatus 14, an image of the image forming apparatus 10 (MFP) and the PC 92 as the target devices that cooperate with each other, as illustrated in FIG. 16. Accordingly, the device image 98 representing the image forming apparatus 10 and the device image 100 representing the PC 92 are displayed on the screen 96 of the UI unit 50 of the terminal apparatus 14, as illustrated in FIG. 22A.

Figure 22B:
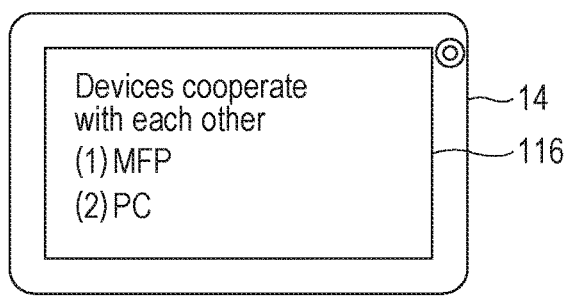

As an example, the image forming apparatus 10 and the PC 92 are recognized by applying the marker-based AR technology or the markerless AR technology, and a recognized device screen 116 is displayed on the UI unit 50 as illustrated in FIG. 22B. The device identification information of the image forming apparatus 10 and the device identification information of the PC 92 are displayed on the recognized device screen 116. For example, (1) a character string representing an MFP is displayed as the device identification information of the image forming apparatus 10 10, and (2) a character string representing a PC is displayed as the device identification information of the PC 92 on the recognized device screen 116. Alternatively, the names or trade names of the image forming apparatus 10 and the PC 92 may be displayed.

Figure 22C:
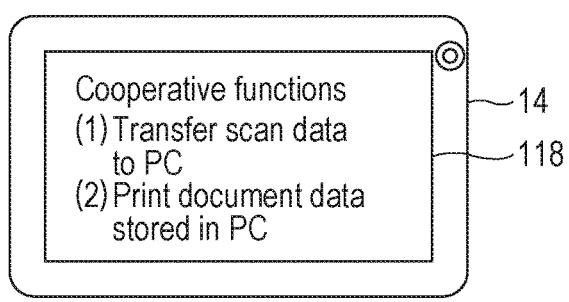

After the device identification information of the image forming apparatus 10 and the device identification information of the PC 92 are specified, cooperative functions that are executed through cooperation between the image forming apparatus 10 and the PC 92 are specified, and a cooperative function selection screen 118 is displayed on the UI unit 50, as illustrated in FIG. 22C. For example, (1) information representing a function of transferring scan data to the PC (scan and transfer function) and (2) information representing a function of printing document data stored in the PC are displayed as cooperative function information on the cooperative function selection screen 118. If an instruction to execute the cooperative function (1) is provided, a document is read and scan data is generated by the scan function of the image forming apparatus 10 (MFP) and the scan data is transferred from the image forming apparatus 10 to the PC 92. If an instruction to execute the cooperative function (2) is provided, the document data stored in the PC 92 is transmitted from the PC 92 to the image forming apparatus 10, and a document based on the document data is printed on paper by the print function of the image forming apparatus 10. The group of devices selected by the user on the recognized device screen 116 illustrated in FIG. 22B may be used as the target devices that cooperate with each other, and cooperative function information representing cooperative functions that are executed through cooperation between the devices selected by the user may be displayed on the cooperative function selection screen 118.

The cooperative function information may be displayed in another display form. For example, the controller 52 of the terminal apparatus 14 causes the display of the UI unit 50 to display information representing a group of functions including cooperative functions (for example, a group of button images) and, if plural devices that cooperate with each other to execute a cooperative function are not specified (recognized), causes the display to display cooperative function information (for example a button image) such that the cooperative function is unavailable. If the pieces of device identification information of plural devices that cooperate with each other to execute the cooperative function are obtained and the plural devices are recognized, the controller 52 causes the display to display the cooperative function information such that the cooperative function is available. Specifically, the controller 52 causes the UI unit 50 to display the pieces of information (for example, a group of button images) representing a print function, a scan function, a copy function, and a scan and transfer function as a cooperative function. If the plural devices that cooperate with each other to execute the scan and transfer function are not recognized, the controller 52 causes the display to display the cooperative function information such that the scan and transfer function is unavailable. For example, the controller 52 does not receive an instruction to execute the scan and transfer function. Accordingly, even if the user designates the cooperative function information (for example, a button image) representing the scan and transfer function and provides an execution instruction, the scan and transfer function is not executed. If the plural devices that cooperate with each other to execute the scan and transfer function are recognized, the controller 52 causes the display to display the cooperative function information (for example, a button image) such that the scan and transfer function is available. If an instruction to execute the scan and transfer function is provided by the user, the controller 52 receives the instruction and transmits execution instruction information representing the instruction to the group of target devices that cooperate with each other.

Figure 22D:
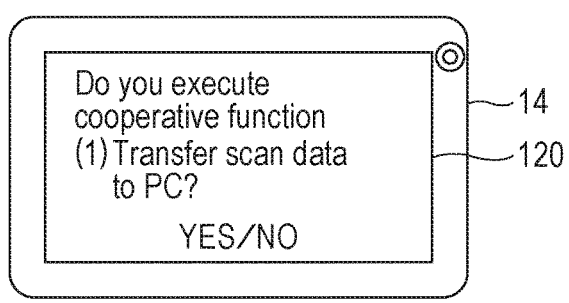
Figure 22E:
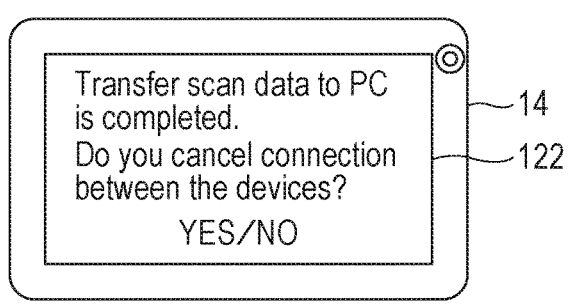

For example, if the scan and transfer function is designated by the user, a confirmation screen 120 is displayed on the UI unit 50 as illustrated in FIG. 22D. If the user presses a "NO" button on the confirmation screen 120, the screen shifts to the immediately preceding screen, that is, the cooperative function selection screen 118. If the user presses a "YES" button, the scan and transfer function is executed. After the execution of the scan and transfer function is completed, an execution completion screen 122, which represents the completion of execution of the cooperative function, is displayed on the UI unit 50 as illustrated in FIG. 22E. The execution completion screen 122 displays information that allows the user to determine whether or not to cancel the connection between the target devices that cooperate with each other. If the user provides an instruction to cancel the connection of the devices on the execution completion screen 122, the connection between the terminal apparatus 14 and each of the image forming apparatus 10 and the PC 92 is cancelled. If the user does not provide an instruction to cancel the connection, the screen returns to the cooperative function selection screen 118.

As described above, according to the second exemplary embodiment, one or plural cooperative functions that are executed through cooperation between target devices that cooperate with each other are specified by applying the AR technologies, and the cooperative function identification information representing the cooperative functions is displayed on the terminal apparatus 14. Accordingly, even if the user does not know which cooperative function is executable by the target devices that cooperate with each other from their appearances, the user may be able to easily recognize which cooperative function is executable. Also, a function that is not executable by a single device alone becomes available by causing plural devices to cooperate with each other, which may be convenient. Furthermore, a cooperative function becomes available only by recognizing the target devices that cooperate with each other by applying the AR technologies. Thus, the cooperative function becomes available through a simple operation compared to a case where the user manually performs settings for executing the cooperative function, and the effort of the user may be reduced.

According to the second exemplary embodiment, for example, information about cooperative functions is appropriately displayed on the terminal apparatus 14 of each user in an environment where plural devices are used by plural users. For example, even if a user interface such as a touch screen is removed from a device, the terminal apparatus 14 is used as the user interface, and information about cooperative functions that are executed through cooperation between plural devices is appropriately displayed on the terminal apparatus 14 of each user. In another case, for example, if the user temporarily uses plural devices on the go, a user interface suitable for the user, that is, a user interface that displays cooperative functions that are executed through cooperation between plural devices designated by the user, is implemented by the terminal apparatus 14.

Hereinafter, specific examples of a cooperative function will be described.

First Specific Example

A cooperative function according to a first specific example is a cooperative function that is executed through cooperation between the image forming apparatus 10 serving as an MFP and a display apparatus such as a projector. This cooperative function is a function of printing the content of a screen displayed on the display apparatus such as a projector by using the MFP (image forming apparatus 10). As an example, it is assumed that the device 76 is the MFP and the device 78 is the display apparatus such as a projector. In the first specific example, the pieces of device identification information of the MFP and the display apparatus are obtained by applying the AR technologies, and the cooperative function that is executed through cooperation between the MFP and the display apparatus is specified on the basis of the pieces of device identification information. The cooperative function identification information representing the cooperative function is displayed on the terminal apparatus 14. If the user provides an instruction to execute the cooperative function by using the terminal apparatus 14, the terminal apparatus 14 transmits execution instruction information to the MFP and the display apparatus. In response to this, the display apparatus transmits the information displayed on the screen (screen information) to the MFP, and the MFP prints the screen information received from the display apparatus on paper. According to the first specific example, the user is provided with information indicating which function is to be executed through cooperation between the MFP and the display apparatus only by recognizing the MFP and the display apparatus by using the AR technologies, and the content of the screen displayed on the display apparatus is printed by the MFP. Accordingly, the effort of the user may be reduced compared to a case where the user performs print settings or the like by manual operation.

Second Specific Example

A cooperative function according to a second specific example is a cooperative function that is executed through cooperation between the image forming apparatus 10 serving as an MFP and a telephone. This cooperative function is at least one of functions A, B, and C. Function A is a function of printing data representing user's conversations on the telephone (telephone conversations) by using the MFP (image forming apparatus 10). Function B is a function of transmitting electronic document data representing the telephone conversations to a preset email address by email. Function C is a function of transmitting the electronic document data to a fax number associated with a telephone number of a recipient of a telephone call by facsimile. As an example, it is assumed that the device 76 is the MFP and the device 78 is the telephone. In the second specific example, the pieces of device identification information of the MFP and the telephone are obtained by applying the AR technologies, and the cooperative functions (functions A, B, and C) that are executed through cooperation between the MFP and the telephone are specified on the basis of the pieces of device identification information. The pieces of cooperative function identification information representing functions A, B, and C as cooperative functions are displayed on the terminal apparatus 14. If the user selects a function to be executed from among functions A, B, and C and provides an instruction to execute the selected cooperative function by using the terminal apparatus 14, the terminal apparatus 14 transmits execution instruction information to the MFP and the telephone. In response to this, the telephone transmits the data representing telephone conversions to the MFP. If the execution of function A is designated, the MFP prints character strings representing the telephone conversations on paper. If the execution of function B is designated, the MFP transmits the electronic document data representing the telephone conversations to a preset email address (for example, the email address of the recipient of the telephone call) by email. If the execution of function C is designated, the MFP transmits the electronic document data to a fax number associated with a telephone number of the recipient of the telephone call by facsimile. If plural functions are selected from among functions A, B, and C and an execution instruction is provided by the user, the plural functions may be executed. According to the second specific example, the user is provided with information indicating which function is to be executed through cooperation between the MFP and the telephone only by recognizing the MFP and the telephone by using the AR technologies, and at least one of the function of printing the telephone conversations, the function of transmitting the telephone conversations by email, and the function of transmitting the telephone conversations by facsimile is executed. Accordingly, the effort of the user may be reduced compared to a case where the user performs print settings or the like by manual operation.

Third Specific Example

A cooperative function according to a third specific example is a cooperative function that is executed through cooperation between the image forming apparatus 10 serving as an MFP and a clock. This cooperative function is a function of adding a timer function to the MFP. As an example, it is assumed that the device 76 is the MFP and the device 78 is the clock. In the third specific example, the pieces of device identification information of the MFP and the clock are obtained by applying the AR technologies, and the cooperative function that is executed through cooperation between the MFP and the clock is specified on the basis of the pieces of device identification information. The cooperative function identification information representing the cooperative function is displayed on the terminal apparatus 14. If the user provides an instruction to execute the cooperative function by using the terminal apparatus 14, image formation using the timer function is executed. For example, the MFP executes image formation such as printing at the time designated by the user. According to the third specific example, the user is provided with information indicating which function is to be executed through cooperation between the MFP and the clock, and the timer function is given to the MFP, only by recognizing the MFP and the clock by using the AR technologies. Thus, image formation using the timer function may be performed even in the case of using an MFP that does not have a timer function.

Fourth Specific Example

A cooperative function according to a fourth specific example is a cooperative function that is executed through cooperation between the image forming apparatus 10 serving as an MFP and a monitoring camera. This cooperative function is a function of deleting specific information (for example, job information, image data, or the like) stored in the MFP in accordance with the images captured by the monitoring camera. As an example, it is assumed that the device 76 is the MFP and the device 78 is the monitoring camera. In the fourth specific example, the pieces of device identification information of the MFP and the monitoring camera are obtained by applying the AR technologies, and the cooperative function that is executed through cooperation between the MFP and the monitoring camera is specified on the basis of the pieces of device identification information. The cooperative function identification information representing the cooperative function is displayed on the terminal apparatus 14. If the user provides an instruction to execute the cooperative function by using the terminal apparatus 14, the terminal apparatus 14 transmits execution instruction information to the MFP and the monitoring camera. In response to this, the monitoring camera analyzes captured images, and transmits an information deletion instruction to the MFP if a specific event occurs. For example, if an image of a suspicious person is captured by the monitoring camera after business hours, the monitoring camera transmits an information deletion instruction to the MFP. In response to the information deletion instruction, the MFP deletes job information and image data stored in the MFP. Accordingly, the security of the MFP may increase. According to the fourth specific example, the user is provided with information indicating which function is to be executed through cooperation between the MFP and the monitoring camera, and monitoring of the MFP is executed by the monitoring camera, only by recognizing the MFP and the monitoring camera by using the AR technologies. Thus, the effort of the user may be reduced compared to a case where the user performs monitoring settings or the like by manual operation.

In another example, an image forming apparatus and a translation apparatus may cooperate with each other so as to execute a cooperative function of translating, using the translation apparatus, characters included in a document to be printed by the image forming apparatus into a language handled by the translation apparatus, and outputting the translation result onto paper.

Fifth Specific Example

The cooperative functions according to the above-described examples are those executed through cooperation between plural devices that have different functions. Alternatively, a cooperative function may be executed through cooperation between plural devices that have the same functions. In this case, the plural devices execute the same functions to execute a process in a distributed manner. For example, a cooperative function according to the fifth specific example is a cooperative function that is executed through cooperation between plural image forming apparatuses 10 serving as MFPs. The cooperative function is, for example, an image forming function such as a print function, a copy function, or a scan function. In the fifth specific example, the pieces of device identification information of the plural MFPs are obtained by applying the AR technologies, and a cooperative function (for example, an image forming function) that is executed through cooperation between the plural MFPs is specified on the basis of the pieces of device identification information. The cooperative function identification information representing the cooperative function is displayed on the terminal apparatus 14. If the user provides an instruction to execute the cooperative function by using the terminal apparatus 14, the terminal apparatus 14 transmits execution instruction information to the plural MFPs that cooperate with each other. The terminal apparatus 14 divides a process (for example, a job) into job segments in accordance with the number of the MFPs, assigns the job segments to the MFPs, and transmits execution instruction information representing the job segments to the individual MFPs. In response to this, each MFP executes the job segment assigned thereto. For example, the terminal apparatus 14 divides one print job into print job segments in accordance with the number of the MFPs that cooperate with each other, assigns the print job segments to the MFPs, and transmits print job execution instruction information representing the print job segments to the MFPs. In response to this, each MFP executes the print function to execute the print job segment assigned thereto. Alternatively, the terminal apparatus 14 may assign the print job segments in accordance with the performances of the individual devices that cooperate with each other. For example, a job segment having a color print setting may be assigned to an MFP that has a color print function, and a job segment having a monochrome print setting may be assigned to an MFP that does not have a color print function.

In another specific example, a high-speed print mode or a preliminary print mode (a mode of creating plural copies of printed matter of the same content) may be executed as a cooperative function by causing plural devices having the same function to cooperate with each other.

Figures 23, 24:
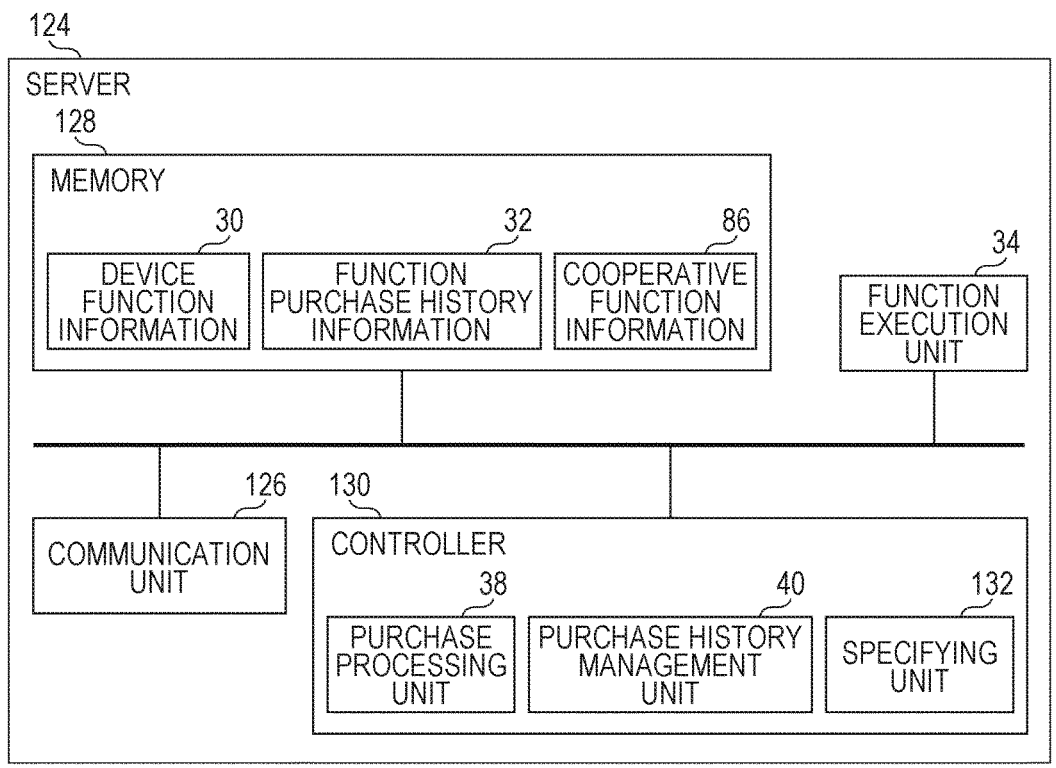
FIG. 23 is a diagram illustrating an order of priority of execution of a cooperative function.
FIG. 24 is a block diagram illustrating a server according to a third exemplary embodiment.

Hereinafter, modification examples of the second exemplary embodiment will be described with reference to FIG. 23. FIG. 23 illustrates an order of priority of execution of a cooperative function. In a modification example, if plural terminal apparatuses 14 simultaneously transmit a connection request to the same device, connection permission is given in accordance with an order of priority of execution set in advance. As illustrated in FIG. 23, in the case of a connection request in an emergency (urgent matter), an influence on the order of priority is "very large". In the case of a connection request from an owner of the device, an influence is "large". Regarding the rank in an organization, an influence on the order of priority is "middle", and the priority becomes higher as the rank of the user who makes a connection request becomes higher. Regarding an estimated completion time of a job (image formation process), an influence on the order of priority is "small", and the priority becomes higher as the estimated completion time of the job related to a connection request becomes shorter. For example, if plural terminal apparatuses 14 simultaneously transmit a connection request to the same device, the terminal apparatus 14 that makes a connection request including information representing an emergency is connected to the device with the highest priority. If there is no terminal apparatus 14 that makes a connection request including information representing an emergency among the plural terminal apparatuses 14, the terminal apparatus 14 of the owner of the device is connected to the device with the highest priority. If there is no terminal apparatus 14 that makes a connection request including information representing an emergency among the plural terminal apparatuses 14 and if there is no terminal apparatus 14 of the owner of the device, the terminal apparatus 14 of a user in a higher rank in an organization is preferentially connected to the device. If there is no terminal apparatus 14 that makes a connection request representing an emergency and no terminal apparatus 14 of the owner of the device among the plural terminal apparatuses 14 and if the ranks of the individual users are the same, the terminal apparatus 14 that provides an instruction to execute a job whose estimated completion time is the shortest is preferentially connected to the device. The item to be given the highest priority among an emergency, an owner of a device, a rank in an organization, and an estimated completion time of a job, may be arbitrarily set by a manager of a target device that cooperates. For example, the manager may arbitrarily change the influences of individual items, or does not need to use some of the items regarding the determination of an order of priority. Alternatively, an order of priority of use of a device may be displayed on the UI unit 50 of the terminal apparatus 14 in accordance with the attribute information of each user. The attribute information represents, for example, the degree of emergency, whether or not the user is an owner of the device, the rank in an organization, an estimated completion time of the job, and so forth. As a result of determining an order of priority of execution of a cooperative function in the above-described manner, a user of higher priority is preferentially connected to the device when connection requests are simultaneously made for the same device.

In another modification example, if plural terminal apparatuses 14 are simultaneously making a connection request to the same device, an interrupt notification may be made among the terminal apparatuses 14. For example, each terminal apparatus 14 may obtain address information of another terminal apparatus 14 via the same device or may obtain address information of another terminal apparatus 14 by using a process such as broadcasting. For example, if a user provides an instruction to make an interrupt request by using the terminal apparatus 14, the terminal apparatus 14 transmits an interrupt notification to another terminal apparatus 14 that is simultaneously making a connection request to the same device. Accordingly, the information representing the interrupt notification is displayed on the UI unit 50 of the other terminal apparatus 14. For example, if the user of the other terminal apparatus 14 cancels the connection request to the device in accordance with the interrupt notification, communication is established between the device and the terminal apparatus 14 that has made the interrupt request. Alternatively, when the user of the other terminal apparatus 14 permits an interrupt process, the other terminal apparatus 14 may transmit information representing the permission to the terminal apparatus 14 that has made the interrupt request. In this case, the terminal apparatus 14 that has made the interrupt request may transmit information representing the permission to the device, and thereby the terminal apparatus 14 may be preferentially connected to the device. As a result of making an interrupt notification in this manner, a cooperative function may be urgently executed.

Third Exemplary Embodiment

Hereinafter, an image forming system serving as an information processing system according to a third exemplary embodiment of the present invention will be described. FIG. 24 illustrates a server 124 according to the third exemplary embodiment. The image forming system according to the third exemplary embodiment is a system configured by combining the image forming system according to the first exemplary embodiment and the image forming system according to the second exemplary embodiment, and includes the server 124 instead of the server 80 according to the second exemplary embodiment. Except for the server 124, the configuration of the image forming system according to the third exemplary embodiment is the same as that of the image forming system according to the second exemplary embodiment illustrated in FIG. 14.

The server 124 is an apparatus that manages, for each user, functions available to the user, like the server 12 according to the first exemplary embodiment, and that manages cooperative functions that are executed through cooperation between plural devices, like the server 80 according to the second exemplary embodiment. Also, the server 124 is an apparatus that executes a specific function, like the server 12 according to the first exemplary embodiment. The specific function executed by the server 124 is a function regarding image processing, for example. The functions managed by the server 124 are, for example, functions executed by using the devices 76 and 78 and the functions executed by the server 124. The management of functions available to users, the management of cooperative functions, and the execution of a specific function may be performed by different servers or the same server. The server 124 has a function of transmitting data to and receiving data from another apparatus.

In the image forming system according to the third exemplary embodiment, a user purchases a function by using the terminal apparatus 14, and the history of the purchase is managed as a function purchase history by the server 124. The function purchased by the user is executed by, for example, the device 76 or 78 or the server 124. If a cooperative function is purchased, the cooperative function is executed through cooperation between plural devices.

Hereinafter, the configuration of the server 124 will be described in detail.

A communication unit 126 is a communication interface and has a function of transmitting data to another apparatus through the communication path N and a function of receiving data from another apparatus through the communication path N. The communication unit 126 may be a communication interface having a wireless communication function or may be a communication interface having a wired communication function.

A memory 128 is a storage apparatus such as a hard disk. The memory 128 stores device function information 30, function purchase history information 32, cooperative function information 86, various pieces of data, various programs, and so forth. Of course, these pieces of information and data may be stored in different storage apparatuses or in one storage apparatus. The device function information 30 and the function purchase history information 32 are the same as the device function information 30 and the function purchase history information 32 according to the first exemplary embodiment, and the cooperative function information 86 is the same as the cooperative function information 86 according to the second embodiment.

The function execution unit 34 of the server 124 is the same as the function execution unit 34 of the server 12 according to the first exemplary embodiment. Alternatively, the server 124 does not necessarily include the function execution unit 34 as in the second exemplary embodiment.

A controller 130 controls the operations of the individual units of the server 124. The controller 130 includes a purchase processing unit 38, a purchase history management unit 40, and a specifying unit 132.

The purchase processing unit 38 and the purchase history management unit 40 of the server 124 are the same as the purchase processing unit 38 and the purchase history management unit 40 of the server 12 according to the first exemplary embodiment.

When receiving device identification information for identifying the target device to be used, the specifying unit 132 refers to the device function information 30 stored in the memory 128 and thereby specifies a group of functions of the target device, like the specifying unit 42 of the server 12 according to the first exemplary embodiment. Also, when receiving user identification information for identifying the target user, the specifying unit 132 refers to the function purchase history information 32 stored in the memory 128 and thereby specifies a group of functions available to the target user, like the specifying unit 42 according to the first exemplary embodiment. When receiving the device identification information of the target device to be used and the user identification information of the target user, the specifying unit 132 specifies the functions that the target device has and that are available to the target user, as in the first exemplary embodiment.

Furthermore, when receiving the pieces of device identification information for identifying the target devices that cooperate with each other, the specifying unit 132 refers to the cooperative function information 86 stored in the memory 128 and thereby specifies a cooperative function that is executed through cooperation between the target devices, like the specifying unit 90 of the server 80 according to the second exemplary embodiment.

Furthermore, in the third exemplary embodiment, the specifying unit 132 specifies a cooperative function that is executed through cooperation between the target devices and that is available to the target user. For example, the function purchase history information 32 includes, for each user, information representing cooperative functions available to the user, that is, information representing cooperative functions purchased by the user. The cooperative function purchase process is the same as that according to the first exemplary embodiment. The specifying unit 132 receives the pieces of device identification information for identifying the target devices that cooperate with each other, refers to the cooperative function information 86 stored in the memory 128, and thereby specifies a cooperative function that is executed through cooperation between the target devices. Also, the specifying unit 132 receives the user identification information for identifying the target user, refers to the function purchase history information 32 stored in the memory 128, and thereby specifies a cooperative function purchased by the target user, that is, a cooperative function available to the target user. Through the foregoing process, the specifying unit 132 specifies a cooperative function that is executed through cooperation between the target devices and that is available to the target user. The cooperative function identification information representing the cooperative function is transmitted from the server 124 to the terminal apparatus 14 and is displayed on the UI unit 50 of the terminal apparatus 14. Accordingly, the target user may be able to easily recognize which cooperative function is available to the user. If an instruction to execute the cooperative function is provided by the target user, the cooperative function is executed by the target devices, as in the second exemplary embodiment.

The controller 52 of the terminal apparatus 14 may cause the display of the UI unit 50 to display the pieces of cooperative function identification information representing the individual cooperative functions that are executed through cooperation between the target devices, and also may cause the display of the UI unit 50 to display the piece of cooperative function identification information representing a cooperative function available to the target user and the piece of cooperative function identification information representing a cooperative function unavailable to the target user such that distinction between both the pieces of cooperative function identification information is achieved. Accordingly, the target user may be able to easily recognize which cooperative function is executable by the target devices and also may be able to easily recognize which cooperative function is available to the target user.

As another example, the specifying unit 132 may specify plural functions available to the target user by referring to the function purchase history information 32 and may specify a cooperative function that is executed through cooperation between the plural functions. For example, in a case where a scan function and a print function are available to the target user as individual functions, a copy function that is executed through cooperation between the scan function and the print function is available to the target user as a cooperative function. Furthermore, the specifying unit 132 refers to the cooperative function information 86 and thereby specifies a group of cooperative functions that are executed through cooperation between plural target devices. With the foregoing process, the specifying unit 132 may specify a cooperative function that is executed through cooperation between plural target devices and that is available to the target user.

Also in the third exemplary embodiment, the device identification information of a device is obtained by applying the AR technologies. Of course, the device identification information of a device may be obtained without applying the AR technologies. The user operation and process for causing plural devices to cooperate with each other are the same as those in the second exemplary embodiment. As in the first and second exemplary embodiments, the device function information 30, the function purchase history information 32, and the cooperative function information 86 may be stored in the memory 48 of the terminal apparatus 14, the purchase history management unit 40 and the specifying unit 132 may be provided in the controller 52 of the terminal apparatus 14, and the process using these units may be executed by the terminal apparatus 14.

According to the third exemplary embodiment, when a user wants to know individual functions available to the user using individual devices, information representing the available functions is displayed on the terminal apparatus 14 by recognizing the target device to be used by applying the AR technologies. When the user wants to know a cooperative function that is executed through cooperation between plural target devices and that is available to the user, information representing the available cooperative function is displayed on the terminal apparatus 14 by recognizing the target devices that cooperate with each other by applying the AR technologies. In this way, information about an available function is displayed on the terminal apparatus 14 in accordance with the usage manner of devices.

Fourth Exemplary Embodiment

Figure 25:
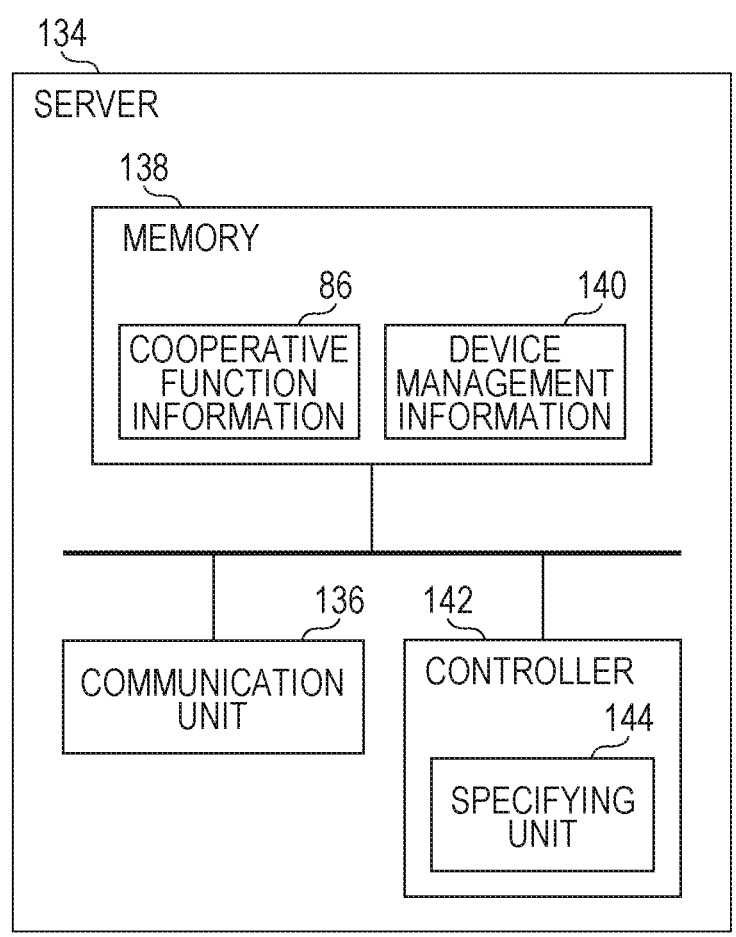
FIG. 25 is a block diagram illustrating a server according to a fourth exemplary embodiment.

Hereinafter, an image forming system serving as an information processing system according to a fourth exemplary embodiment of the present invention will be described with reference to FIG. 25. FIG. 25 illustrates a server 134 according to the fourth exemplary embodiment. The image forming system according to the fourth exemplary embodiment includes the server 134 instead of the server 80 according to the second exemplary embodiment. Except for the sever 134, the configuration of the image forming system according to the fourth exemplary embodiment is the same as that of the image forming system according to the second exemplary embodiment illustrated in FIG. 14.

The server 134 is an apparatus that manages a group of devices to be connected in accordance with a target function to be used, that is, a group of devices to be connected to execute a target function to be used. The target function to be used is, for example, a cooperative function that is executed through cooperation between plural devices (for example, the devices 76 and 78), and the server 134 manages a group of target devices that are capable of executing a cooperative function by cooperating with each other. Of course, the target function to be used may be a function that is executable by a single device alone. Furthermore, the server 134 has a function of transmitting data to and receiving data from another apparatus.

In the image forming system according to the fourth exemplary embodiment, a target function to be used (for example, a function that the user wants to use) is designated by using the terminal apparatus 14, and information representing a group of devices to be connected to execute the target function is displayed on the terminal apparatus 14.

Hereinafter, the configuration of the server 134 will be described in detail.

A communication unit 136 is a communication interface and has a function of transmitting data to another apparatus through the communication path N and a function of receiving data from another apparatus through the communication path N. The communication unit 136 may be a communication interface having a wireless communication function or may be a communication interface having a wired communication function.

A memory 138 is a storage apparatus such as a hard disk. The memory 138 stores cooperative function information 86, device management information 140, various pieces of data, various programs, and so forth. Of course, these pieces of information and data may be stored in different storage apparatuses or in one storage apparatus. The cooperative function information 86 is the same as the cooperative function information 86 according to the second exemplary embodiment.

The device management information 140 is information for managing information about devices. For example, the device management information 140 is information representing, for each device, the correspondence between device identification information of the device and at least one of device position information, performance information, and usage status information. The device position information is information representing the position where the device is installed, the performance information is information representing the performance (specifications) of the device, and the usage status information is information representing the current usage status of the device. For example, the device position information and the performance information are obtained in advance and are registered in the device management information 140. The device position information of each device is obtained by using, for example, a GPS apparatus. The usage status information is transmitted from each device to the server 134 and is registered in the device management information 140. For example, the usage status information is transmitted from the device to the server 134 at a preset time, at a preset time interval, or every time the usage status changes. Of course, the usage status information may be obtained and registered in the device management information 140 at other timing.

A controller 142 controls the operations of the individual units of the server 134. For example, the controller 142 manages the usage status of each device, and updates the device management information 140 every time the controller 142 obtains usage status information on each device. The controller 142 includes a specifying unit 144.

The specifying unit 144 specifies a group of devices to be connected in accordance with a target function to be used. For example, the specifying unit 144 receives cooperative function identification information representing a cooperative function as a target function to be used, and specifies plural pieces of device identification information associated with the cooperative function identification information in the cooperative function information 86 stored in the memory 138. Accordingly, a group of devices to be connected to execute the target function, that is, a group of devices that are capable of executing the cooperative function by cooperating with each other, is specified (recognized). For example, the cooperative function identification information is transmitted from the terminal apparatus 14 to the server 134, and the specifying unit 144 specifies the pieces of device identification information of the devices associated with the cooperative function identification information. The pieces of device identification information of the devices are transmitted from the server 134 to the terminal apparatus 14 and are displayed on the terminal apparatus 14. Accordingly, information representing the group of devices to be connected to execute the target function (for example, a cooperative function), that is, information representing the group of devices that are capable of executing the target function by cooperating with each other, is displayed on the terminal apparatus 14.

After the group of devices to be connected is specified, the specifying unit 144 specifies, for each device to be connected, at least one of the device position information, performance information, and usage status information associated with the device identification information in the device management information 140. Information such as the device position information is transmitted from the server 134 to the terminal apparatus 14 and is displayed on the terminal apparatus 14, for example.

The target function to be used may be a function executable by a single device alone. In this case, the specifying unit 144 specifies a single device to be connected to execute the target function, that is, a device capable of executing the target function alone. The information representing the device is transmitted from the server 134 to the terminal apparatus 14 and is displayed on the terminal apparatus 14.

The device management information 140 may be stored in the memory 48 of the terminal apparatus 14. In this case, the device management information 140 is not necessarily stored in the memory 138 of the server 134. Also, the controller 52 of the terminal apparatus 14 may include the specifying unit 144 and may specify a group of devices to be connected. In this case, the server 134 does not necessarily include the specifying unit 144.

Figure 26:
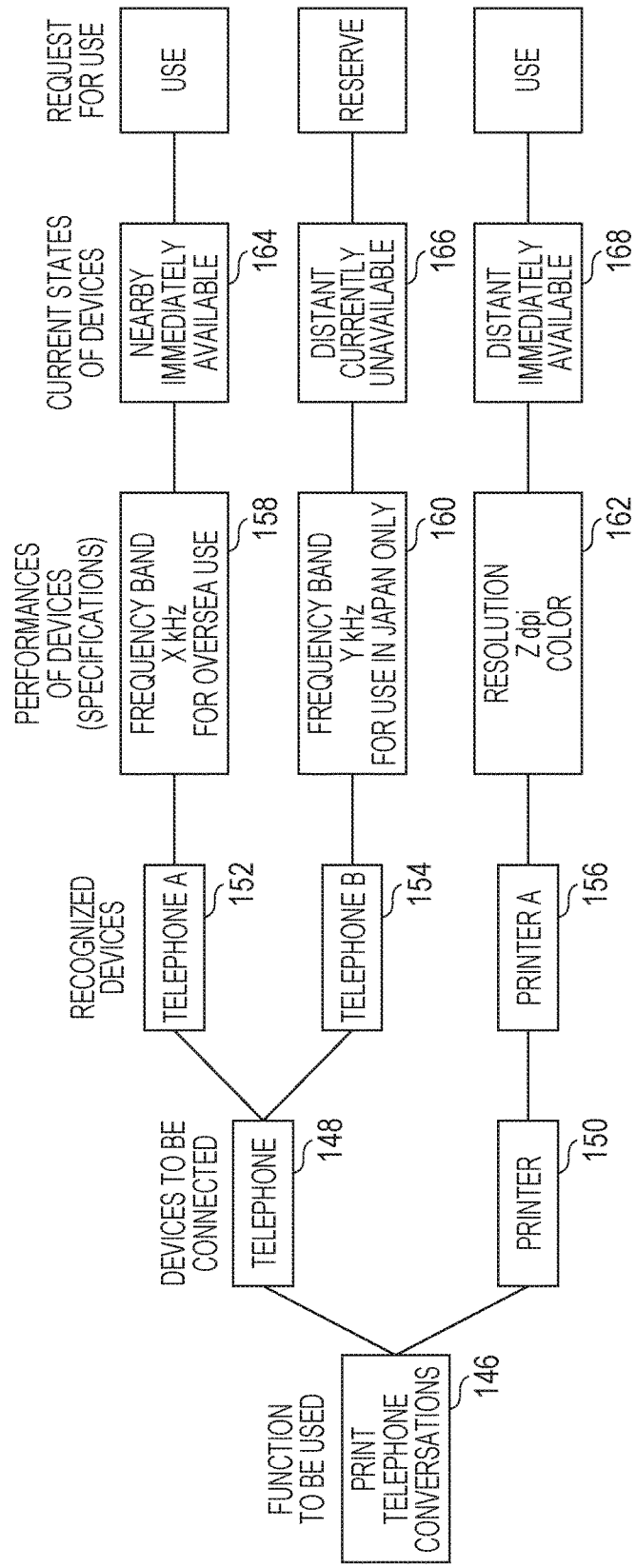
FIG. 26 is a diagram for describing a process performed by an image forming system according to the fourth exemplary embodiment.

Hereinafter, a process performed by the image forming system according to the fourth exemplary embodiment will be described in detail with reference to FIG. 26.

For example, the controller 52 of the terminal apparatus 14 causes the UI unit 50 to display a list of functions, and a user selects a function to be used (a target function to be used) from the list. As an example, as denoted by reference numeral 146 in FIG. 26, it is assumed that the function "print telephone conversations" is selected as a target function to be used. This function is a cooperative function that is executed through cooperation between a telephone and a device having a print function (for example, a printer or MFP), and the devices to be connected (the devices that need to be connected) are a telephone and a printer, as denoted by reference numerals 148 and 150. Of course, an MFP having a print function may be used as a device to be connected, instead of the printer.

The cooperative function identification information representing the cooperative function selected by the user is transmitted from the terminal apparatus 14 to the server 134. In the server 134, the specifying unit 144 specifies the plural pieces of device identification information associated with the cooperative function identification information in the cooperative function information 86 stored in the memory 138. Accordingly, the devices to be connected to execute the cooperative function, that is, the devices capable of executing the cooperative function by cooperating with each other, are specified (recognized). In the example illustrated in FIG. 26, telephones A and B and printer A are recognized as the devices to be connected to execute the function "print telephone conversions", as denoted by reference numerals 152, 154, and 156. Telephones A and B and printer A are devices included in the image forming system, like the devices 76 and 78.

At this stage, the pieces of device identification information of telephones A and B and printer A may be transmitted, as information about the devices to be connected, from the server 134 to the terminal apparatus 14, and may be displayed on the UI unit 50 of the terminal apparatus 14. Accordingly, the user is provided with information representing the devices to be connected to execute the target function.

After the devices to be connected are specified, the specifying unit 144 may refer to the device management information 140 and thereby may obtain information about telephone A and B and printer A. For example, the specifying unit 144 obtains pieces of performance information representing the performances (specifications) of telephones A and B and printer A. In the example illustrated in FIG. 26, the performance denoted by reference numeral 158 is the performance of telephone A, the performance denoted by reference numeral 160 is the performance of telephone B, and the performance denoted by reference numeral 162 is the performance of printer A. As the performances of telephones A and B, the frequency bands compatible thereto are defined. Telephone A is a telephone for oversea use, whereas telephone B is a telephone for use in Japan only. A resolution is defined as the performance of printer A. Printer A is a printer compatible with color printing. The pieces of performance information of telephones A and B and printer A are transmitted, as information about the devices to be connected, from the server 134 to the terminal apparatus 14, and are displayed on the UI unit 50 of the terminal apparatus 14. Accordingly, the user is provided with information useful to select devices suitable for the target function to be used. For example, if the user wants to perform color printing, the user may be able to easily find a device that meets the desire (a printer compatible with color printing) by referring to the performance information displayed on the UI unit 50.

Figure 27A:
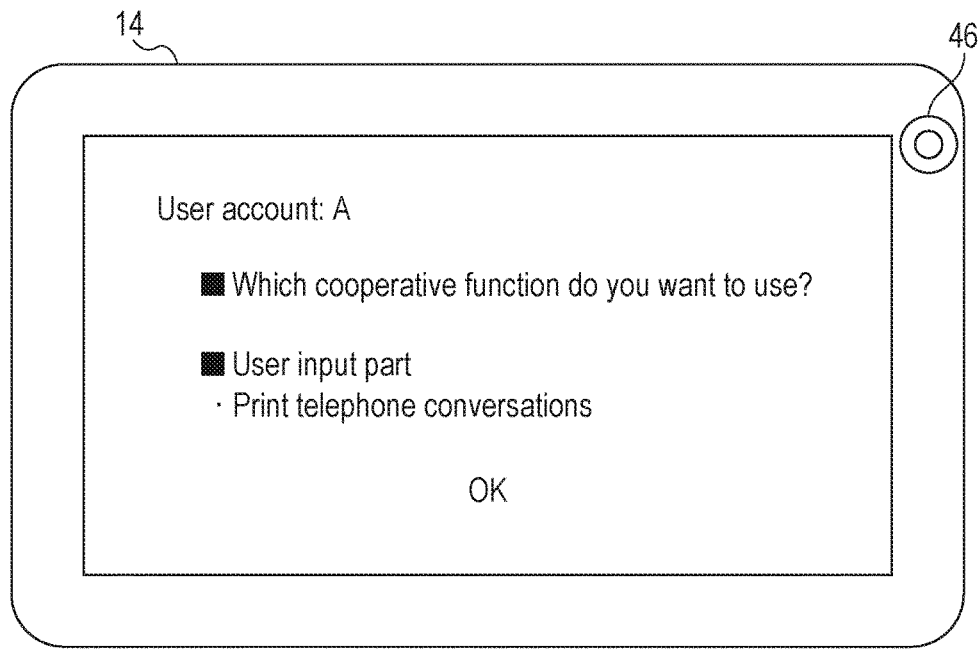
FIG. 27A is a diagram illustrating an example of a screen displayed in an application for making a connection request to devices.
Figure 27B:
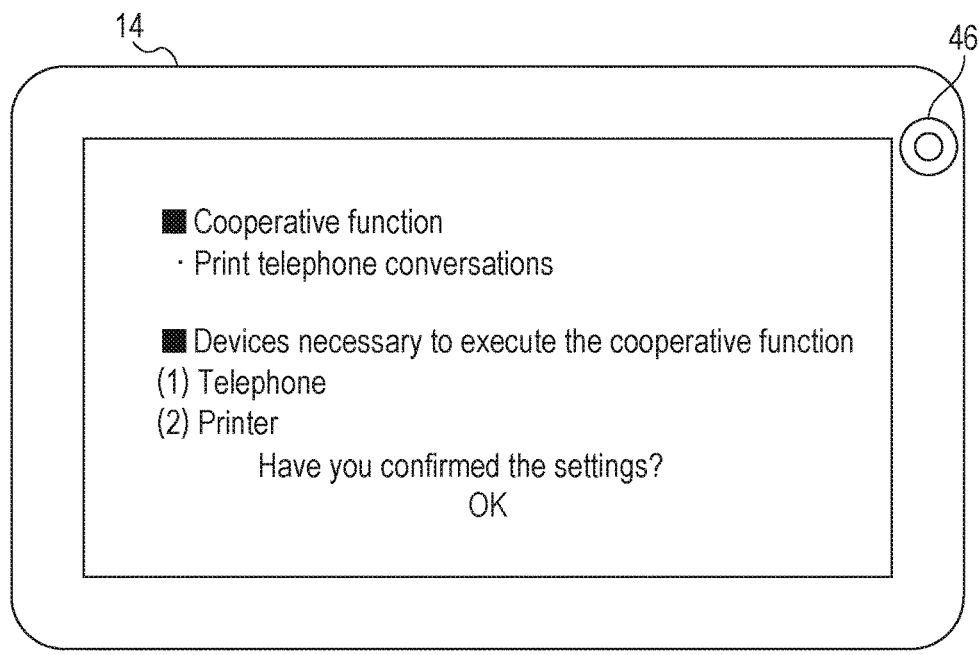
FIG. 27B is a diagram illustrating an example of a screen displayed in the application for making a connection request to devices.

Hereinafter, a description will be given of transitions of the screen on the UI unit 50 of the terminal apparatus 14, as an example of an application for making a connection request to the devices that are necessary to execute a cooperative function, with reference to FIGS. 27A to 27N. A user starts the application and logs into an account, and is thereby identified. Of course, a login process may be omitted, but requesting of logging into an account enables security to be ensured or each user to execute a special function. FIG. 27A illustrates a screen that allows a user to specify a cooperative function to be executed. The user input part illustrated in FIG. 27A is where the user inputs text or sound or where the user inputs a cooperative function to be used by using a pulldown menu. In accordance with the details of a cooperative function input here, the process of specifying the devices that are necessary to execute the cooperative function is performed. If the input cooperative function is confirmed, the user presses an OK button, and accordingly the screen shifts to the next screen. FIG. 27B illustrates a result in which the devices necessary for the cooperative function input in the user input part are automatically specified. As an example, a telephone and a printer are displayed as necessary devices because the cooperative function to be executed is the function "print telephone conversations".

Figure 27C:
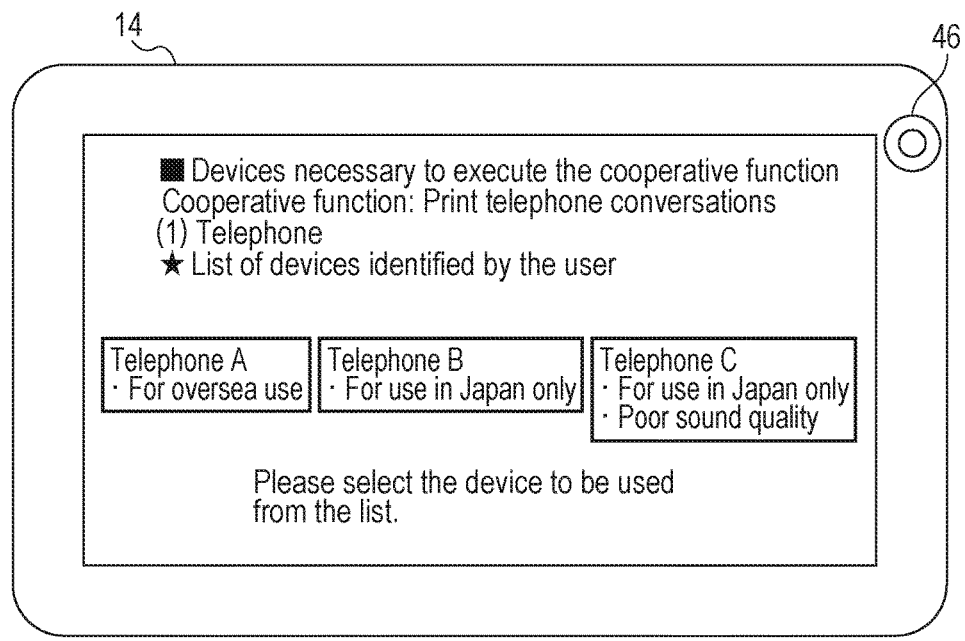
FIG. 27C is a diagram illustrating an example of a screen displayed in the application for making a connection request to devices.
Figure 27D:
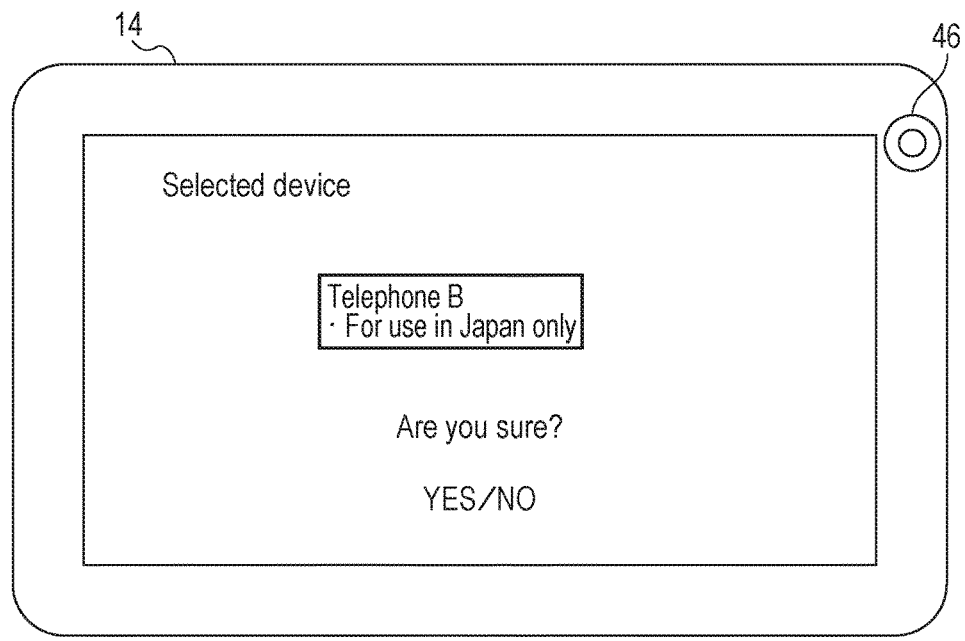
FIG. 27D is a diagram illustrating an example of a screen displayed in the application for making a connection request to devices.
Figure 27E:
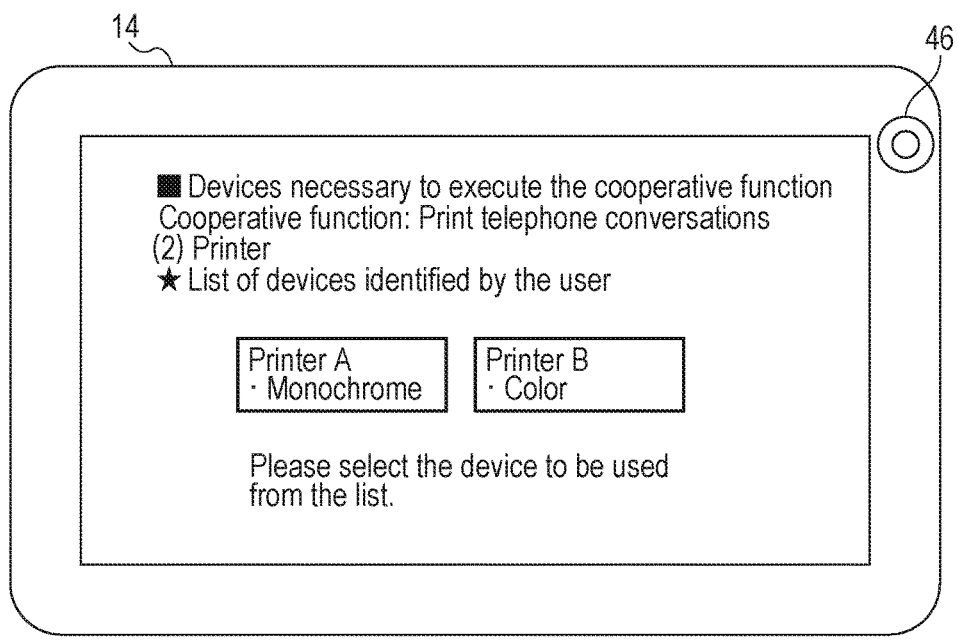
FIG. 27E is a diagram illustrating an example of a screen displayed in the application for making a connection request to devices.

FIGS. 27C and 27E illustrate, among the necessary devices that have been specified, the same type of devices that are previously identified by the user and that are available to the user, and a device newly identified and extracted from an available network. A list of telephones is displayed on the screen illustrated in FIG. 27C, whereas a list of printers is displayed on the screen illustrated in FIG. 27E. The user designates the name of a device to be used by touching it in the list.

Figure 27F:
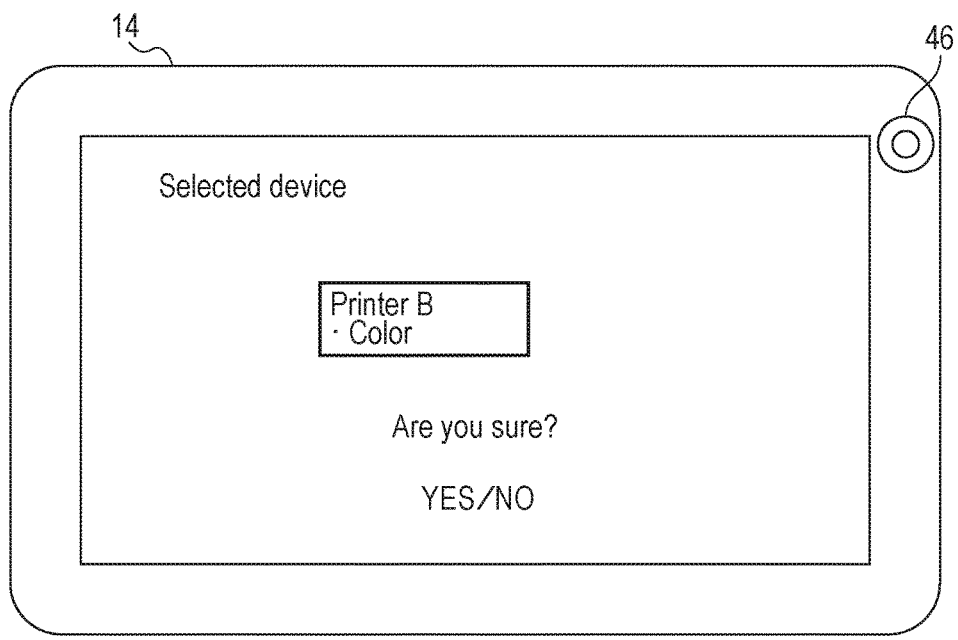
FIG. 27F is a diagram illustrating an example of a screen displayed in the application for making a connection request to devices.

FIGS. 27D and 27F illustrate a device selected by the user from among candidate devices necessary to execute the cooperative function illustrated in FIGS. 27C and 27E. As illustrated in FIG. 27D, telephone B is selected. As illustrated in FIG. 27F, printer B is selected. If the user designates a wrong device by mistake, the user may select "NO" on the confirmation screen to return to the selection screen. If the user selects "YES", the screen shifts to a device selection screen.

Figure 27G:
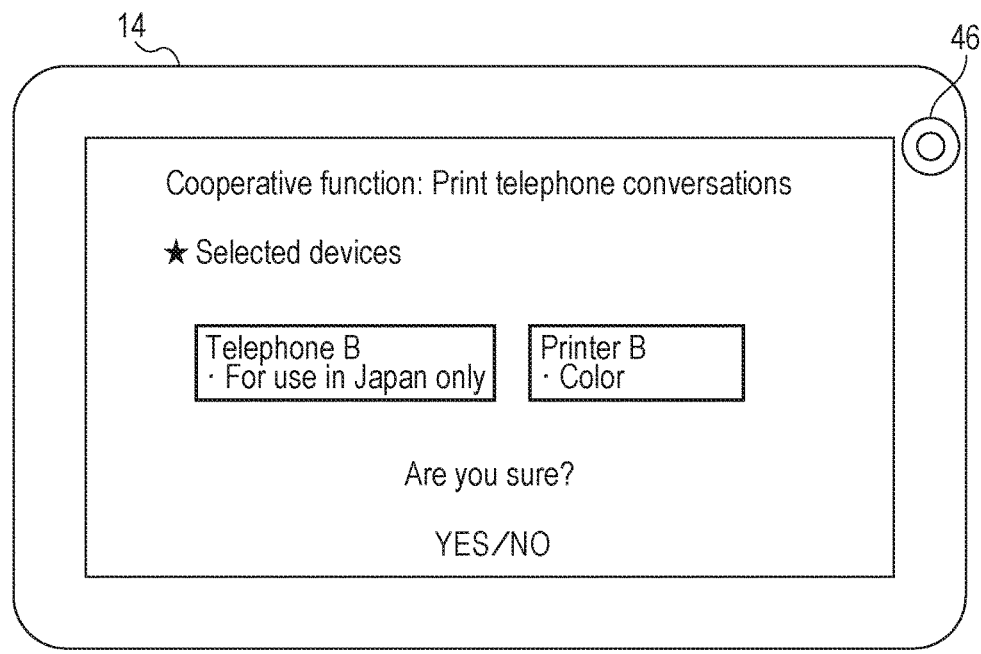
FIG. 27G is a diagram illustrating an example of a screen displayed in the application for making a connection request to devices.
Figure 27H:
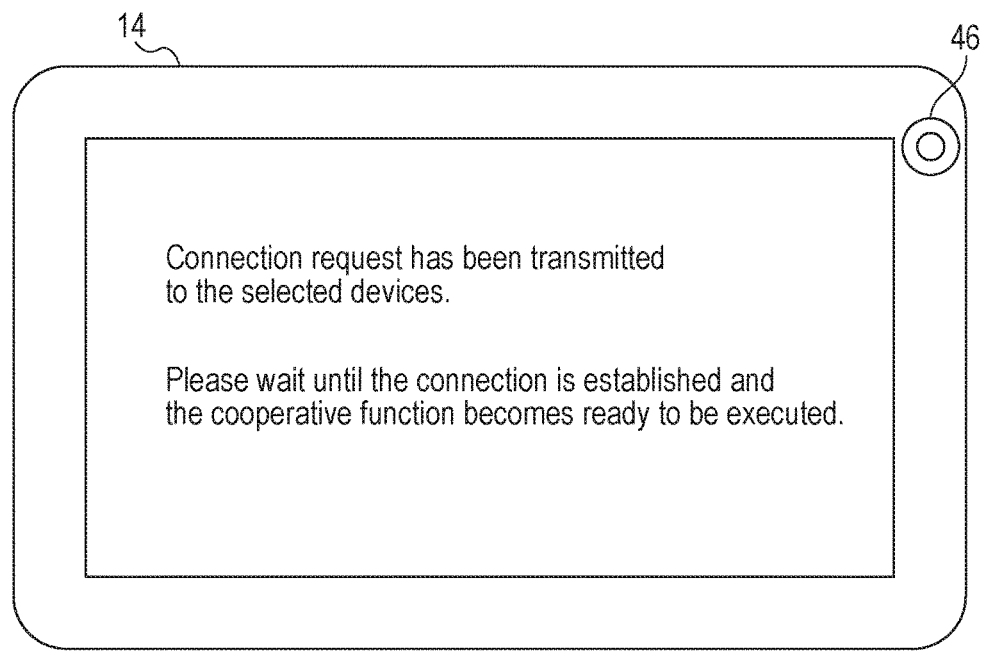
FIG. 27H is a diagram illustrating an example of a screen displayed in the application for making a connection request to devices.

FIG. 27G illustrates a confirmation screen that is displayed after the user designates all the devices necessary to execute the cooperative function. If the user selects "NO" on this confirmation screen, the screen returns to the selection screen for each device. If the user selects "YES", the screen shifts to a screen for transmitting a connection request to the selected devices. FIG. 27H illustrates the screen.

Figure 27I:
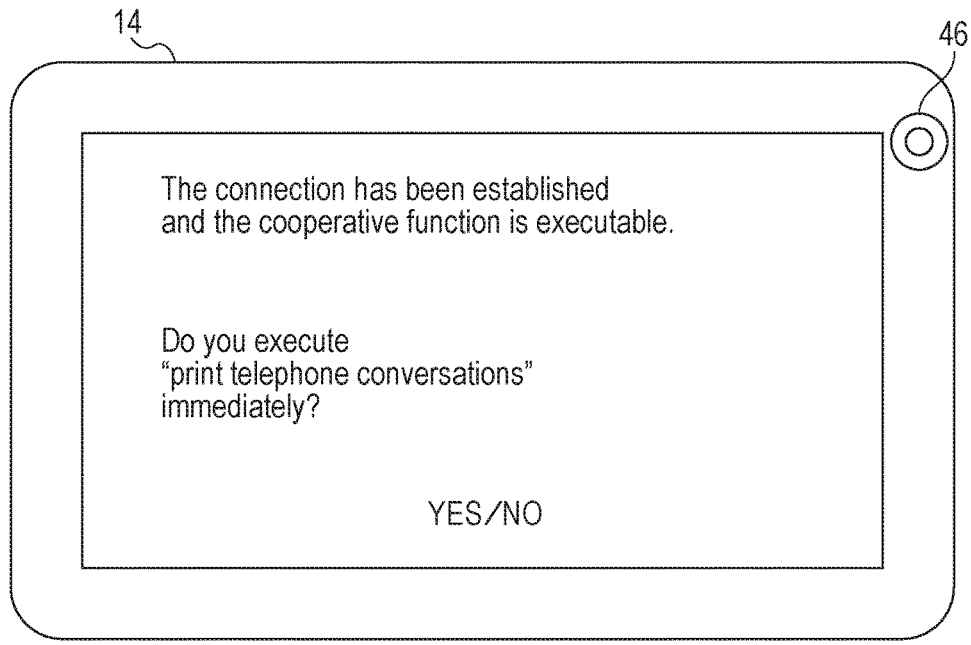
FIG. 27I is a diagram illustrating an example of a screen displayed in the application for making a connection request to devices.

As illustrated in FIG. 27I, when it becomes able to execute the cooperative function (for example, when network connection is established or when the function executed in advance by each device is completed), a message asking the user whether or not to immediately execute the cooperative function is displayed. If the user selects "YES", the cooperative function is immediately executed. If the user selects "NO", the connection state is maintained for a preset time period to wait for the user immediately executing the cooperative function.

Figure 27J:
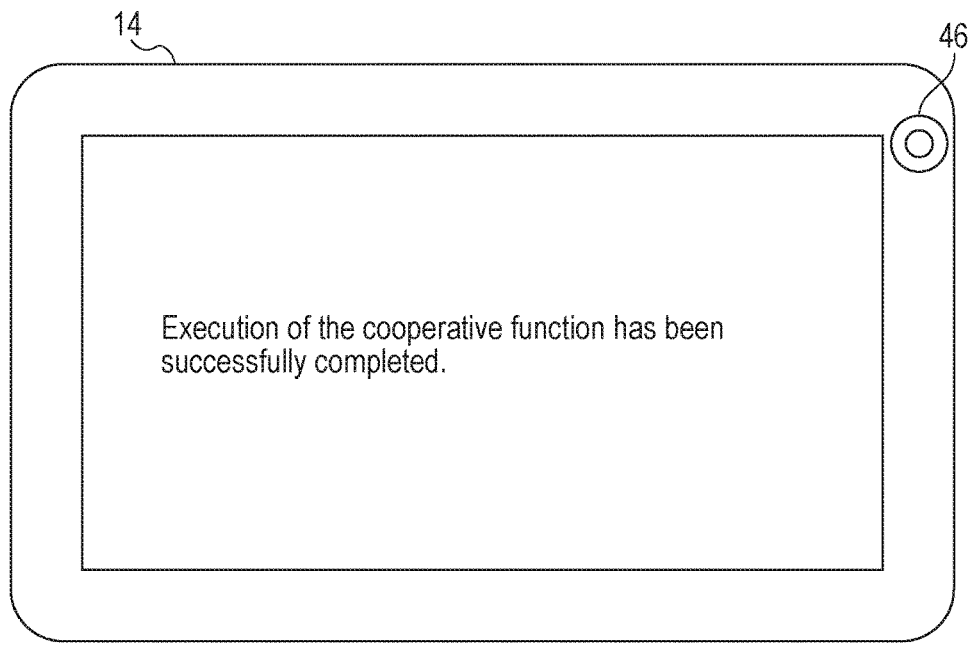
FIG. 27J is a diagram illustrating an example of a screen displayed in the application for making a connection request to devices.
Figure 27K:
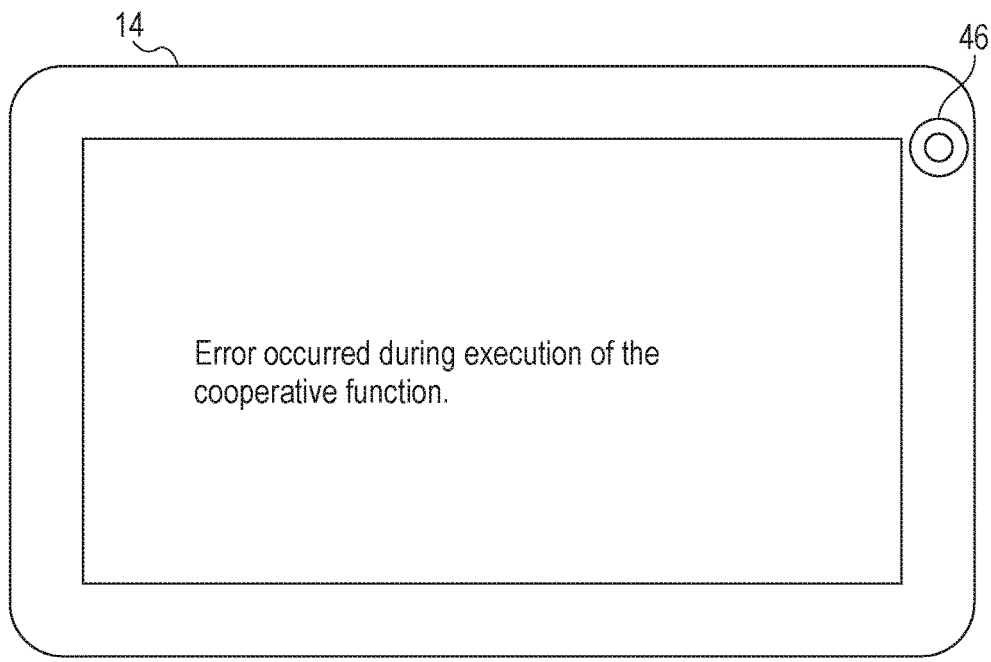
FIG. 27K is a diagram illustrating an example of a screen displayed in the application for making a connection request to devices.
Figure 27L:
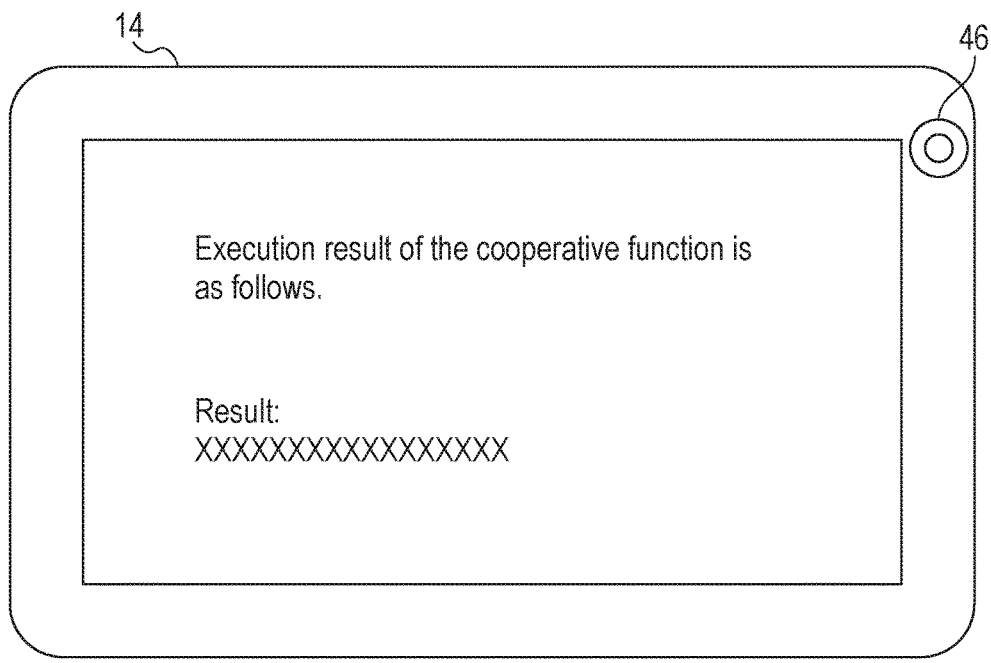
FIG. 27L is a diagram illustrating an example of a screen displayed in the application for making a connection request to devices.
Figure 27M:
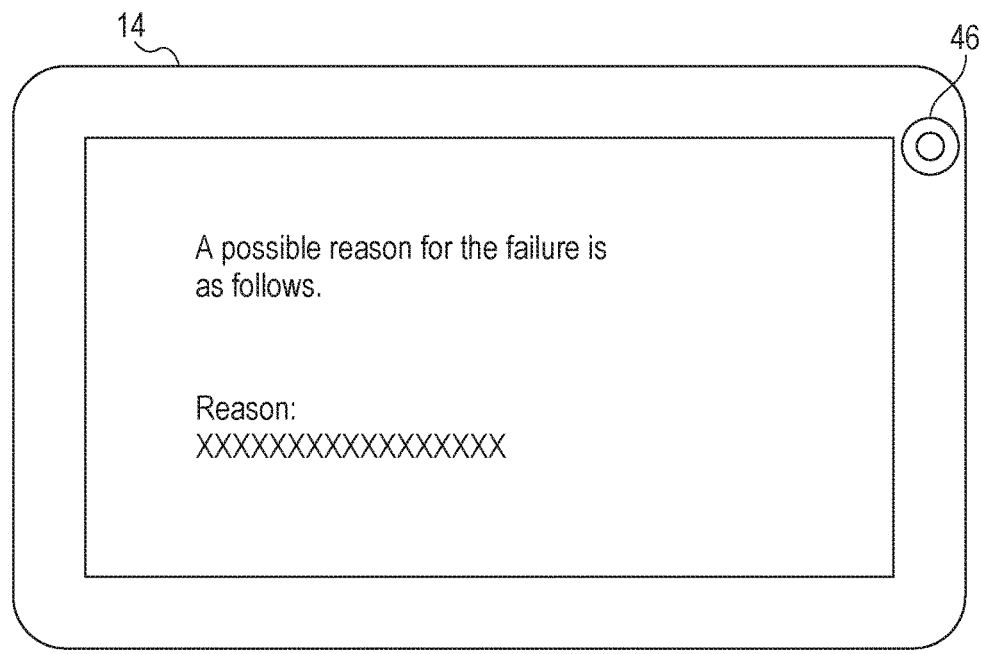
FIG. 27M is a diagram illustrating an example of a screen displayed in the application for making a connection request to devices.
Figure 27N:
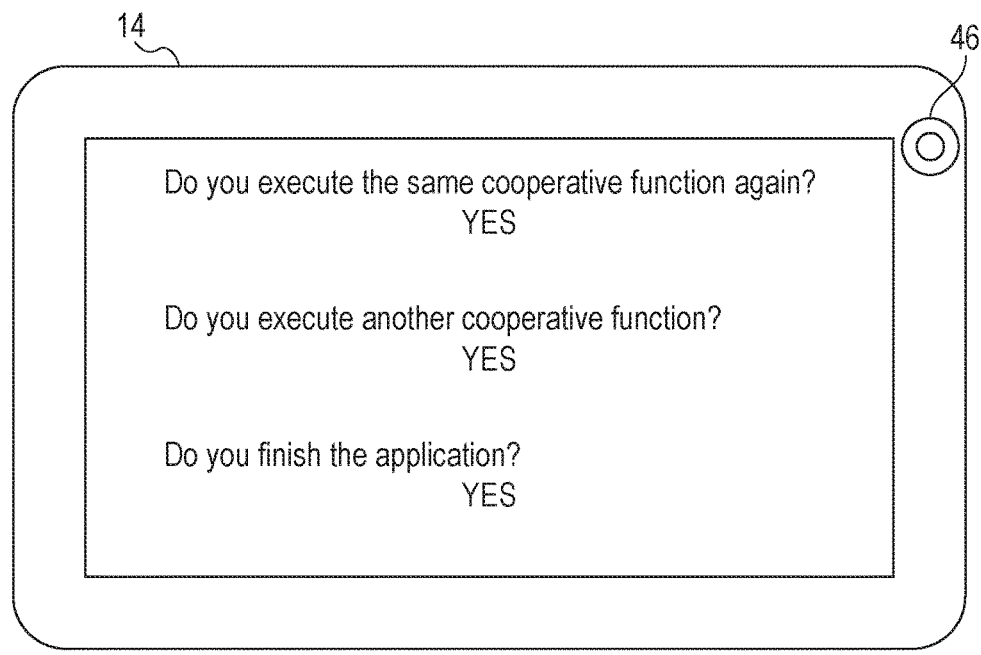
FIG. 27N is a diagram illustrating an example of a screen displayed in the application for making a connection request to devices.

The content displayed on the screen is changed in accordance with whether or not the cooperative function is successfully executed. If the cooperative function is successfully executed, the screen shifts in the order of the screen illustrated in FIG. 27J, the screen illustrated in FIG. 27L, and the screen illustrated in FIG. 27N. On the other hand, if the cooperative function is not successfully executed, the screen shifts in the order of the screen illustrated in FIG. 27K, the screen illustrated in FIG. 27M, and the screen illustrated in FIG. 27N. On the screen illustrated in FIG. 27N, the user is able to provide an instruction to execute the same cooperative function, an instruction to execute another cooperative function, or an instruction to finish the application. In the case of executing the same cooperative function, the process for connection settings is omitted. However, if the reason for failure of the cooperative function is a problem unique to the cooperative function and if there is another device that may be selected, the device that has caused an error may be changed when "execute the same cooperative function" is selected on the screen illustrated in FIG. 27N. If the user selects "execute another cooperative function", the screen shifts to the screen illustrated in FIG. 27A. If the user selects "finish the application", the application is finished.

As described above, the user may be able to easily perform settings necessary to execute a cooperative function only by installing, into the terminal apparatus 14, an application for requesting a connection to devices necessary to execute the cooperative function.

The pieces of performance information of the devices to be connected may be displayed in accordance with a priority condition. The priority condition is set by a user, for example. For example, if high quality printing is designated by the user, the specifying unit 144 sets the priority of a printer compatible with color printing or a printer with higher resolution to be higher than the priority of other printers. In accordance with the priority, the controller 52 of the terminal apparatus 14 causes the UI unit 50 to display the device identification information of the printer compatible with color printing or the printer with higher resolution with priority over the device identification information of other printers. In another example, if an overseas call is designated by the user, the specifying unit 144 sets the priority of a telephone for oversea use to be higher than the priority of a telephone for use in Japan only. In accordance with the priority, the controller 52 causes the UI unit 50 to display the device identification information of a telephone for oversea use with priority over the device identification information of a telephone for use in Japan only. If there are plural candidate printers to be connected, a printer located closer to the user may be preferentially displayed on the UI unit 50. For example, the controller 52 places the device identification information of a device given high priority in plain view, for example, at the center or an upper part of the UI unit 50, relative to the device identification information of another device. As another example, a device given high priority may be displayed in a specific area that is predetermined by the user to place a device given high priority. As still another example, information representing recommendation may be added to the device identification information of a device given high priority, information of a device given high priority may be displayed in a large space, or the display form, such as a font or color of characters, may be changed on the UI unit 50. Accordingly, the devices suitable for a target function to be used may be easily selected, compared to a case where the pieces of device identification information of the devices to be connected are randomly displayed.

Figure 28:
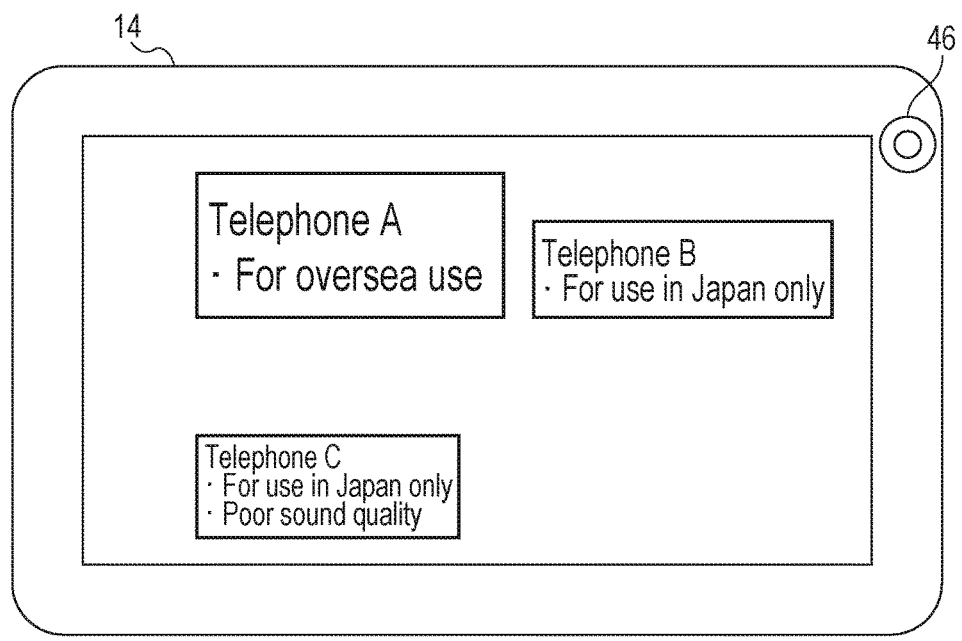
FIG. 28 is a diagram illustrating an example of priority display.
Figure 29:
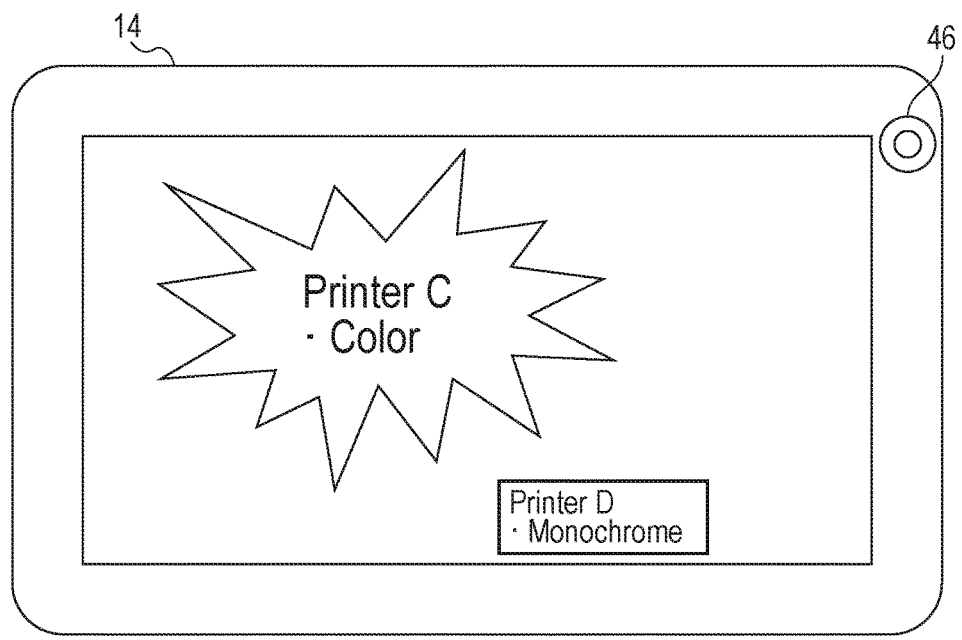
FIG. 29 is a diagram illustrating an example of priority display.
Figure 30:
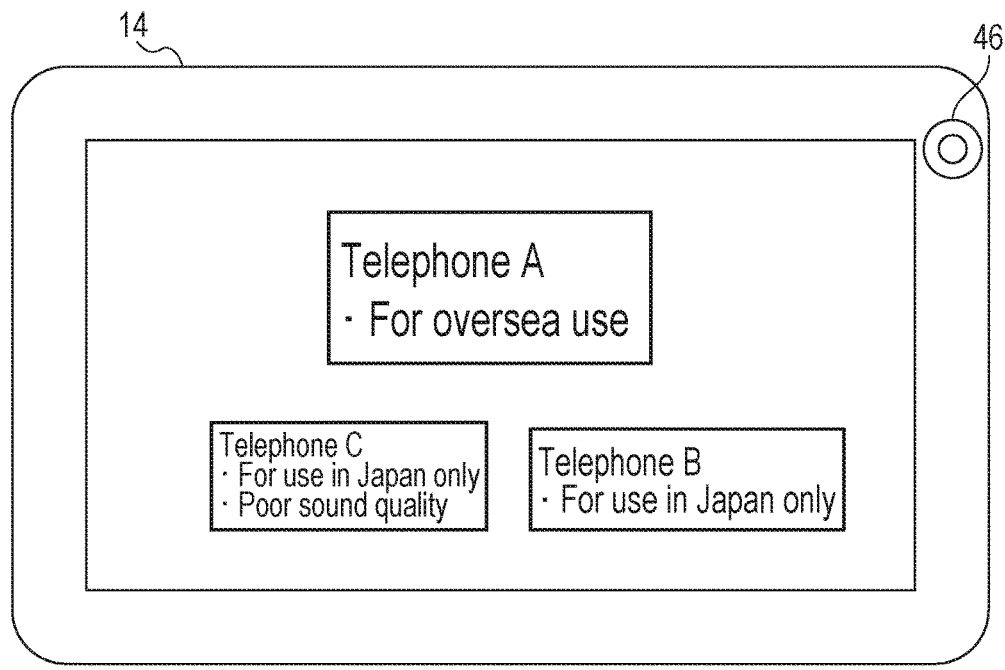
FIG. 30 is a diagram illustrating an example of priority display.
Figure 31:
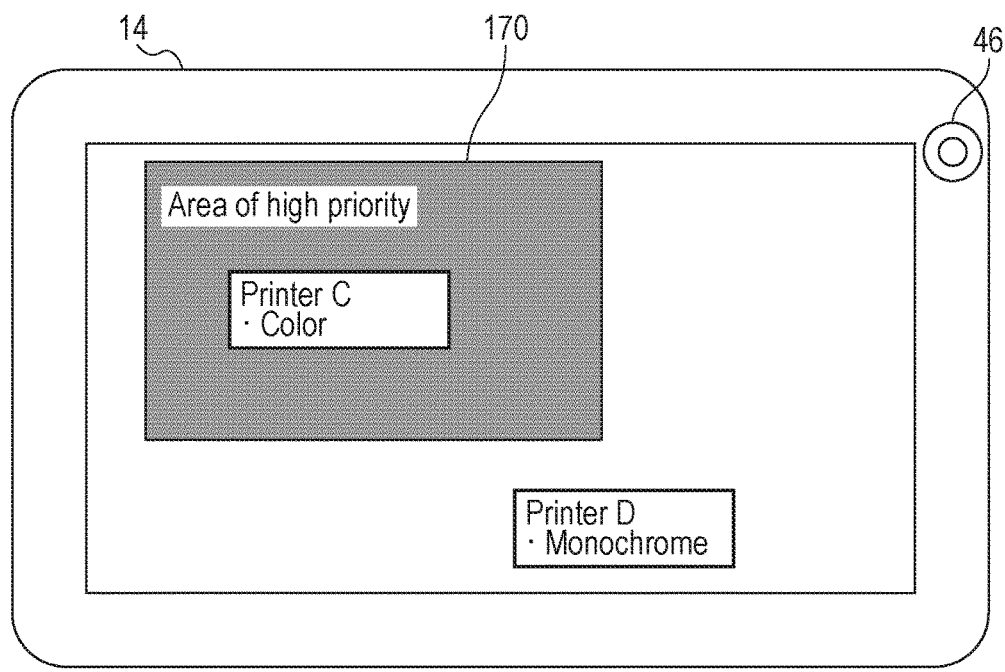
FIG. 31 is a diagram illustrating an example of priority display.

FIGS. 28 to 31 illustrate examples of display of a device that is given high priority. For example, as illustrated in FIG. 28, character strings representing devices are displayed on the UI unit 50 of the terminal apparatus 14 in different sizes, colors, or fonts according to priority. The character string representing a device given higher priority (for example, telephone A for oversea use) is placed in plain view (for example, at an upper left position of the screen) relative to the character strings representing devices given lower priority (for example, telephones B and C for use in Japan only). In another example, as illustrated in FIG. 29, the shape of an image or mark representing a device is changed in accordance with priority. In the example illustrated in FIG. 29, the image or mark representing a device given higher priority (for example, printer C compatible with color printing) has an eye-catching shape, relative to the image or mark representing a device given lower priority (for example, printer D compatible with monochrome printing). In still another example, as illustrated in FIG. 30, the character string representing a device given higher priority (for example, telephone A for oversea use) is placed at the center of the UI unit 50, relative to the devices given lower priority (for example, telephones B and C for use in Japan only). In still another example, as illustrated in FIG. 31, the character string representing a device given higher priority (for example, printer C compatible with color printing) is displayed in a specific area 170 (priority area), where a device given higher priority is placed, and the character string representing a device given lower priority (for example, printer D compatible with monochrome printing) is displayed in an area other than the specific area 170. The specific area 170 may be an area designated by the user or an area set in advance. As a result of performing display according to priority, the visibility of a character string representing a device given higher priority may be increased, and a device suitable for a target function to be used may be easily selected.

The specifying unit 144 may specify the current states of telephones A and B and printer A by referring to the device management information 140. For example, the specifying unit 144 obtains the pieces of the device position information of telephones A and B and printer A from the device management information 140. Also, the specifying unit 144 obtains user position information representing the position of the user or the terminal apparatus 14. The specifying unit 144 compares, for each device to be connected, the position represented by the device position information of the device with the position represented by the user position information, and specifies, for each device, the relative positional relationship between the user and the device. In the example illustrated in FIG. 26, telephone A is located at a position relatively close to the user or the terminal apparatus 14, as denoted by reference numeral 164, whereas telephone B and printer A are located at positions relatively far from the user or the terminal apparatus 14, as denoted by reference numerals 166 and 168. The information representing the relative positional relationship is transmitted, as information about the devices to be connected, from the server 134 to the terminal apparatus 14, and is displayed on the UI unit 50 of the terminal apparatus 14. Accordingly, the user is provided with information about a movement distance and so forth, which is useful to select a target device to be used.

The user position information may be obtained by the terminal apparatus 14 and may be transmitted to the server 134, or may be obtained by using another method. For example, the user position information is obtained by using a GPS function and is transmitted to the server 134. In another example, the user position information may be position information registered in the terminal apparatus 14 in advance or may be device position information of a device registered in the device in advance. For example, in a case where the user uses the image forming system at the position of the device or near the device, the position of the device may be regarded as the position of the user, and thus the device position information of the device may be used as the position information of the user. In this case, the specifying unit 144 obtains, as user identification information, the device identification information from the device. The device position information may be registered in the device in advance.

The specifying unit 144 may specify the current usage statuses of telephones A and B and printer A by referring to the device management information 140. For example, the specifying unit 144 obtains the pieces of usage status information of telephones A and B and printer A. In the example illustrated in FIG. 26, telephone A and printer A are immediately available as denoted by reference numerals 164 and 168, whereas telephone B is currently unavailable, as denoted by reference numeral 166. For example, if a device is not used by another user or is not broken, the device is available. On the other hand, if a device is used by another user or is broken, the device is unavailable. The usage status information representing the current usage status is transmitted, as information about the devices to be connected, from the server 134 to the terminal apparatus 14 and is displayed on the UI unit 50 of the terminal apparatus 14. Accordingly, the user is provided with information about usage timing and so forth, useful to select a target device to be used.

A reservation process for preferentially using a device to be connected may be performed. For example, if the user designates a target function to be used by using the terminal apparatus 14, the controller 52 of the terminal apparatus 14 transmits reservation information for preferentially using a device to be connected to execute the target function to the server 134. In the server 134, the controller 142 sets reservation of the target device to be reserved, that is, the target device to be connected. As an example, in a case where the devices to be connected include a device that is unavailable because the device is currently being used by another user, a reservation process for using the device next may be performed. For example, if the user provides an instruction to make a reservation by designating an unavailable device (for example, telephone B) by using the terminal apparatus 14, the controller 52 of the terminal apparatus 14 transmits the device identification information of the designated device and reservation information representing the reservation for using the device next to the server 134. In the server 134, the controller 142 sets the reservation of the target device (for example, telephone B). Accordingly, the user is able to use the reserved device after the other user finishes using the device. For example, the controller 142 issues a reservation number or the like for using the reserved device when the device becomes available, and associates the reservation number with the device identification information of the target device in the device management information 140. In the reserved state, the user is permitted to use the device by using the reservation number, and is not permitted to use the device without the reservation number. The information representing the reservation number is transmitted from the server 134 to the terminal apparatus 14 and is displayed on the UI unit 50 of the terminal apparatus 14. When the reserved device becomes available, the user uses the device by using the reservation number. For example, the user is permitted to use the target device by inputting the reservation number to the target device or transmitting the reservation number to the server 134 by using the terminal apparatus 14. When a preset time period elapses from a reservation start point, the reservation state may be cancelled and a user without reservation may be permitted to use the device. If the user wants to use a reserved device by interrupting, the process of an interruption notification may be executed as in the modification example of the second exemplary embodiment.

If plural users are requesting to use the same device, connection may be permitted in accordance with an order of priority of execution as in the modification example of the second exemplary embodiment, and the order of priority may be displayed on the UI unit 50 of the terminal apparatus 14.

In the case of using devices, information representing a connection request is transmitted from the terminal apparatus 14 to the target devices, and thereby communication between the terminal apparatus 14 and each of the devices is established, as described above with reference to FIG. 21. For example, in a case where telephone A and printer A are used as target devices that cooperate with each other, information representing a connection request is transmitted from the terminal apparatus 14 to telephone A and printer A, and thereby communication between the terminal apparatus 14 and each of telephone A and printer A is established. Then information representing conversations on telephone A is printed by printer A.

As described above, according to the fourth exemplary embodiment, information representing a group of devices to be connected that correspond to a target function to be used is displayed on the terminal apparatus 14. Accordingly, information representing a group of devices capable of executing the target function is provided to the user. The target function to be used varies according to devices available to each user and functions available to each user among the functions of the devices. Thus, search for cooperative functions displayed on the terminal apparatus 14 may be limited for each user, or executable cooperative functions may be limited. Accordingly, in a case where there is an electronic document that is decodable only by executing a specific cooperative function (a cooperative function using specific functions of specific devices), for example, enhanced security may be obtained.

The controller 52 of the terminal apparatus 14 may cause the UI unit 50 to display information about a device to be newly connected to the terminal apparatus 14 and not to display information about a device that has already been connected to the terminal apparatus 14. For example, if telephone A and printer A are used as target devices that cooperate with each other, if communication between the terminal apparatus 14 and telephone A has been established, and if communication between the terminal apparatus 14 and printer A has not been established, the controller 52 does not cause the UI unit 50 to display the device identification information and device management information of telephone A but causes the UI unit 50 to display the device identification information of printer A. The controller 52 may cause the UI unit 50 to display the device management information about printer A. Because information about a device which has been connected and for which a connection operation is unnecessary is not displayed and because information about a device which has not been connected and for which a connection operation is necessary is displayed, it may be easily determined whether or not a connection operation is necessary for each target device to be used, compared to the case of also displaying information about a device which has been connected.

The controller 52 of the terminal apparatus 14 may cause the UI unit 50 to display information representing a connection scheme corresponding to a device to be connected. The connection scheme may be the above-described marker-based AR technology, markerless AR technology, position information AR technology, or network connection. For example, in the device management information 140, device identification information is associated with connection scheme information representing a connection scheme suitable for a device for each device. A device provided with a mark, such as a two-dimensional barcode obtained by coding device identification information, is a device suitable for the marker-based AR technology, and the device identification information of the device is associated with information representing the marker-based AR technology as connection scheme information. If appearance image data of a device is generated and included in the above-described appearance image correspondence information, the device is suitable for the markerless AR technology, and the device identification information of the device is associated with information representing the markerless AR technology as connection scheme information. If position information of a device is obtained and included in the above-described position correspondence information, the device is suitable for the position information AR technology, and the device identification information of the device is associated with information representing the position information AR technology as connection scheme information. When a group of devices to be connected is specified, the specifying unit 144 of the server 134 specifies a connection scheme for each of the devices to be connected by referring to the device management information 140. Information representing the connection schemes is transmitted from the server 134 to the terminal apparatus 14 and is displayed on the UI unit 50 of the terminal apparatus 14. For example, information representing a connection scheme is displayed for each device to be connected. Specifically, if telephone A as a device to be connected is suitable for the marker-based AR technology, information representing the marker-based AR technology is displayed, as the connection scheme for telephone A, on the UI unit 50 of the terminal apparatus 14. If it is determined in advance that a user who makes a connection request is not permitted to connect to a device in any connection scheme, the device is not necessarily displayed. Accordingly, the connection scheme to be used for a device to be connected is recognized, which may be convenient.

The first exemplary embodiment and the fourth exemplary embodiment may be combined. For example, a group of functions purchased by a user, that is, a group of functions available to the user, is displayed on the UI unit 50 of the terminal apparatus 14. If a specific function is selected by the user from among the group of functions, information representing a device or a group of devices to be connected to execute the function is displayed on the UI unit 50. If a cooperative function is selected, information representing a group of devices that are capable of executing the cooperative function by cooperating with each other is displayed. If a function executable by a single device is selected, information representing the device that is capable of executing the function is displayed.

Each of the image forming apparatus 10, the servers 12, 80, 124, and 134, the terminal apparatus 14, and the devices 76 and 78 is implemented through cooperation between hardware resources and software resources, for example. Specifically, each of the image forming apparatus 10, the servers 12, 80, 124, and 134, the terminal apparatus 14, and the devices 76 and 78 includes one or plural processors, such as a central processing unit (CPU), which are not illustrated. The one or plural processors read and execute a program stored in a storage apparatus (not illustrated), and thereby the functions of the individual units of the image forming apparatus 10, the servers 12, 80, 124, and 134, the terminal apparatus 14, and the devices 76 and 78 are implemented. The program is stored in the storage apparatus through a recording medium, such as a compact disc (CD) or a digital versatile disc (DVD), or through a communication path, such as a network. Alternatively, the individual units of the image forming apparatus 10, the servers 12, 80, 124, and 134, the terminal apparatus 14, and the devices 76 and 78 may be implemented by hardware resources such as a processor or an electronic circuit. An apparatus such as a memory may be used for the implementation. Alternatively, the individual units of the image forming apparatus 10, the servers 12, 80, 124, and 134, the terminal apparatus 14, and the devices 76 and 78 may be implemented by a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a camera configured to capture at least one image of a plurality of target devices configured to cooperate with each other; and
at least one processor configured to execute:
an obtaining unit that obtains, from the captured at least one image, pieces of identification information identifying each one of the target devices; and
a display controller that, in response to the pieces of identification information being obtained, controls display of a cooperative function that is configured to be executed through cooperation between the target devices identified by the pieces of identification information,
wherein the display controller controls, after the display of the cooperative function, display of images related to the target devices identified by the pieces of identification information,
wherein the display controller controls reception of a user operation on the displayed images,
wherein the display controller controls, after the display of the cooperative function, designation of the target devices to execute the already displayed cooperative function in response to the reception of the user operation, and
wherein the display controller, in response to the pieces of identification information being obtained, and without receiving any additional input specifying any of the target devices, controls display of the cooperative function.

2. The information processing apparatus according to claim 1, wherein the display controller causes information representing a group of functions including the cooperative function to be displayed, causes information representing the cooperative function to be displayed such that the cooperative function is unavailable, and, if the pieces of identification information of the individual target devices are obtained by the obtaining unit, causes information representing the cooperative function to be displayed such that the cooperative function is available.

3. The information processing apparatus according to claim 1, wherein the target devices are configured to execute functions that differ from each other.

4. The information processing apparatus according to claim 1, wherein the target devices have functions identical to each other, and
wherein each of the target devices is configured to execute the cooperative function to execute an identical process in a distributed manner.

5. The information processing apparatus according to claim 1, wherein the cooperative function is a function that is not available without cooperation between the target devices.

6. The information processing apparatus according to claim 5, wherein the function that is not available without cooperation between the target devices is a function that is available by using identical functions among functions of the target devices.

7. The information processing apparatus according to claim 5, wherein the function that is not available without cooperation between the target devices is a function that is available by combining different functions among functions of the target devices.

8. The information processing apparatus according to claim 1, further comprising:
wherein the display controller causes images of the target devices obtained from the at least one image to be displayed as the pieces of identification information of the target devices, and
wherein the information processing apparatus is configured such that a user operation performed on the displayed images causes the target devices to cooperate with each other.

9. The information processing apparatus according to claim 8, wherein the user operation performed on the displayed images comprises touching the displayed images to designate the target devices.

10. The information processing apparatus according to claim 8, wherein the user operation performed on the displayed images comprises touching one of the displayed images and then linking the one image to another one of the displayed images to designate the target devices.

11. The information processing apparatus according to claim 8, wherein the information processing apparatus is configured such that, if not all the target devices are within a field of view of the camera, a piece of identification information of one of the target devices that has been subjected to image capturing in the field of view is stored, and the piece of identification information is combined with a piece of identification information of another one of the target devices that has been subjected to image capturing in another field of view, so as to specify the target devices.

12. The information processing apparatus according to claim 8, wherein the information processing apparatus is configured such that designation of the target devices is cancelled by operating the displayed images related to the target devices in accordance with a predetermined motion.

13. The information processing apparatus according to claim 1, wherein the at least one processor is configured to execute a transmitting unit that transmits a connection request to the target devices, and
wherein the transmitting unit is configured such that, if information representing permission to use the target devices is received in reply to the connection request, then connection to the target devices is started.

14. The information processing apparatus according to claim 13, wherein the transmitting unit is configured such that, if connection requests from a plurality of different users are simultaneously given to an identical device among the target devices, then connection is permitted in accordance with a priority condition.

15. The information processing apparatus according to claim 1, wherein the at least one processor is configured to execute:
a user identifying unit that identifies a user who uses the target devices, and
wherein the display controller causes information to be displayed, the information representing a cooperative function configured to be executed through cooperation between the target devices identified by the pieces of identification information and that is available to the user.

16. The information processing apparatus according to claim 1, wherein the obtaining unit obtains the pieces of identification information by capturing an image of markers that are provided on the target devices and that represent the pieces of identification information, obtains the pieces of identification information by capturing an image of appearances of the target devices, or obtains the pieces of identification information by using pieces of position information representing positions where the target devices are installed.

17. The information processing apparatus according to claim 1, wherein the target devices comprise a scanner having a scan function and a destination apparatus, and
wherein the cooperative function comprises a function of transmitting scan data generated by reading a document by the scanner to the destination apparatus.

18. The information processing apparatus according to claim 1, wherein the target devices comprise a printer having a print function and a scanner having a scan function, and
wherein the cooperative function comprises a function of printing, using the printer, scan data generated by reading a document by the scanner.

19. The information processing apparatus according to claim 1, wherein the target devices comprise a printer having a print function and a display, and
wherein the cooperative function comprises a function of printing, using the printer, information displayed on the display.

20. The information processing apparatus according to claim 1, wherein the target devices comprise an apparatus having at least one of a print function, an email transmission function, and a facsimile transmission function, and a telephone having a call function, and
wherein the cooperative function comprises at least one of a function of printing, using the apparatus, data representing conversations on the telephone, a function of transmitting by email, using the apparatus, the data representing conversations, and a function of transmitting by facsimile, using the apparatus, the data representing conversations.

21. The information processing apparatus according to claim 1, wherein the target devices comprise an image forming apparatus having an image forming function and a clock, and
wherein the cooperative function comprises a timer function for use in the image forming apparatus.

22. The information processing apparatus according to claim 1, wherein the target devices comprise an image forming apparatus having an image forming function and a monitoring camera, and
wherein the cooperative function comprise a function of deleting image formation instruction information and image data that are stored in the image forming apparatus in accordance with a result of image capturing performed by a monitoring camera.

23. The information processing apparatus according to claim 1, wherein the target devices comprise an image forming apparatus having an image forming function and a translation apparatus, and
wherein the cooperative function comprises a function of translating, using the translation apparatus, characters included in a document whose image is formed by the image forming apparatus.

24. An information processing method comprising:
capturing, by a camera, at least one image of a plurality of target devices configured to cooperate with each other;

obtaining, from the captured at least one image, pieces of identification information identifying each one of the plurality of target devices;

controlling, in response to the pieces of identification information being obtained, display of a cooperative function that is configured to be executed through cooperation between the target devices identified by the pieces of identification information;

controlling, after the display of the cooperative function, display of images related to the target devices identified by the pieces of identification information;

receiving a user operation on the displayed images; and designating, after the display of the cooperative function, the target devices to execute the already displayed cooperative function in response to the receiving the user operation, wherein the controlling comprises, in response to the pieces of identification information being obtained, and without receiving any additional input specifying any of the target devices, controlling display of the cooperative function.

25. A non-transitory computer readable medium storing a program that, if executed, causes a computer to execute a process comprising:

capturing, by a camera, at least one image of a plurality of target devices configured to cooperate with each other;

obtaining, from the captured at least one image, pieces of identification information identifying each one of the plurality of target devices;

controlling, in response to the pieces of identification information being obtained, display of a cooperative function that is configured to be executed through cooperation between the target devices identified by the pieces of identification information;

controlling, after the display of the cooperative function, display of images related to the target devices identified by the pieces of identification information;

receiving a user operation on the displayed images; and designating, after the display of the cooperative function, the target devices to execute the already displayed cooperative function in response to the receiving the user operation, wherein the controlling comprises, in response to the pieces of identification information being obtained, and without receiving any additional input specifying any of the target devices, controlling display of the cooperative function.

* * * * *